(12) United States Patent
Utoh et al.

(10) Patent No.: US 10,848,629 B2
(45) Date of Patent: Nov. 24, 2020

(54) IMAGE PROCESSING APPARATUS, IMAGE PROCESSING SYSTEM, IMAGE PROCESSING METHOD, AND WEB BROWSER PROGRAM

(71) Applicants: Yohsuke Utoh, Kanagawa (JP); Nobuya Monden, Kanagawa (JP); Hiroki Asakimori, Tokyo (JP)

(72) Inventors: Yohsuke Utoh, Kanagawa (JP); Nobuya Monden, Kanagawa (JP); Hiroki Asakimori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/682,073

(22) Filed: Nov. 13, 2019

(65) Prior Publication Data

US 2020/0162627 A1 May 21, 2020

(30) Foreign Application Priority Data

Nov. 20, 2018 (JP) .................................. 2018-217557
Nov. 22, 2018 (JP) .................................. 2018-219423

(Continued)

(51) Int. Cl.
*G06F 15/00* (2006.01)
*G06F 3/12* (2006.01)
(Continued)

(52) U.S. Cl.
CPC ..... *H04N 1/00464* (2013.01); *H04N 1/00209* (2013.01); *H04N 1/00244* (2013.01); *H04N 1/00938* (2013.01); *H04N 2201/0094* (2013.01)

(58) Field of Classification Search
CPC .......... H04N 1/00464; H04N 1/00209; H04N 1/00244; H04N 1/00938; H04N 2201/0094
(Continued)

(56) References Cited

U.S. PATENT DOCUMENTS 8,578,197 B2  11/2013 Utoh
8,713,341 B2  4/2014 Utoh
(Continued)

FOREIGN PATENT DOCUMENTS

JP  2011-141684  7/2011
JP  2011-259464  12/2011
JP  2019-024187  2/2019

*Primary Examiner* — Douglas Q Tran
(74) *Attorney, Agent, or Firm* — IPUSA, PLLC

(57) ABSTRACT

An image processing apparatus including a Web browser and an image processing service unit controlling the execution of predetermined image processing, wherein the Web browser comprises: an interpretation unit for interpreting contents obtained from a Web server connected to the image processing apparatus via a network, a UI unit for displaying a screen based on contents interpreted by the interpretation unit, and a control unit for requesting at least the image processing from the image processing service unit to perform at least the image processing in response to a user input on the screen displayed by the UI unit, and wherein, when the HTML tag of the contents includes predetermined tags, the control unit requests the image processing unit to transmit image data generated by reading the document as the image processing to a destination indicated by the predetermined tag.

19 Claims, 42 Drawing Sheets

(30) Foreign Application Priority Data

Nov. 29, 2018 (JP) .................................. 2018-224166
Jun. 28, 2019 (JP) .................................. 2019-122458

(51) Int. Cl.
G06K 1/00 (2006.01)
H04N 1/00 (2006.01)

(58) Field of Classification Search
USPC ....................................... 358/1.13, 1.15, 1.1
See application file for complete search history.

(56) References Cited

U.S. PATENT DOCUMENTS

| | | |
|---|---|---|
| 8,823,992 B2 | 9/2014 | Moroi |
| 8,897,662 B2 | 11/2014 | Tsukahara et al. |
| 8,913,262 B2 | 12/2014 | Utoh et al. |
| 9,111,209 B2 | 8/2015 | Utoh et al. |
| 9,134,936 B2 | 9/2015 | Monden |
| 9,442,641 B2 | 9/2016 | Asakimori |
| 9,584,687 B2 | 2/2017 | Watanabe et al. |
| 9,794,447 B2 | 10/2017 | Fukasawa et al. |
| 9,817,463 B2 | 11/2017 | Yoshida et al. |
| 9,961,224 B2 | 5/2018 | Utoh |
| 10,165,132 B2 | 12/2018 | Asakimori |
| 10,182,171 B2 | 1/2019 | Monden |
| 10,270,657 B2 | 4/2019 | Utoh |
| 10,270,941 B2 | 4/2019 | Asakimori |
| 10,416,940 B2 | 9/2019 | Asakimori et al. |
| 2009/0089076 A1 | 4/2009 | Asakimori et al. |
| 2009/0237728 A1* | 9/2009 | Yamamoto ......... H04N 1/00474 358/1.15 |
| 2015/0163373 A1 | 6/2015 | Monden |
| 2016/0077771 A1 | 3/2016 | Monden |
| 2016/0094748 A1 | 3/2016 | Utoh |
| 2017/0111531 A1 | 4/2017 | Mitsuke et al. |
| 2018/0267753 A1* | 9/2018 | Asakimori ............ G06F 3/1256 |
| 2019/0289148 A1 | 9/2019 | Utoh |
| 2019/0335045 A1* | 10/2019 | Yamada ................ G06F 3/1226 |

\* cited by examiner

FIG.8

```
<a href="./file/myfile.pdf" download ="myfile.pdf" type="application/pdf">PDF FILE</a>
```

FIG.9

```
<?php
$fpath = './myfile.pdf';
$fname = 'myfile.pdf';
header('Content-Type: application/force-download');
header('Content-Length: '.filesize($fpath));
header('Content-disposition: attachment;
filename="'.$fname.'"');
readfile($fpath);
?>
```

FIG.17

`<a href=" mailto:aaa@bb.cc ">MAIL TRANSMISSION DESTINATION aaa@bb.cc</a>`

FIG.27

`<a href=tel:0312345678>FACSIMILE TRANSMISSION DESTINATION 03-1234-5678</a>`

FIG.40

```
<input type="file" Job="resolution=200&originalSide=top_to_top">
```

FIG.41

```
<a href="./doc.pdf?copies=3&printSide=top_to_top">
```

IMAGE PROCESSING APPARATUS, IMAGE PROCESSING SYSTEM, IMAGE PROCESSING METHOD, AND WEB BROWSER PROGRAM

CROSS-REFERENCE TO RELATED APPLICATIONS

This application is based on and claims priority to Japanese Patent Application No. 2018-217557, filed on Nov. 20, 2018, Japanese Patent Application No. 2018-219423, filed on Nov. 22, 2018, Japanese Patent Application No. 2018-224166, filed on Nov. 29, 2018, and Japanese Patent Application No. 2019-122458, filed on Jun. 28, 2019, the entire contents of which are incorporated herein by reference.

BACKGROUND OF THE INVENTION

1. Field of the Invention

The present invention relates to an image processing apparatus, an image processing system, an image processing method, and a Web browser program.

2. Description of the Related Art

Technologies for substantializing various image processing functions such as print and scan by using a Web application running on a Web browser in an image processing apparatus such as a MFP (Multifunction Peripheral) are known (see, for example, Patent Document 1).
[Patent Document 1]
Japanese Laid-Open Patent Application No. 2011-259464

SUMMARY OF THE INVENTION

The various image processing functions such as print and scan described above are specific for an image processing apparatus such as a MFP. For Web applications that substantialize such specific functions for the image processing apparatus, HTML (HyperText Markup Language) may be written using JavaScript ("JavaScript" is a registered trademark), which is dedicated to the image processing apparatus.

Meanwhile, a Web application used by information processing apparatuses such as a smartphone, a tablet, and a personal computer is written in general purpose HTML. In general purpose HTML, an HTML tag or the like is not provided to substantialize a function specific for the image processing apparatus such as print and scan described above.

For this reason, the functions specific for the image processing apparatus, such as printing and scanning, are difficult to substantialize in a Web application using a general purpose HTML.

Embodiments of the present invention have been developed in view of the above-mentioned points, and are intended to substantialize the functions specific for image processing apparatus by using general purpose HTML.

SUMMARY OF THE INVENTION

In order to achieve the above-described object, an embodiment of the present invention comprises an image processing apparatus having a Web browser and an image processing service unit controlling the execution of predetermined image processing, wherein the Web browser comprises: an interpretation unit for interpreting contents obtained from a Web server connected to the image processing apparatus via a network, a UI unit for displaying a screen based on contents interpreted by the interpreting unit, and a control unit for at least requesting the image processing from the image processing service unit in response to a user input on the screen displayed by the UI unit, and when the HTML tag of the contents includes a predetermined tag, the control unit requires the image processing unit to transmit image data generated by reading a document as image processing to a destination indicated by the predetermined tag.

BRIEF DESCRIPTION OF THE DRAWINGS

FIG. 8 illustrates an example of a-tag.
FIG. 9 is a diagram illustrating an example of a PHP code.
FIG. 17 illustrates an example of a-tag.

FIG. 27 illustrates an example of a-tag.

FIG. 40 illustrates an example of a scan execution tag.

FIG. 41 is a diagram illustrating an example of a print execution tag.

DESCRIPTION OF THE EMBODIMENTS

Hereinafter, embodiments of the present invention will be described with reference to the drawings.

First Embodiment

<Example of Entire Structure>

Figure 1:
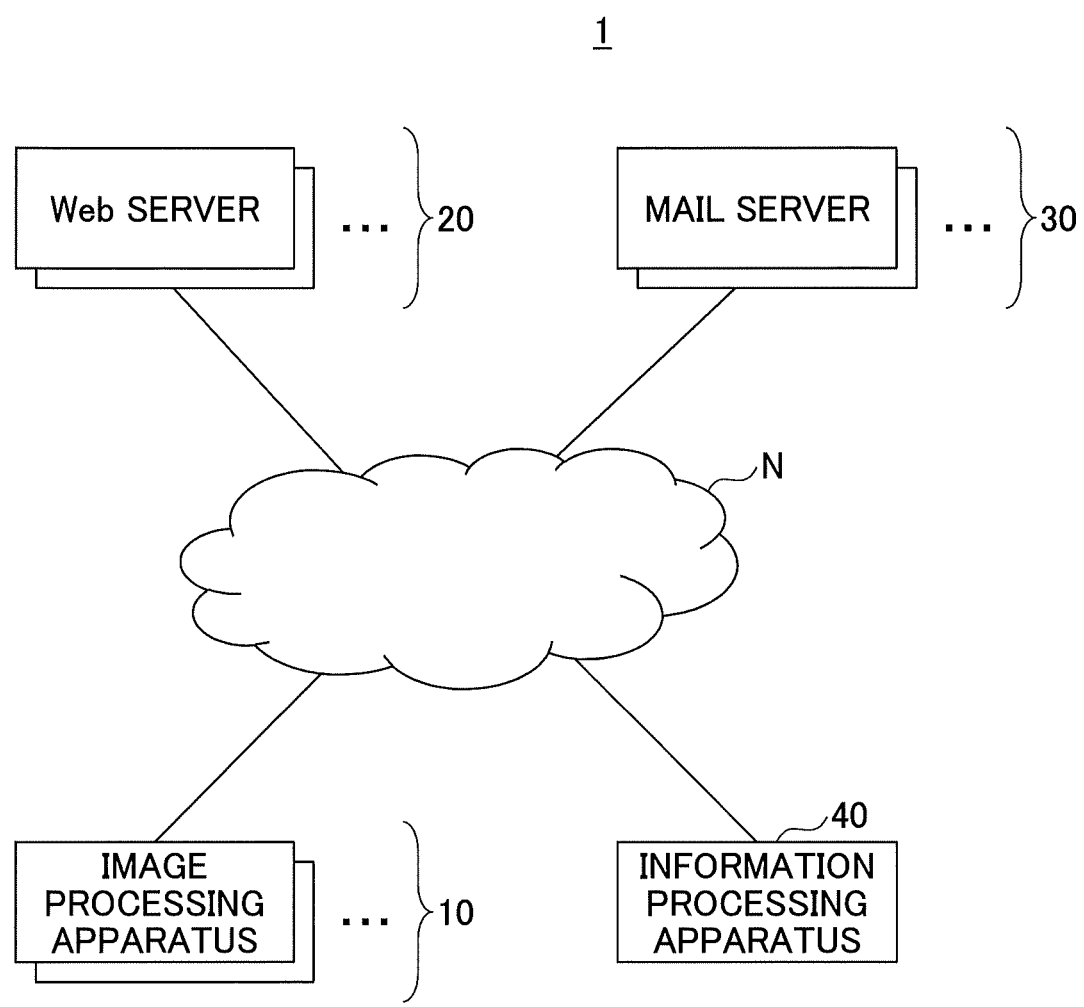
FIG. 1 is a diagram illustrating an example of the entire structure of an image processing system according to an embodiment.

First, the entire structure of an image processing system 1 according to a first embodiment is described with reference to FIG. 1. FIG. 1 is a diagram illustrating an example of the entire structure of the image processing system 1 according to the embodiment.

As illustrated in FIG. 1, the image processing system 1 according to the embodiment includes at least one image processing apparatus 10, at least one Web server 20, at least one mail servers 30, and an information processing apparatus 40. The image processing apparatus 10 and the Web server 20 are communicatively coupled via a wide area network N, such as the Internet. The image processing apparatus 10 and the mail server 30 are coupled to each other so as to be communicable via a wide area network N, such as the Internet.

The image processing apparatus 10 is an electronic apparatus, such as a MFP mounted with a Web browser. For example, the user of the image processing apparatus 10 may print the electronic data downloaded from the Web server 20 or send the image data generated by scanning to the mail server 30 using the Web application provided by the Web server 20.

The Web server 20 is a computer or computer system that provides a Web application using general purpose HTML via the network N. Generic HTML is defined in the World Wide Web Consortium (W3C), such as HTML5 and HTML5.1. The general purpose means contents that can be interpreted and processed regardless of the type of device in a general purpose Web browser, unlike contents (extended contents such as extended HTML and extended JavaScript) that can be interpreted and processed only by an apparatus such as image processing apparatus. General purpose HTML can be used in personal computers, portable terminals, smartphones, etc., and is commonly used in general Web servers and Web applications.

A variety of Web services are substantialized by Web servers 20 providing Web applications. Examples of such Web services include cloud storage services, social networking services (SNS), cloud printing services, blogging services, bulletin board services, online game services, and online shopping services.

The mail server 30 is a computer or a computer system that receives the image data transmitted by the image processing apparatus 10 via the network N and transmits the image data to a designated mail address.

The information processing apparatus 40 is a PC (personal computer) in which a Web browser is mounted, a smartphone, a tablet terminal, or the like.

The structure of the image processing system 1 illustrated in FIG. 1 is an example, and another configuration may be used. For example, the image processing apparatus 10 is not limited to a multifunction-type machine. For example, the image processing apparatus 10 may be a digital camera, a printing device, a scanner device, a copier, a projector, a facsimile, an electronic conference terminal, an electronic blackboard device, or the like. That is, the image processing apparatus 10 may be an electronic apparatus that performs at least one of an input and an output of data with the Web server 20. For example, the image processing system 1 may not include the information processing apparatus 40.

<Example of Hardware Structure of Image Processing Apparatus 10>

Next, the hardware structure of the image processing apparatus 10 according to the embodiment will be described with reference to FIG. 2.

Figure 2:
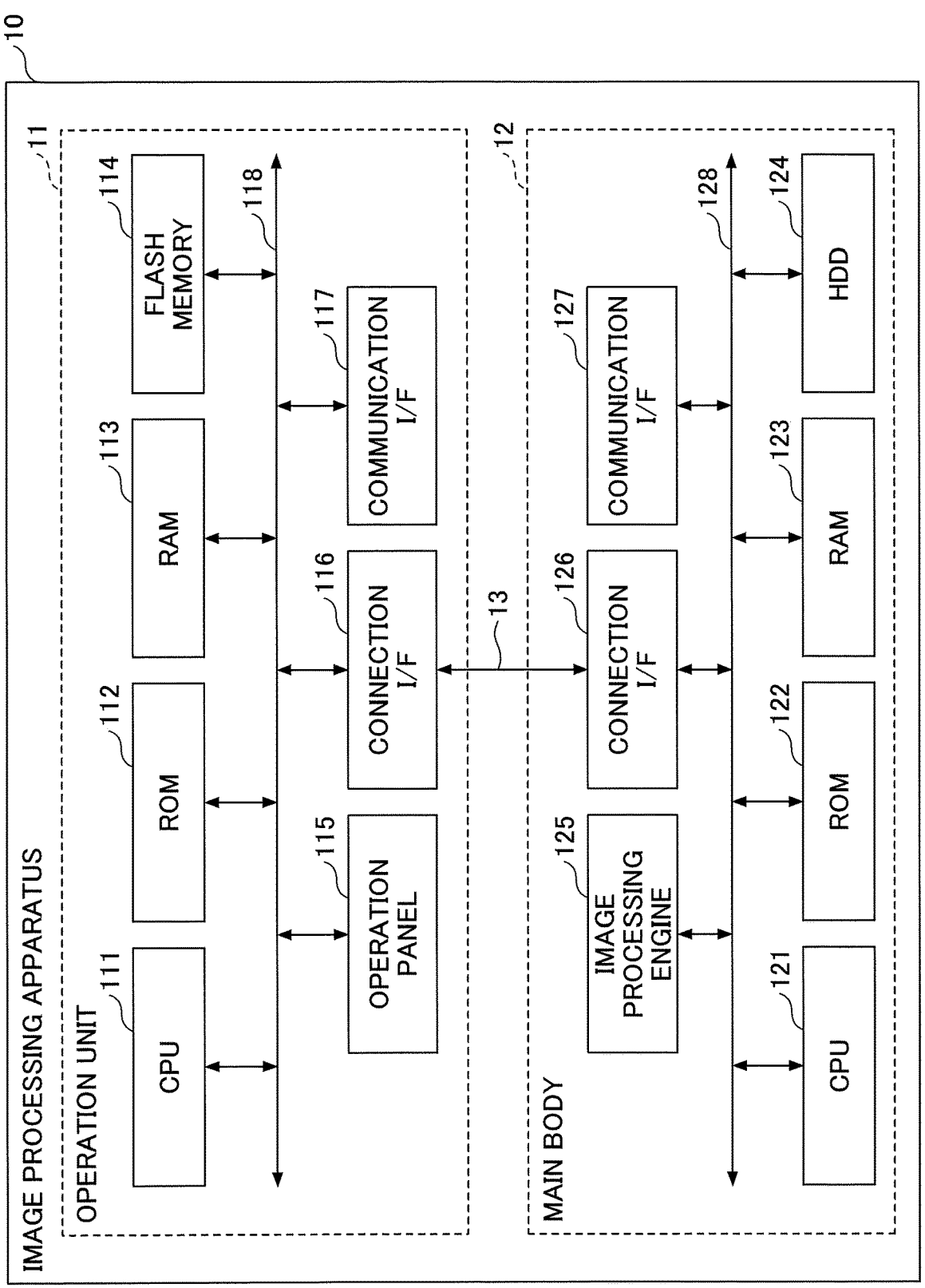
FIG. 2 is a diagram illustrating an example of a hardware structure of an image processing apparatus according to the embodiment.

FIG. 2 is a diagram illustrating an example of the hardware structure of the image processing apparatus 10 according to the embodiment.

As illustrated in FIG. 2, the image processing apparatus 10 according to the embodiment includes an operation unit 11 and a main body 12.

The operation unit 11 is used when the user performs various operations such as selecting the image processing function to be executed by the main body 12, inputting various setting values for executing the image processing function, inputting an instruction for executing the image processing function to start execution, switching the display screen, etc.

The main body 12 performs various processes such as executing an image processing function in accordance with various operations of the user in the operation unit 11.

As illustrated in FIG. 2, the operation unit 11 of the image processing apparatus 10 includes a CPU (central processing unit) 111, a ROM (read only memory) 112, and a RAM (random access memory) 113. Each of hardware in this is interconnected via a bus 118.

The CPU 111 is an arithmetic processing unit that controls the entire operation unit 11 by executing various programs stored in the ROM 112 or the flash memory 114 as the work area of the RAM 113.

ROM 112 is a non-volatile semiconductor memory (the storage device) that can hold data even when the power is turned off. The RAM 113 is a volatile semiconductor memory (the storage device) that temporarily holds program and data.

The flash memory 114 is a non-volatile storage device and stores various programs executed by the CPU 111 (for example, programs substantialized by the embodiment) and various data.

An operation panel 115 is used by the user to perform various operations. The operation panel 115 displays various screens or the like to the user.

The connection I/F 116 is an interface for communicating with the main body 12 through the communication line 13. For example, the interface of the USB (Universal Serial Bus) standard is used for the connection I/F 116.

A communication I/F (interface) 117 is an interface for communicating with another apparatus. For example, Wi-Fi wireless LAN (Local Area Network) is used for communication I/F 117.

Similarly, the main body 12 of the image processing apparatus 10 includes a CPU 121, a ROM 122, and a RAM 123. The main body 12 includes an HDD (Hard Disk Drive) 124, an image processing engine 125, a connection I/F 126, and a communication I/F 127. Each of these hardware is interconnected via a bus 128.

The CPU 121 is an arithmetic processing unit that controls the entire main body 12 by executing various programs stored in the ROM 122 or the HDD 124 using the RAM 123 as a work area.

The ROM 122 is a non-volatile semiconductor memory (memory device) that can hold data even when the power is turned off. The RAM 123 is a volatile semiconductor memory (memory device) that temporarily holds program and data.

The HDD 124 is a non-volatile storage device and stores various programs executed by the CPU 121 (for example, programs substantialized by the embodiment) and various data.

The image processing engine 125 is hardware that performs image processing for substantializing various image processing functions such as a print function, a scan function, a copy function, and a fax function.

The image processing engine 125 includes, for example, a plotter for printing onto a sheet of paper or the like, a scanner for optically reading an original manuscript to generate image data, and a fax communication device for performing fax communication. An image processing engine 125 may include, for example, a finisher for sorting the printed sheet material or an ADF (automatic document feeder) for automatically feeding the document.

The connection I/F 126 is an interface for communicating with the operation unit 11 through the communication line 13. For example, a USB interface is used for the connection I/F 126.

The communication I/F 127 is an interface for communicating with other devices. For example, a Wi-Fi wireless LAN is used for communication I/F 127.

The image processing apparatus 10 according to the embodiment has the hardware structure illustrated in FIG. 2, and various processes described later can be substantialized.

In FIG. 2, the configuration in which the image processing apparatus 10 has the operation unit 11 is illustrated as an example, but the present invention is not limited thereto. For example, an information processing apparatus such as a tablet terminal, a smartphone, a cellular phone, a PDA, or the like may function as an operation unit of the image processing apparatus 10. the differently, the information processing terminals may be able to control the image processing apparatus 10 by communicating with the image processing apparatus 10 through the communication I/F 117 of the operation unit 11 or the communication I/F 127 of the main body 12.

<Hierarchical Structure of Software Groups of Image Processor 10>

Figure 3:
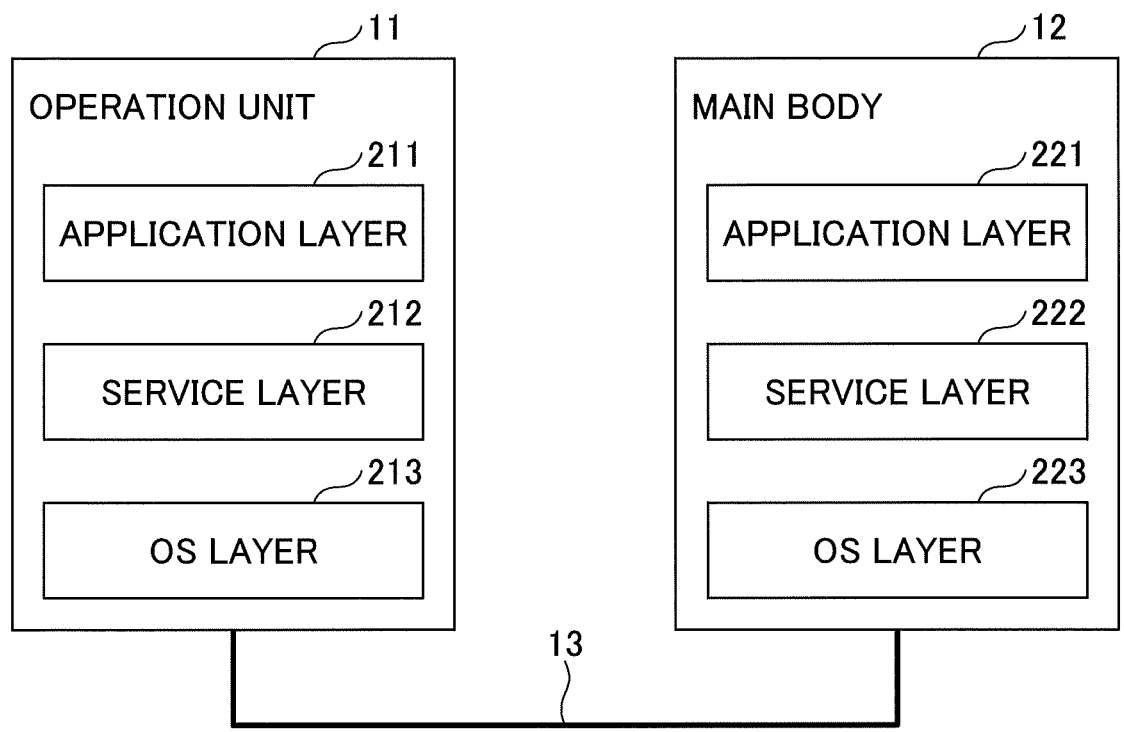
FIG. 3 is a diagram illustrating an example of a hierarchical configuration of a software group included in an operation unit and a main body of an image processing apparatus according to the embodiment.

Next, a hierarchical configuration of the software group included in the operation unit 11 and the main body 12 of the image processing apparatus 10 according to the embodiment will be described with reference to FIG. 3. FIG. 3 is a diagram illustrating an example of a hierarchical configuration of a software group included in the operation unit 11 and the main body 12 of the image processing apparatus 10 according to the embodiment.

FIG. 3 illustrates the hierarchical configuration of software groups included in the operation unit 11 and the hierarchical configuration of software groups included in the main body 12.

First, the hierarchical configuration of the software group included in the main body 12 (i.e., the program group stored in the ROM 122 or the HDD 124 of the main body 12) will be described. The software group included in the main body 12 can be broadly classified into an application layer 221, a service layer 222, and an OS layer 223.

The software classified into the application layer 221 is software for operating the hardware resources to substantialize the image processing function. This example includes a print application, a scan application, a copy application, and a fax application.

The software classified into a service layer 222 is the software interposed between an application layer 221 and an OS layer 223. The software serves as an interface through which the hardware resources provided by the main body 12 are utilized by the software of the application layer 221 and the status of the hardware resources provided by the main body 12 is notified.

Specifically, it accepts an execution request for hardware resource is received or the received execution request is arbitrated. The execution request received by the service layer 222 include, for example, an image processing request (such as a scan execution request by a scanner or a print execution request by a plotter) by the image processing engine 125.

The role of the software classified in the service layer 222 as the above described interface is the same for the application layer 211 of the operation unit 11. the differently, by causing the software classified into the application layer 211 of the operation unit 11 to access the service layer 222, the hardware resource of the main body 12 can be operated to substantialize the image processing function.

The software classified into the OS layer 223 is a program called the basic software (OS: Operating System) and provides a basic function for controlling the hardware resource of the main body 12. The software classified into the OS layer 223 receives the execution request for the hardware resources from the software classified into the application layer 221 via the software classified into the service layer 222 and performs the processing in conformity with the execution request.

Next, the hierarchical configuration of the software group (i.e., the program group stored in the ROM 112 or the flash memory 114 of the operation unit 11) included in the operation unit 11 will be described. Similar to the main body 12, the software group included in the operation unit 11 can be broadly classified into the application layer 211, the service layer 212, and the OS layer 213.

However, the functions provided by the software classified into the application layer 211 and the types of execution requests that the service layer 212 can receive are different from those of the main body 12. The software categorized into the application layer 211 of the operation unit 11 primarily provides a user interface function for performing various operations and displays.

In the embodiment, the OS operates independently of the operation unit 11 and the main body 12. Further, if the operation unit 11 and the main body 12 are capable of communicating with each other, the OS may not be the same type. For example, the operation unit 11 may use Android ("Android" is a registered trademark) for the OS, while the main body 12 may use Linux ("Linux" is a registered trademark) for the OS.

As described above, the image processing apparatus 10 according to this embodiment is controlled by a different OS between the operation unit 11 and the main body 12. For this reason, communications between the operation unit 11 and the main body 12 are not performed as process communications within one device, but as communications between different information processing apparatuses.

However, the image processing apparatus 10 according to the embodiment is not limited to the case in which a different type of OS is operated in the operation unit 11 and the main body 12, and the same type of OS may be operated in the operation unit 11 and the main body 12. The image processing apparatus 10 according to the embodiment is not limited to the case where the OS is operated independently by the operation unit 11 and the main body 12. A single OS may be operated on the operation unit 11 and the main body 12.

<Example of Hardware Structure of Information Processing Apparatus 40>

Figure 4:
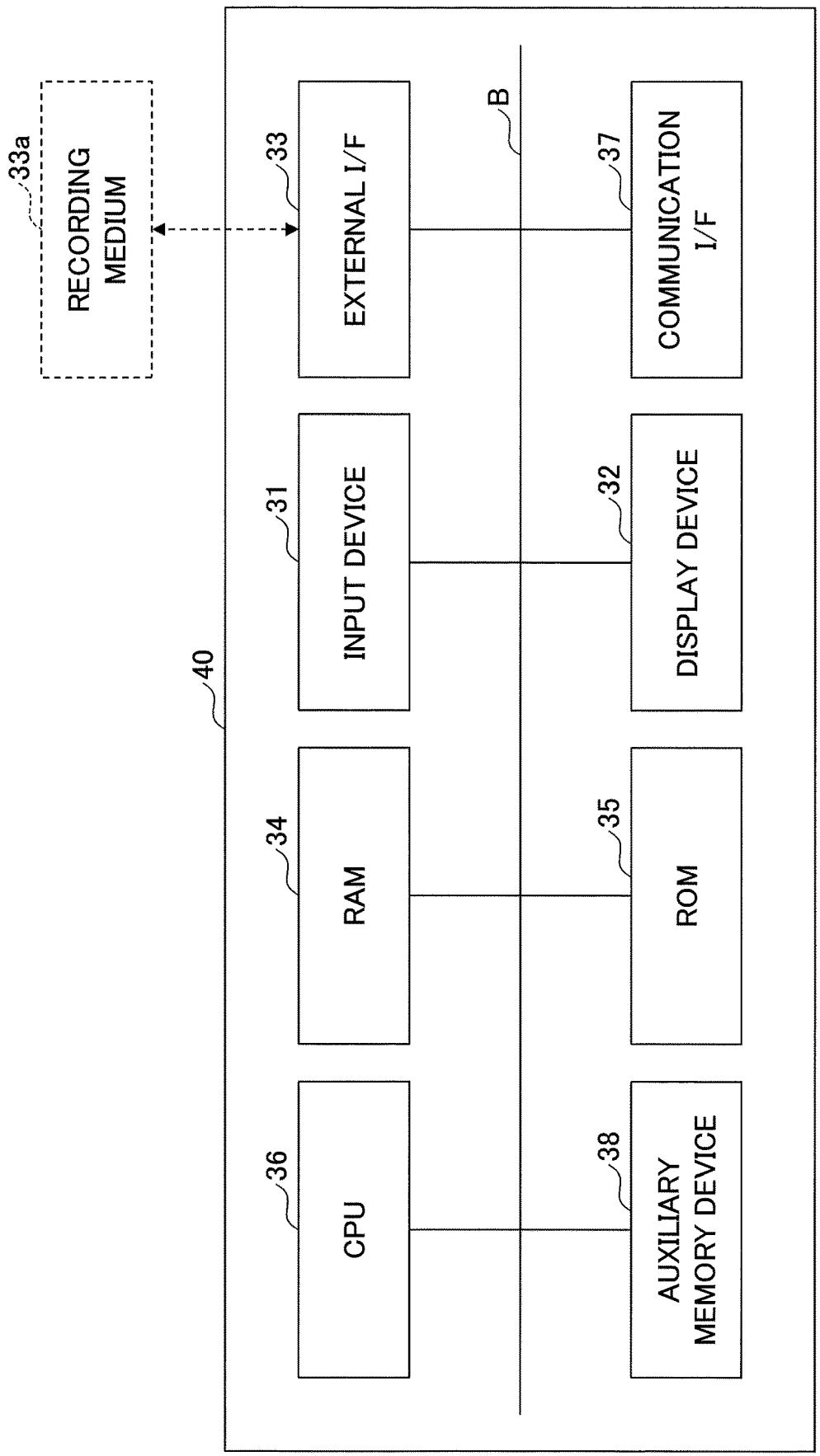
FIG. 4 is a diagram illustrating an example of a hardware structure of an information processing apparatus according to the embodiment.

Next, the hardware structure of the information processing apparatus 40 according to the embodiment will be described with reference to FIG. 4. FIG. 4 is a diagram illustrating an example of the hardware structure of the information processing apparatus 40 according to the embodiment.

As illustrated in FIG. 4, the information processing apparatus 40 includes an input device 31, a display device 32, an external I/F 33, a RAM 34, a ROM 35, a CPU 36, a communication I/F 37, and an auxiliary memory device 38. Each of these hardware is coupled via the bus B so as to be communicable.

The input device 31 may be, for example, a keyboard, a mouse, a touch panel, or the like, and is used by a user to input various operations. The display device 32 is, for example, a display and displays the processing results of the information processing apparatus 40.

The external I/F 33 is an interface with an external apparatus. The external apparatus includes a recording medium 33a or the like. The information processing apparatus 40 can read and write the recording medium 33a or the like through the external I/F 33.

The recording medium 33a includes, for example, a flexible disk, a CD (Compact Disc), a DVD (Digital Versatile Disk), an SD memory card (Secure Digital Memory Card), a USB (Universal Serial Bus) memory card, and the like.

The RAM 34 is a volatile semiconductor memory that temporarily holds a program and data. The ROM 35 is a non-volatile semiconductor memory that holds a program and data even when the power is turned off. For example, the OS setting and the network setting are stored in the ROM 35.

The CPU 36 is an arithmetic device which reads out the program and data from the ROM 35, the auxiliary memory device 38, or the like to the RAM 34 and executes processing.

The communication I/F 37 is an interface for connecting the information processing apparatus 40 to the network N. The auxiliary memory device 38 is, for example, an HDD or an SSD, and is a non-volatile storage device that stores the program and data. The program and data stored in the auxiliary memory device 38 include, for example, an OS and an application program that implements various functions on the operating system.

<Example of Software Configuration>

Figure 5:
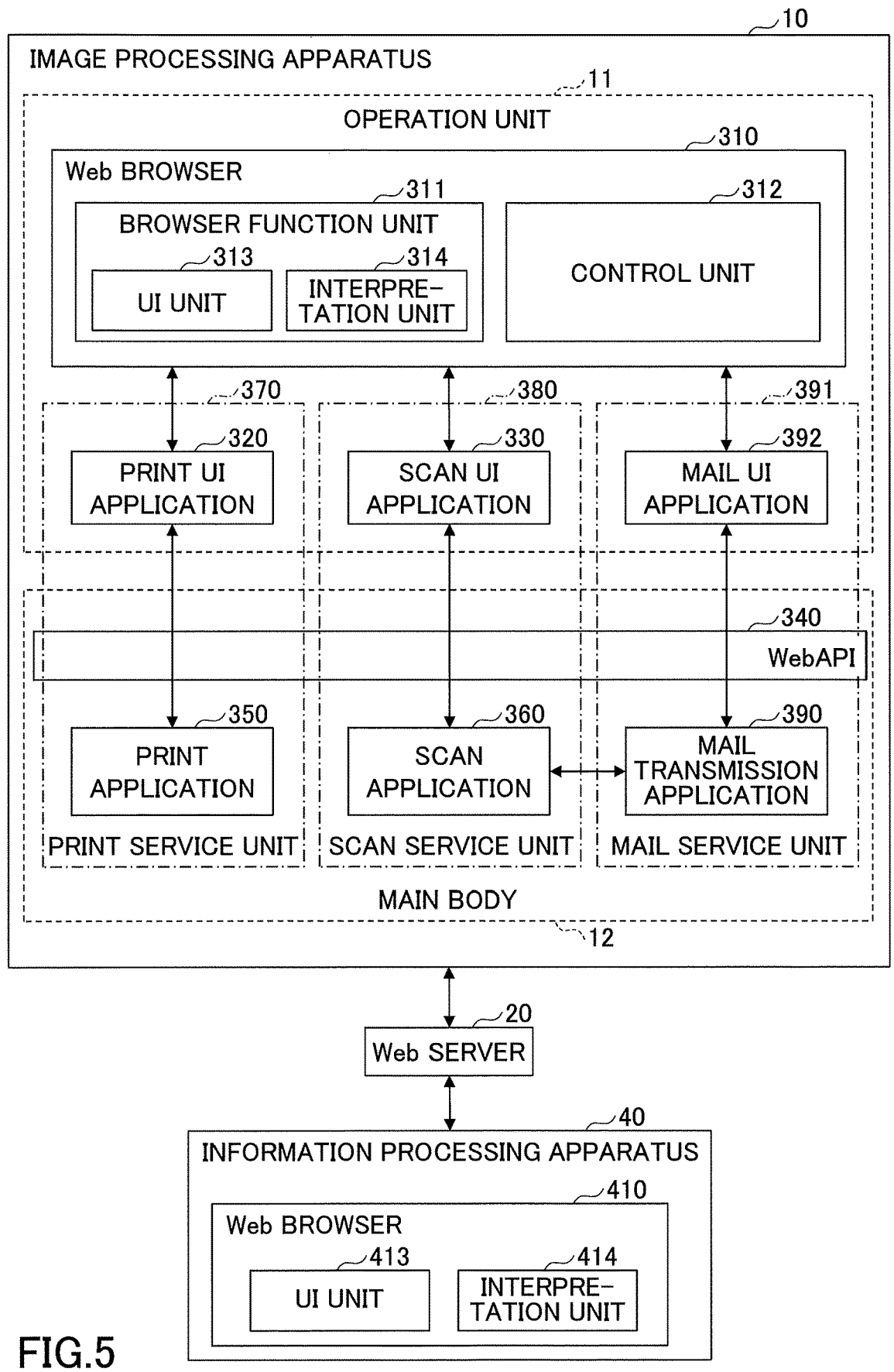
FIG. 5 is a diagram illustrating an example of a software configuration of an image processing system according to the embodiment.

Next, the software configuration of the image processing apparatus 10 and the information processing apparatus 40 included in the image processing system 1 according to the embodiment will be described with reference to FIG. 5. FIG. 5 is a diagram illustrating an example of the software configuration of the image processing system 1 according to the embodiment.

<<Image Processing Apparatus 10>>

As illustrated in FIG. 5, the operation unit 11 of the image processing apparatus 10 according to the embodiment includes a Web browser 310, a print UI application 320, a scan UI application 330, and a mail UI application 392. The Web browser 310, the print UI application 320, the scan UI application 330, and the mail UI application 392 are executed by the CPU 111.

The main body 12 of the image processing apparatus 10 according to the embodiment includes a WebAPI 340, a print application 350, a scan application 360, and a mail transmission application 390. The WebAPI 340, the print application 350, the scan application 360, and the mail transmission application 390 are executed by the CPU 121.

The Web browser 310 substantializes a Web application by acquiring Web contents (for example, HTML, CSS (Cascading Style Sheets), JavaScript, various electronic files, etc.) from the Web server 20.

For example, the Web browser 310 acquires Web contents from the Web server 20 that provides SNS and substantializes a Web application for viewing the SNS and sharing files on the SNS. For example, the Web browser 310 acquires Web contents from the Web server 20 which provides the cloud storage service and substantializes a Web application for viewing a storage and uploading files to the storage.

In general, the Web application is substantialized by operating the contents such as JavaScript obtained from the Web server 20 on the Web browser 310 and performing the processing in collaboration with the Web server 20.

Web browser 310 includes a browser function unit 311 and a control unit 312. Hereafter, the Web contents are also simply referred to as "contents".

The browser function unit 311 interprets and displays the contents. The browser function unit 311 includes a UI unit 313 and an interpretation unit 314. When the link is depressed on the Web page displayed by the UI unit 313, the interpretation unit 314 interprets the HTML tag corresponding to the link and notifies the control unit 312 according to the interpretation result.

The UI unit 313 displays a Web page or the like according to the contents acquired from the Web server 20. The UI unit 313 receives various operations (for example, depressing a link) of a user on a Web page. For example, the browser function unit 311 may be implemented using a Web View or the like.

The control unit 312 performs a control for executing the image processing function of the image processing apparatus 10 in response to a notification from the interpretation unit 314 of the browser function unit 311. For example, when the download notification indicating that the contents of the linked destination is downloaded from the Web server 20 is received from the interpretation unit 314, the control unit 312 performs a control for downloading and printing the contents. For example, even when the display notification indicating that the contents of the linked destination is displayed is received from the interpretation unit 314, when the contents are in a predetermined format (for example, JPEG format), the control unit 312 performs a control of downloading and printing the contents.

Because the Web browser 310 includes a browser function unit 311 for implementing the Web application and a control unit 312 for controlling the image processing function of the image processing apparatus 10, the Web browser 310 may be called a hybrid application. The Web browser 310 is implemented in a programming language such as, for example, Java ("Java" is a registered trademark). That is, the browser application constituting the Web browser 310 is made with a Java application program. The Java application uses the API provided by the operation unit 11 to call the browser function unit 311 (for example, WebView) provided by the operation unit 11, thereby constituting the Web browser 310 including the interpretation unit 314 and the UI unit 313. The underlying Java application program includes the control unit 312, which provides flexibility in the operation after Web contents interpretation so that the control unit 312 can request not only the operation (download and upload) possible with general purpose HTML but also the image processing operation (print, scan, and mail transmission).

A print UI application 320 is an application program that provides a UI (user interface) for printing. The print UI application 320 displays, for example, a screen indicating that printing is in progress or a screen indicating that printing has been completed.

The print UI application 320 requests the print application 350 to execute the print through the WebAPI 340 in response to a request from the control unit 312.

The scan UI application 330 is an application program that provides a UI for the scan. For example, the scan UI application 330 displays a screen indicating that the scan is in progress, a screen indicating that the scan has been completed, a screen indicating that mail transmission of image data generated by the scan is in progress, a screen indicating that mail transmission has been completed, or the like.

The scan UI application 330 requests the scan application 360 to execute a scan and transmit the image data generated by the scan through the WebAPI 340 in response to a request from the control unit 312.

The mail UI application 392 is an application program that provides a UI for mail. The mail UI application 392 displays, for example, a screen indicating that mail transmission and reception are in progress or a screen indicating that mail transmission and reception have been completed.

The WebAPI 340 is an API (Application Programming Interface) for requesting that the print UI application 320, the scan UI application 330, and the mail UI application 392 perform image processing.

The print application 350 controls the image processing engine 125 to perform the print on request from the print UI application 320.

The scan application 360 controls the image processing engine 125 to perform the scan in response to a request from the scan UI application 330. The scan application 360 requests the mail transmission application 390 to send the image data generated by the scan to the mail transmission application 390.

The mail transmission application 390 controls the image processing engine 125 to perform mail transmitting in response to a request from the scan application 360.

Hereinafter, the print UI application 320, the WebAPI 340, and the print application 350 are referred to as the "print service unit 370". The scan UI application 330, the WebAPI 340, and the scan application 360 are referred to as a "scan service unit 380". The mail UI application 392, the WebAPI 340, and the mail transmission application 390 are referred to as the "mail service unit 391".

For example, the operation unit 11 may include an application that provides a UI related to a copy, an application that provides a UI related to a fax, an application that provides a UI related to an OCR (Optical Character Recognition), or the like. The main body 12 may include, for example, an application that executes a copy, an application that executes a fax, an application that executes an OCR, or the like. Accordingly, the image processing apparatus 10 may include various image processing service units, for example, a copy service unit, a fax service unit, and an OCR service unit.

Further, in addition to the image processing service unit, the image processing apparatus 10 includes an address book service unit that performs processing related to an address book held by the image processing apparatus 10, an authentication service unit that performs processing related to authentication for a user to use the image processing apparatus 10, and the like.

<<Information Processing Apparatus 40>>

As illustrated in FIG. 5, the information processing apparatus 40 according to the embodiment includes a Web browser 410. Web browser 410 is executed by CPU 36.

The Web browser 410 includes a UI unit 413 and an interpretation unit 414. The UI unit 413 displays a Web page or the like according to the contents acquired from the Web server 20. The UI unit 413 receives various operations (for example, link depressing) of the user on the Web page.

When the link is depressed on the Web page displayed by the UI unit 413, the interpretation unit 414 interprets the HTML corresponding to the link and notifies the UI unit 413 according to the interpretation result.

<Comparison of Operation of Image Processing Apparatus 10 and Information Processing Apparatus 40>

The UI unit 413 of the Web browser 410 mounted in the information processing apparatus 40 receives, for example, the link depressing operation when a link depressing operation of depressing a link is performed by a user on the Web page. Next, the interpretation unit 414 interprets the HTML tag (a-tag (anchor tag)) of the link for which the link depressing operation is performed and notifies the UI unit 413 according to the interpretation result (the display notification or the download notification). For example, if the file designated by the attribute "href" of the a-tag is a file that can be displayed by the Web browser 410 (for example, if the extension is html, img, pdf, etc.), the display notification is performed. On the other hand, for example, when the file designated by the attribute "href" of the a-tag is a file that cannot be displayed by the Web browser 410 (for example, when the extension is zip, etc.), the download notification is performed. However, for example, if the file extension of the file designated by the attribute "href" of the a-tag is the file extension of the file that can be displayed by the Web browser 410 such as pdf, and the attribute "download" is designated, the download notification is performed.

The UI unit 413 of the Web browser 410 displays a file when a display notification is received. On the other hand, the UI unit 413 of the Web browser 410 displays a screen for downloading a file (for example, a screen for a user to select a start or cancel a download) when a download notification is received.

On the other hand, the UI unit 313 of the Web browser 310 mounted in the image processing apparatus 10 receives the link depressing operation when the link depressing operation is performed by a user on the Web page, for example. Next, the interpretation unit 314 interprets the HTML tag (a-tag (anchor tag)) of the link for which the link depressing operation is performed and notifies the control unit 312 according to the interpretation result (display notification or download). Similar to the information processing apparatus 40, for example, when the file designated as the attribute "href" of the a-tag is a file that can be displayed by the Web browser 310 (for example, when the extension is html, img, pdf, or the like), the display notification is performed. On the other hand, for example, when the file designated by an attribute "href" of the a-tag is a file that cannot be displayed by the Web browser 310 (for example, when the extension is zip, etc.), the download notification is performed.

When the download notification is received, the control unit 312 determines whether the downloaded file is printable. When the downloaded file is printable, the control unit 312 downloads the file and controls the downloaded file for printing. Meanwhile, when the display notification is received, the control unit 312 determines whether the file to be displayed is printable. When the file is printable, the control unit 312 downloads the file and performs a control of printing the downloaded file.

As described above, the Web browser 310 mounted to the image processing apparatus 10 performs a control of printing a file to be downloaded or to be interpreted as a display target by the Web browser 410 of the information processing apparatus 40 when the file is printable. Accordingly, the image processing apparatus 10 can download and print contents using a Web application using a general purpose HTML.

The UI unit 413 of the Web browser 410 installed in the information processing apparatus 40 receives, for example, the link depressing operation when the link depressing operation is performed by the user on the Web page. Next, the interpretation unit 414 interprets the HTML tag (a-tag (anchor tag)) of the link for which the link depressing operation is performed and notifies the UI unit 413 according to the interpretation result (a mail transmission notification). This mail transmission notification causes the e-mail to be transmitted to the e-mail address designated by the scheme "mail to" in the attribute "href" of the a-tag.

The UI unit 413 of the Web browser 410 starts the mail software and displays the new mail creation screen in which the designated e-mail address is input in the destination field when the mail transmission notification is received.

On the other hand, the UI unit 313 of the Web browser 310 installed in the image processing apparatus 10 receives the link depressing operation when the link depressing operation is performed by the user on the Web page, for example. Next, the interpretation unit 314 interprets the HTML tag (a-tag (anchor tag)) of the link for which the link depressing operation is performed and notifies the control unit 312 according to the interpretation result (mail transmission notification). This mail transmission notification causes the image data generated by scanning to be transmitted to the e-mail address designated by the scheme "mail to" in the attribute "href" of the a-tag.

When the mail transmission notification is received, the control unit 312 controls the generation of the image data by scanning and transmits the generated image data to the designated e-mail address.

As described above, the Web browser 310 installed in the image processing apparatus 10 transmits image data generated by scanning to an e-mail address that is interpreted as a destination for transmitting mail by the Web browser 410 of the information processing apparatus 40. Accordingly, the image processing apparatus 10 can generate image data and send mail through a Web application using a general purpose HTML.

<Details of Processing>

Next, the processing of the image processing system 1 according to the embodiment will be described in detail.

Example 1

Figure 6:
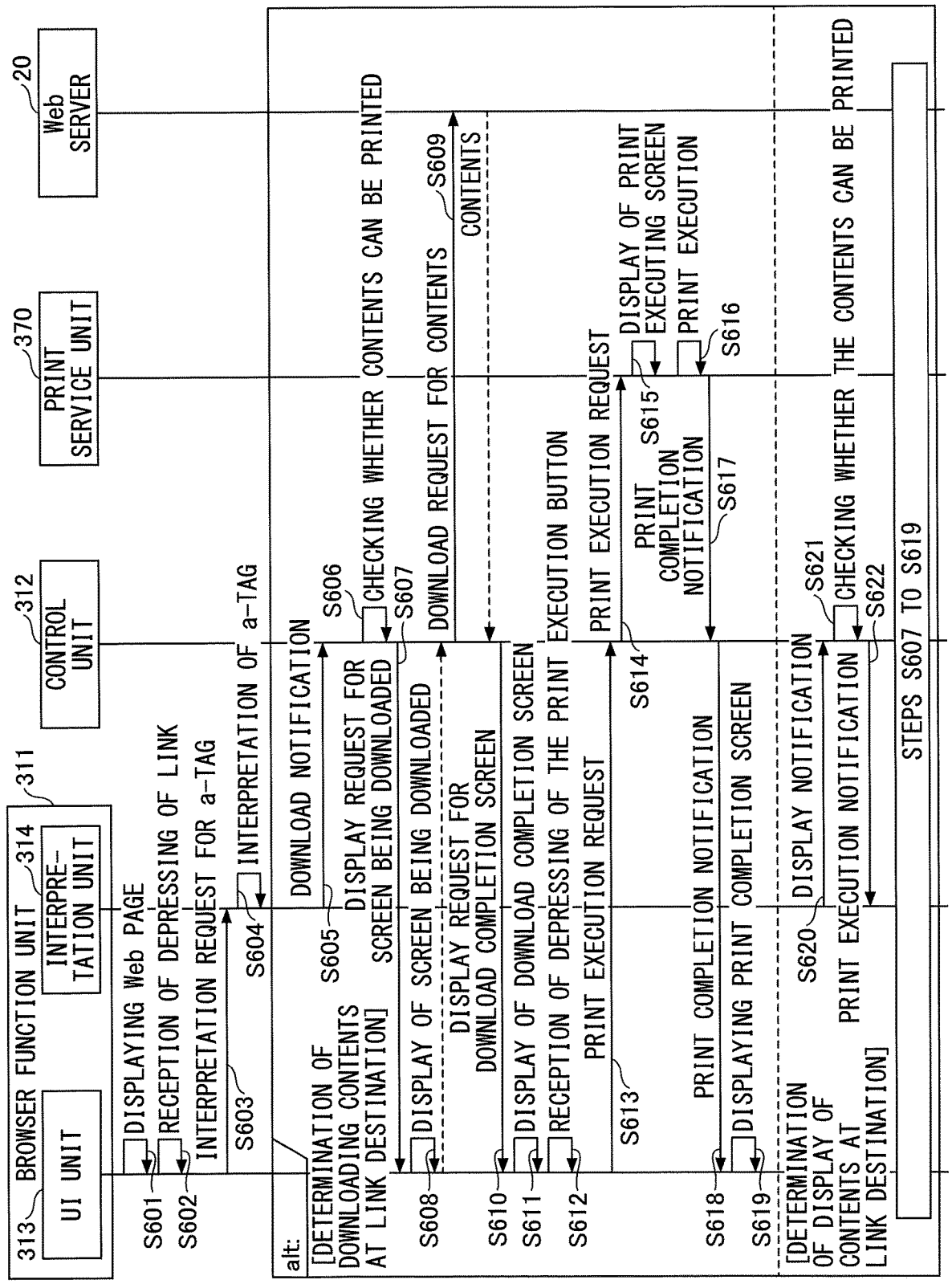
FIG. 6 is a sequence diagram illustrating an example of a print process according to the embodiment.

Hereinafter, the process of downloading and printing the contents from the Web server 20 by the Web application using the general purpose HTML using the image processing apparatus 10 will be described with reference to FIG. 6. FIG. 6 is a sequence diagram illustrating an example of a print process according to the embodiment.

Figure 7:
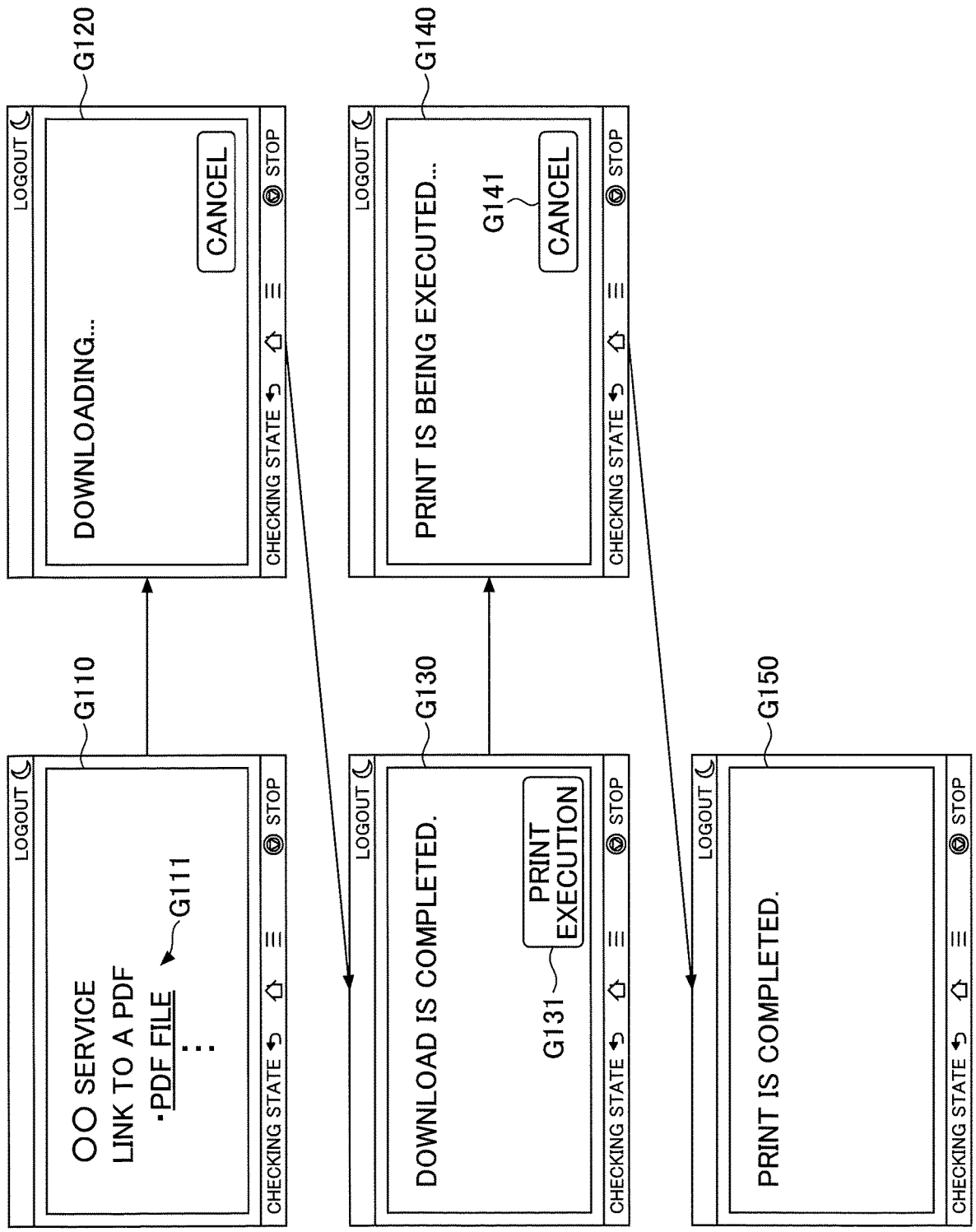
FIG. 7 is a diagram illustrating an example of a screen transition in a print process.

First, in step S601, the UI unit 313 of the browser function unit 311 displays the Web page G110 illustrated in FIG. 7. The Web page G110 illustrated in FIG. 7 is displayed when the interpretation unit 314 interprets the contents (HTML, CSS, JavaScript, or the like) acquired from the Web server 20. Such contents can be acquired, for example, by entering a URL (Uniform Resource Locator) for displaying Web page G110 or by clicking a link to the URL.

The Web page G110 illustrated in FIG. 7 includes a link G111 to a PDF (Portable Document Format) file stored in the Web server 20. Here, it is assumed that the user depresses the link G111.

In step S602, the UI unit 313 of the browser function unit 311 receives a depress of the link G111 by the user. Here, the link G111 included in the Web page G110 illustrated in FIG. 7 is substantialized by the a-tag (anchor tag) having an attribute "href", an attribute "download", an attribute "type", or the like as illustrated in FIG. 8. The attribute "href" of the a-tag illustrated in FIG. 8 designates the URL (the scheme is "http") to which the PDF file having a file name "file.pdf" is stored, depending on the relative path. In addition, various other attributes may be set to the a-tag.

In step S603, the UI unit 313 of the browser function unit 311 transmits the interpretation request of the a-tag that substantializes the link G111 depressed by the user to the interpretation unit 314.

In step S604, the interpretation unit 314 of the browser function unit 311 interprets the a-tag that substantializes the link G111. That is, by interpreting the a-tag, the interpretation unit 314 determines whether the linked target contents designated as the attribute "href" of the a-tag is the contents displayed on the Web browser 310 or the contents to be downloaded.

Whether the linked target contents designated as the attribute "href" of the a-tag is the contents displayed on the Web browser 310 or the contents to be downloaded is determined by using the extension of the contents at the link destination designated in the attribute "href".

On the other hand, for example, when the extension is "pdf", "doc", "xls", "zip" or the like, the corresponding contents are determined to be downloaded. Whether to display or download the Web browser 310 is defined, for example, in a setup file of the Web browser 310 for each extension. It is possible to set whether to download or display with respect to individual extensions such as "jpeg" to be downloaded.

In step S605, when it is determined in step S604 that the contents are to be downloaded, the interpretation unit 314 of the browser function unit 311 transmits the download notification to the control unit 312. As an example of the download API for causing the apparatus having the browser to execute the download, for example, the interpretation unit 314 can perform the download notification by calling on DownloadStart. In this case, an argument on Download Start is designated as the URL designated by the attribute "href" and the MIME type designated by the attribute "type". The on DwonloadStart is one of the APIs (the operation unit APIs and the operation unit APIs) provided by the operation unit 11.

In step S606, the control unit 312 checks whether the contents to be downloaded (that is, the contents at the link destination designated as the attribute "href") can be printed.

Whether the contents to be downloaded can be printed is determined by, for example, the MIME type designated in the attribute "type", the extension of the contents, or the like. For example, when the MIME type designated in the attribute "type" is "application/pdf", "application/msword", "application/msexcel", etc., it is determined that printing is possible. On the other hand, for example, when the MIME type designated by the attribute "type" is "application/zip", etc. (that is, when the contents are compressed), it is determined that printing is not possible. In addition, when, for example, the contents to be downloaded are encrypted, printing is determined not to be possible.

However, for example, when the contents are compressed, the contents may be downloaded and decompressed, and it may be checked whether the contents after decompression can be printed. At this time, when the contents after decompression is not printable, for example, an error screen or the like may be displayed on the Web browser 310. When the decompressed contents are not printable, for example, a video file (e.g., ".mp4" as an extension) or an audio file (e.g., ".mp3" as an extension) in which the decompressed contents are encrypted may be included.

The MIME type is designated, for example, in the argument on Download Start. The contents extension can also be designated, for example, from the URL designated in the argument on Download Start.

In the following, the contents to be downloaded is determined to be printable in step S606. When it is determined in step S606 above that the contents to be downloaded is not printable, for example, the control unit 312 returns the download permission notification to the interpretation unit 314. Therefore, for example, a dialog for specifying a storage destination to a user is displayed, and the contents are downloaded from the Web server 20 by the browser function unit 311.

However, when it is determined that the contents to be downloaded are not printable because the contents are compressed or encrypted, it may be determined whether the contents after decompression or the decoded contents are printable or not. At this time, the control unit 312 may decompress or decode the contents, or the external server or the like may be requested. The user may perform a start operation to start decompression of the content, a password input operation used for decompression, or the like.

Accordingly, when the decompressed contents or the decoded contents can be printed, step S607 to step S619, which will be described later, are performed.

In step S607, when it is determined that the contents to be downloaded can be printed, the control unit 312 transmits the display request of the screen being downloaded to the UI unit 313.

In step S608, when the UI unit 313 of the browser function unit 311 receives the display request of the screen being downloaded, for example, the screen G120 being downloaded is displayed. When the screen G120 in the process of downloading illustrated in FIG. 7 is displayed, the user can know that the contents are in the process of downloading.

In step S609, the control unit 312 transmits the download request of the contents to be downloaded (that is, the contents at the link destination designated as the attribute "href" of the a-tag) to the Web server 20. This allows the contents to be downloaded from the Web server 20. The contents downloaded from the Web server 20 is stored, for example, in a predefined storage area in the flash memory 114.

For example, the control unit 312 may add a user ID that identifies a user of the image processing apparatus 10 to the downloaded contents. For example, the control unit 312 may add information representing the print setting to the downloaded contents.

In step S610, when the contents are downloaded from the Web server 20, the control unit 312 transmits a display request of the download completion screen to the UI unit 313.

In step S611, when the UI unit 313 of the browser function unit 311 receives the display request of the download completion screen, for example, the download completion screen G130 illustrated in FIG. 7 is displayed. When the download completion screen G130 illustrated in FIG. 7 is displayed, the user can know that the download of the contents are completed.

The download completion screen G130 illustrated in FIG. 7 includes a print execution button G131. The user can start printing the downloaded contents by clicking the print execution button G131. Here, it is assumed that the user depresses the print run button G131.

In step S612, the UI unit 313 of the browser function unit 311 receives the depressing of the print execution button G131 by the user. When the print execution button G131 is not depressed (or when the cancel button G141, which will be described later, is depressed), the downloaded contents may be deleted or stored in the image processing apparatus 10.

In step S613, the UI unit 313 of the browser function unit 311 transmits the request for printing the downloaded contents to the control unit 312.

In step S614, when the control unit 312 receives the print execution request from the browser function unit 311, the control unit 312 transmits the print execution request to the print service unit 370. The print execution request includes information indicating the storage destination of the contents downloaded in step S609 above. The print execution request may include, for example, information representing a predetermined printing setting (i.e., information representing a default printing setting or information representing a printing setting determined by the control unit 312).

The control unit 312 may, for example, invoke the print UI application 320 of the print service unit 370 using intent as an example of the application coordination API for invoking other applications of the device. The intent is one of the APIs (the operation unit APIs and the operation unit APIs) provided by the operation unit 11. The called print UI application 320 may be used to display, for example, a print setting for performing an image processing function, a print execution button, during printing, a print cancellation, or the like.

In step S615, when the print service unit 370 receives the print execution request from the control unit 312, for example, the print execution screen G140 illustrated in FIG. 7 is displayed. The screen G140 during printing illustrated in FIG. 7 is displayed by the print UI application 320. When the screen G140 during printing illustrated in FIG. 7 is displayed, the user can know that the downloaded contents are being printed.

Next, in step S616, the print service unit 370 performs printing of the contents downloaded in step S609. The print execution can be done by the print UI application 320 transmitting a print request to the print application 350 via the WebAPI 340. This causes the contents downloaded from the Web server 20 to be printed.

A print-being-executed screen G140 illustrated in FIG. 7 includes a cancel button G141. When the cancel button G141 is depressed by the user, the print UI application 320 transmits a print stop request to the print application 350 via the WebAPI 340. This stops printing the downloaded contents.

Upon completion of printing, the print application 350 transmits a response to the print UI application 320. On the other hand, for example, when an error occurs during printing, the print application 350 transmits a notification indicating that an error has occurred to the print UI application 320. When the print UI application 320 receives a notification indicating that an error has occurred, for example, it displays a screen indicating that an error has occurred.

Next, when the print performed in step S616 is completed, the print service unit 370 transmits the print completion notification to the control unit 312 (step S617). The print completion notification is transmitted by the print UI application 320.

In step S618, when the control unit 312 receives the print completion notification from the print service unit 370, the control unit 312 transmits the print completion notification to the UI unit 313.

In step S619, the UI unit 313 of the browser function unit 311 displays the print completion screen G150 illustrated in FIG. 7 when the print completion notification is received.

When the print completion screen G150 illustrated in FIG. 7 is displayed, the user can know that the print of the contents are completed.

In step S605 to step S619, when it is determined in step S604 that the contents to be linked are the contents to be downloaded, the contents are printed.

Meanwhile, when the contents are determined to be displayed on the Web browser 310 in step S604, the interpretation unit 314 of the browser function unit 311 transmits the display notification to the control unit 312 (step S620). For example, the interpretation unit 314 can conduct the display notification by calling shoulddOverrideUrlLoading as an example of a screen updating API for updating a screen displayed in the UI of the browser. In this case, the URL designated in the attribute "href" is designated as the argument of shoulddOverrideUrlLoading. ShouldOverrideUrlLoading is one of the APIs (operation unit API) provided by the operation unit 11.

In step S621, the control unit 312 checks whether the contents to be displayed (that is, the contents to which the link is designated as the attribute "href") can be printed.

It is determined whether the contents to be displayed can be printed by, for example, an extension of the contents. For example, when the extension of the contents are "jpg", "jpeg", "tiff", or the like, printing is determined to be possible. On the other hand, for example, when the extension of the contents are "html" or "htm", printing is determined not to be possible.

However, for example, when the extension of the contents are "html" or "htm", the contents may be displayed on the Web browser 310 and a print execution button may be displayed. Accordingly, the user can print the contents (Web page) displayed on the Web browser 310 by clicking the print execution button.

For example, the contents extension can be designated from the URL designated in the argument of shoulddOverrideUrlLoading.

However, it is possible to determine whether the contents to be displayed is to be printed from the MIME type designated in the attribute "type". In this case, when the MIME type designated by the attribute "type" is "image/jpeg", "image/gif", and "image/png", etc., it is determined that the data can be printed. On the other hand, for example, when the MIME type designated in the attribute "type" is "text/html" or the like, it is determined that printing is not possible.

In the following, the contents to be displayed are determined to be printable in step S621. When it is determined in step S621 that the contents to be displayed are not printable, for example, the control unit 312 returns the display permission notification to the interpretation unit 314. Thus, for example, the browser function unit 311 acquires the contents from the Web server 20 and displays the contents on the Web browser 310.

In step S622, when it is determined that the contents to be displayed are printable, the control unit 312 transmits the print execution notification to the interpretation unit 314. Then, the image processing apparatus 10 executes step S607 to step S619. As described above, even when the link destination contents of the link depressed by the user are the contents to be displayed, for example, when the contents are image data in a JPEG format, the contents are printed.

As described above, the image processing apparatus 10 according to the embodiment can download and print the contents when the link substantialized by the a-tag, which is a general purpose HTML tag, is depressed by the user according to the type of the contents to which the link is made. As described above, in the image processing apparatus 10 according to the embodiment, the print function is substantiated without using a dedicated HTML tag for implementing the print function.

Therefore, for example, the developer of the Web application provided by the Web server 20 can develop a Web application that implements the image processing function specific for the image processing apparatus 10 without requiring knowledge of dedicated JavaScript or HTML.

Incidentally, the print process described in FIG. 6 can be substantiated by using PHP, for example, in addition to the case in which JavaScript or the like is used. For example, a PHP code as illustrated in FIG. 9 is created and stored on the Web server 20 under the name "dl.php" and is received by the Web browser 310 during HTML, for example, "a href=/dl.php">download</a>". Accordingly, when the user depresses the download link defined in this HTML, the "dl.php" is executed on the Web server 20, and the Web server 20 transmits an HTTP header indicating the download instruction to the Web browser 310.

In the case of the PHP code illustrated in FIG. 9, the HTTP header indicating the download instruction includes "Content-Type:application/force-download" and "Content-disposition:attachment; filename="myfile.pdf".

Therefore, in step S604 described above, it is determined that "myfile.pdf" is the contents downloaded by the interpretation unit 314 of the Web browser 310.

Another Example of First Embodiment, Part 1

Figure 10:
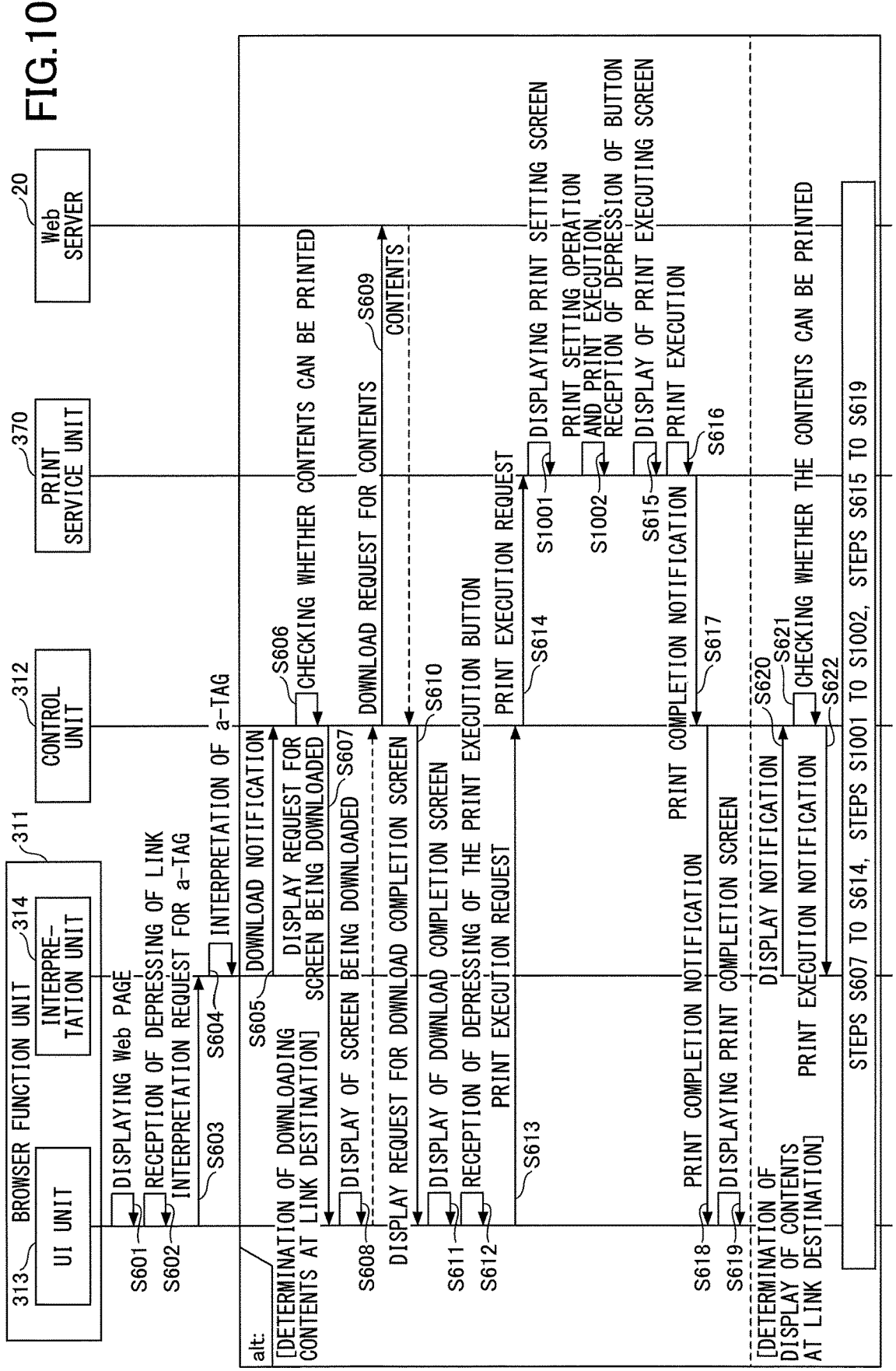
FIG. 10 is a sequence diagram illustrating another example of a print process according to the embodiment.

Next, another example (1) of the print process will be described with reference to FIG. 10. FIG. 10 is a sequence diagram illustrating another example (1) of a print process according to the embodiment. Because Steps S601 to S622 in FIG. 10 are the same as those in FIG. 6, the description thereof is omitted.

Figure 11:
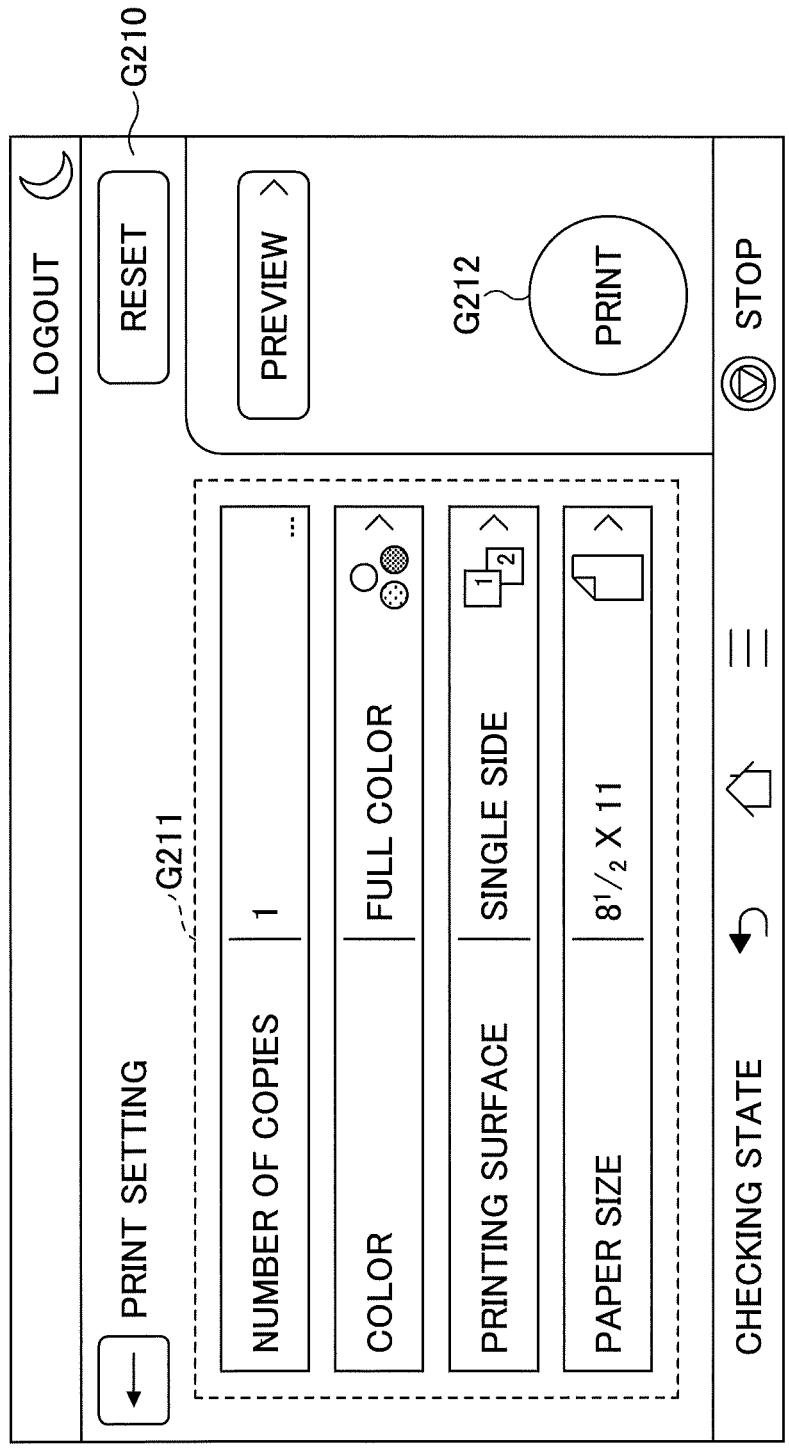
FIG. 11 is a diagram illustrating an example of a print setting screen.

Subsequent to step S614, when the print service unit 370 receives the print execution request from the browser function unit 311, in step S1001, for example, the print setting screen G210 illustrated in FIG. 11 is displayed. The print setting screen G210 illustrated in FIG. 11 is displayed by the print UI application 320.

The print setting screen G210 illustrated in FIG. 11 includes a print setting field G211 and a print execution button G212. The user can specify various print settings in the print setting field G211, such as "number of copies", "color", "printing surface", "paper size", and the like. Here, it is assumed that the user performs an operation to specify the print setting in the print setting field G211 (print setting operation) and then clicks the print execution button G212.

In step S1002, the print service unit 370 receives the user's depressing of the print setting operation and the print execution button G212. The print setting operation and the depressing of the print execution button G212 are accepted by the print UI application 320. Accordingly, in step S616, the contents are printed with the print setting designated by the user.

Another Example of First Embodiment, Part 2

Figure 12:
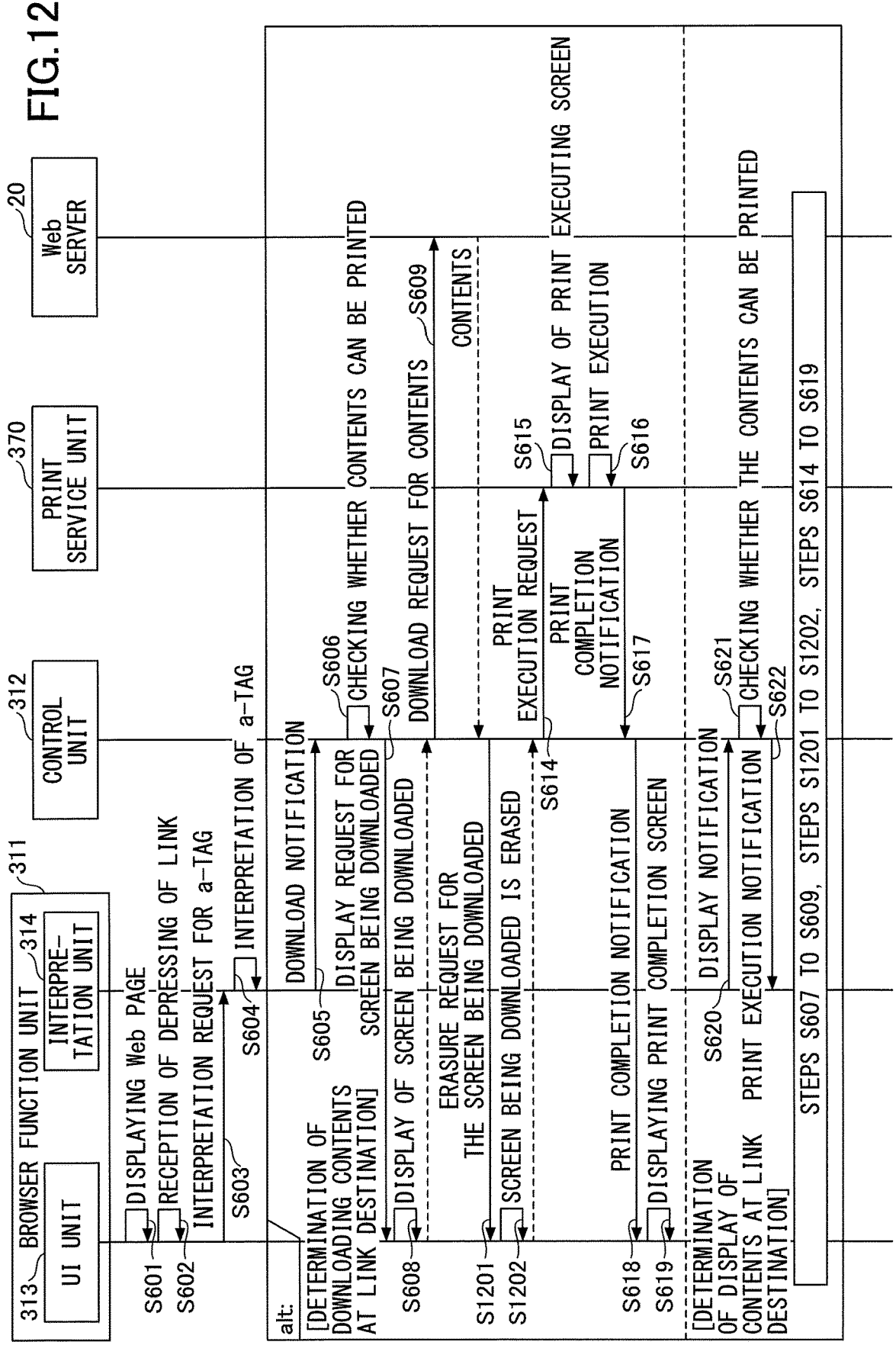
FIG. 12 is a sequence diagram illustrating another example of a print process according to the embodiment.

Next, another example (Part 2) of the print process will be described with reference to FIG. 12. FIG. 12 is a sequence diagram illustrating another example (Part 2) of a print process according to the embodiment.

In the print process illustrated in FIG. 12, step S610 to step S613 of FIG. 6 are not performed. That is, in the print process illustrated in FIG. 12, when the link substantialized by the a-tag is depressed by the user, the contents of the linked target are downloaded and printed without the depression by the user. Accordingly, the user can print the contents of the link destination by performing a single operation (a depressing operation of the link substantialized by the a-tag).

In the print process illustrated in FIG. 12, subsequent to step S609, the control unit 312 transmits an erasure request for the screen being downloaded to the UI unit 313 (step S1201). In step S1202, when the UI unit 313 receives the erasure request for the screen being downloaded, the screen G120 being downloaded is erased.

Another Example of First Embodiment, Part 3

Figure 13:
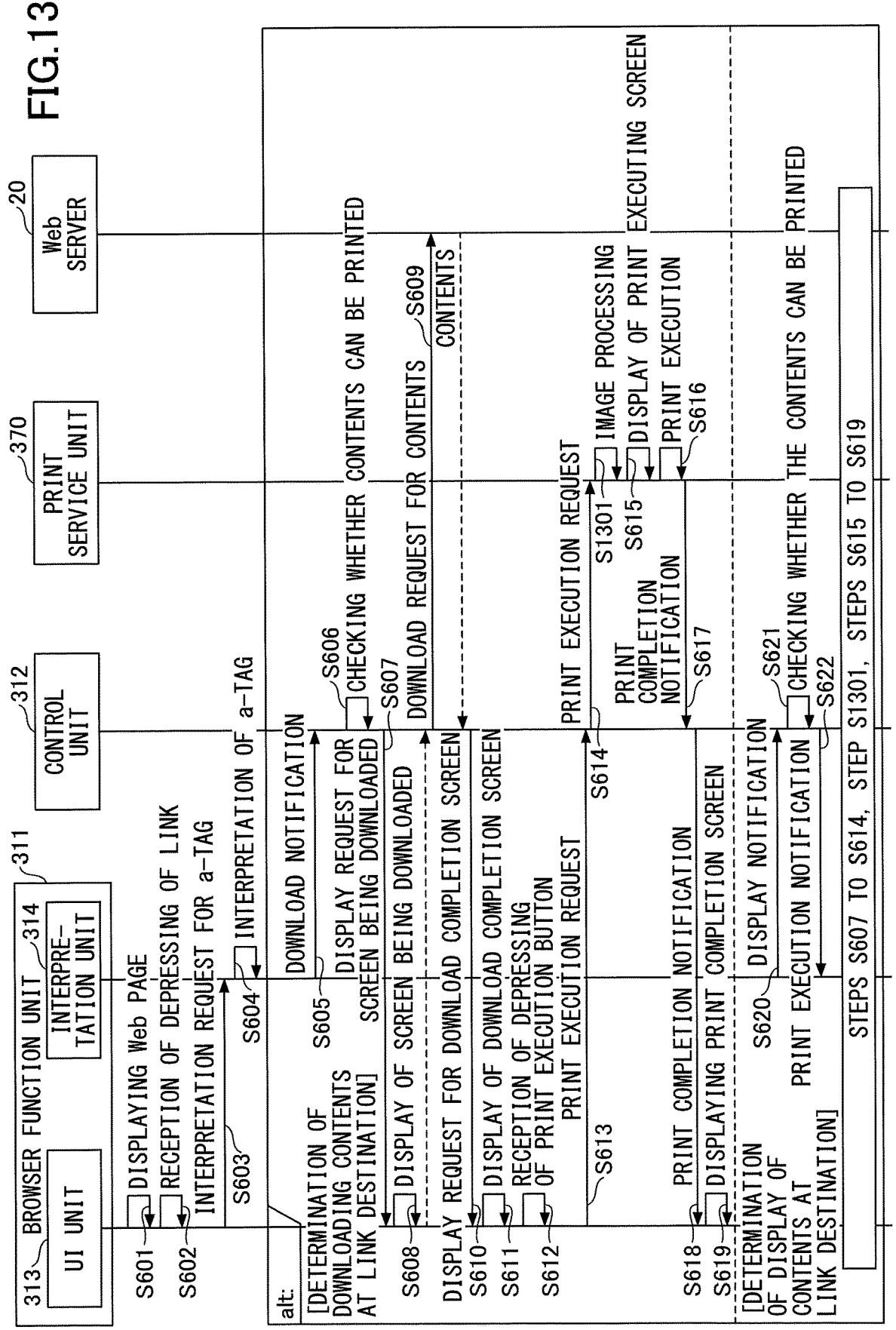
FIG. 13 is a sequence diagram illustrating another example of a print process according to the embodiment.

Next, another example (Part 3) of the print process will be described with reference to FIG. 13. FIG. 13 is a sequence diagram illustrating another example (No. 3) of a print process according to the embodiment. Because Steps S601 to S622 in FIG. 13 are the same as those in FIG. 6, the description thereof will not be repeated.

Subsequent to step S614, the print service unit 370 performs predetermined image processing for the contents downloaded in step S609 (step S1301). The image processing performed by the print service unit 370 includes, for example, processing for adding predetermined information (for example, the URL or time of the downloaded destination) to the content, processing for converting the data format, and the like. Accordingly, in step S616, the contents after the image processing is performed is printed.

Figure 14:
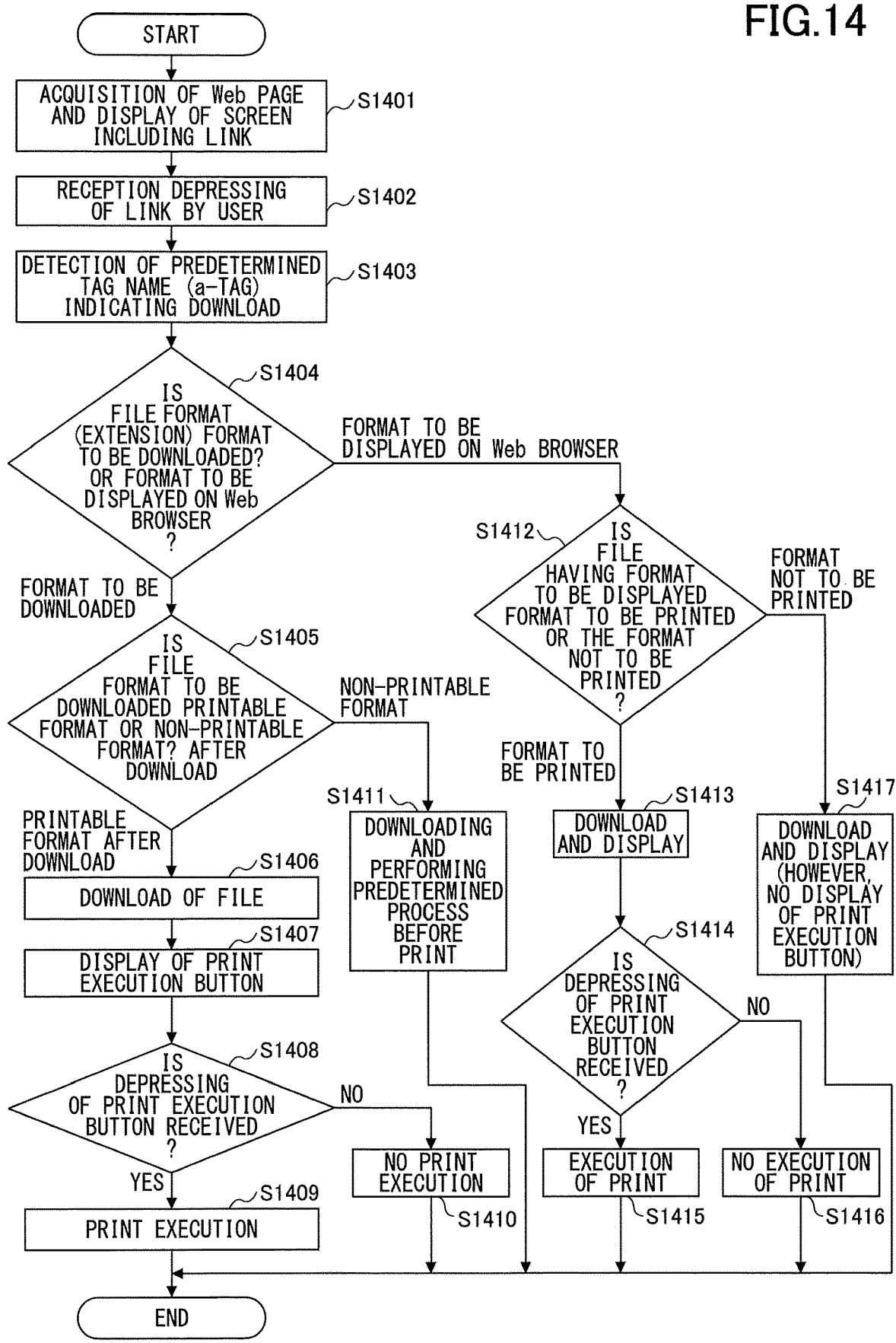
FIG. 14 is a flowchart illustrating an example of an operation of a Web browser when a print process is performed.

Next, an example of an operation of the Web browser 310 at the time of performing the print process will be described with reference to FIG. 14. FIG. 14 is a flowchart illustrating an example of an operation of the Web browser 310 when a print process is performed.

First, as described in step S601 of FIG. 6, the Web browser 310 acquires contents (Web page) from the Web server 20 and displays a screen including a link (step S1401).

Next, the Web browser 310 accepts the depression of the link by the user as described in step S602 of FIG. 6 (step S1402). The Web browser 310 detects a predetermined tag name (a-tag) representing a download when the link is depressed (step S1403).

Next, as described in step S604 of FIG. 6, the Web browser 310 determines whether the file format (the extension) of the linked contents (the file) is a format to be downloaded or a format to be displayed on the Web browser 310 (step S1404). Here, for example, a file format having the extension such as "PDF", "JPEG", "doc", "xls", "zip", "mp3", or "mp4" may be downloaded. Further, the format displayed on the Web browser 310 includes a file format having the extension such as "html", "gif", "png", or the like.

In step S1404, when it is determined that the file format is a downloaded format, the Web browser 310 determines whether the file format is a printable format or a non-printable format after downloading, as described in step S606 of FIG. 6 (step S1405). Here, as a format that can be printed after downloading, for example, a file format having the extension such as "PDF", "JPEG", "doc", or "xls". Further, a file format having the extension such as "zip", "mp3", "mp4", etc. may be used as a format that cannot be printed after downloading.

In step S1405, when it is determined that the file format is a format that can be printed after downloading, the Web browser 310 downloads the contents (file) as described in step S609 of FIG. 6 (step S1406). That is, at this time, the Web browser 310 does not display the contents. However, the contents may be displayed by another application such as a viewer application. In this case, the contents may be displayed by the other application after the print execution button is depressed in step S1408, which will be described later.

Next, the Web browser 310 displays a screen (for example, a download completion screen) including a print execution button, as described in step S611 of FIG. 6 (step S1407).

Next, in step S1408, the Web browser 310 determines whether it has been accepted to click the print execution button included in the screen displayed in step S1407. At this time, the Web browser 310 may accept the clicking of the print execution button on the print setting screen for performing the print setting.

In step S1409, when it is determined in step S1408 that the depressing of the print execution button is received, the Web browser 310 performs the print of the contents as described in step S613 of FIG. 6.

In step S1408, when it is not determined that the depressing of the print execution button has been received (for example, when the print has been canceled), the Web browser 310 does not execute the print of the contents (step S1410). In this case, the Web browser 310 erases the contents. The Web browser 310 may display an error screen, for example, except for a case where the print is canceled.

In step S1405, when it is determined that the file format is the format that cannot be printed after downloading, in step S1411, the Web browser 310 downloads the file, performs a predetermined process, and conducts printing. For example, if the extension is "zip", the contents (the file) is decompressed and the file is printed after the decompression. However, when, for example, a file after decompression is in the non-printable format (for example, when the file extension after decompression is "mp3" or "mp4" or the like), the Web browser 310 does not print.

In step S1404, when it is determined that the file format is the format to be displayed on the Web browser 310, the Web browser 310 determines whether the file format is the format to be printed or the format to not be printed (step S1412). Here, for example, a file format having the extension such as "gif" or "png" may be used as the format to be printed. The format not to be printed includes a file format having the extension such as "html", for example.

In step S1412, when it is determined that the file format is the format to be printed, the Web browser 310 downloads and displays the contents (the file) (step S1413). At this time, the Web browser 310 also displays the print execution button on the screen for printing the displayed contents.

Next, in step S1414, the Web browser 310 determines whether it has been accepted to click the print execution button included in the screen displayed in step S1413. At this time, the Web browser 310 may receive the depressing of the print execution button on the print setting screen for performing the print setting. [0211] In step S1414, when it is determined that the depressing of the print execution button is received, the Web browser 310 performs the print of the contents (step S1415).

In step S1414, when it is not determined that the depressing of the print execution button has been received (for example, when the print has been canceled), the Web browser 310 does not execute the print of the contents (step S1416). In this case, the Web browser 310 erases the contents. The Web browser 310 may display an error screen, for example, except for a case where the print is canceled.

In step S1412, when it is determined that the file format is the format not to be printed, the Web browser 310 downloads and displays the contents (the file) (step S1417). At this time, unlike the above described step S1413, the Web browser 310 does not display the print execution button for printing the displayed contents on the screen.

Second Embodiment

Figure 15:
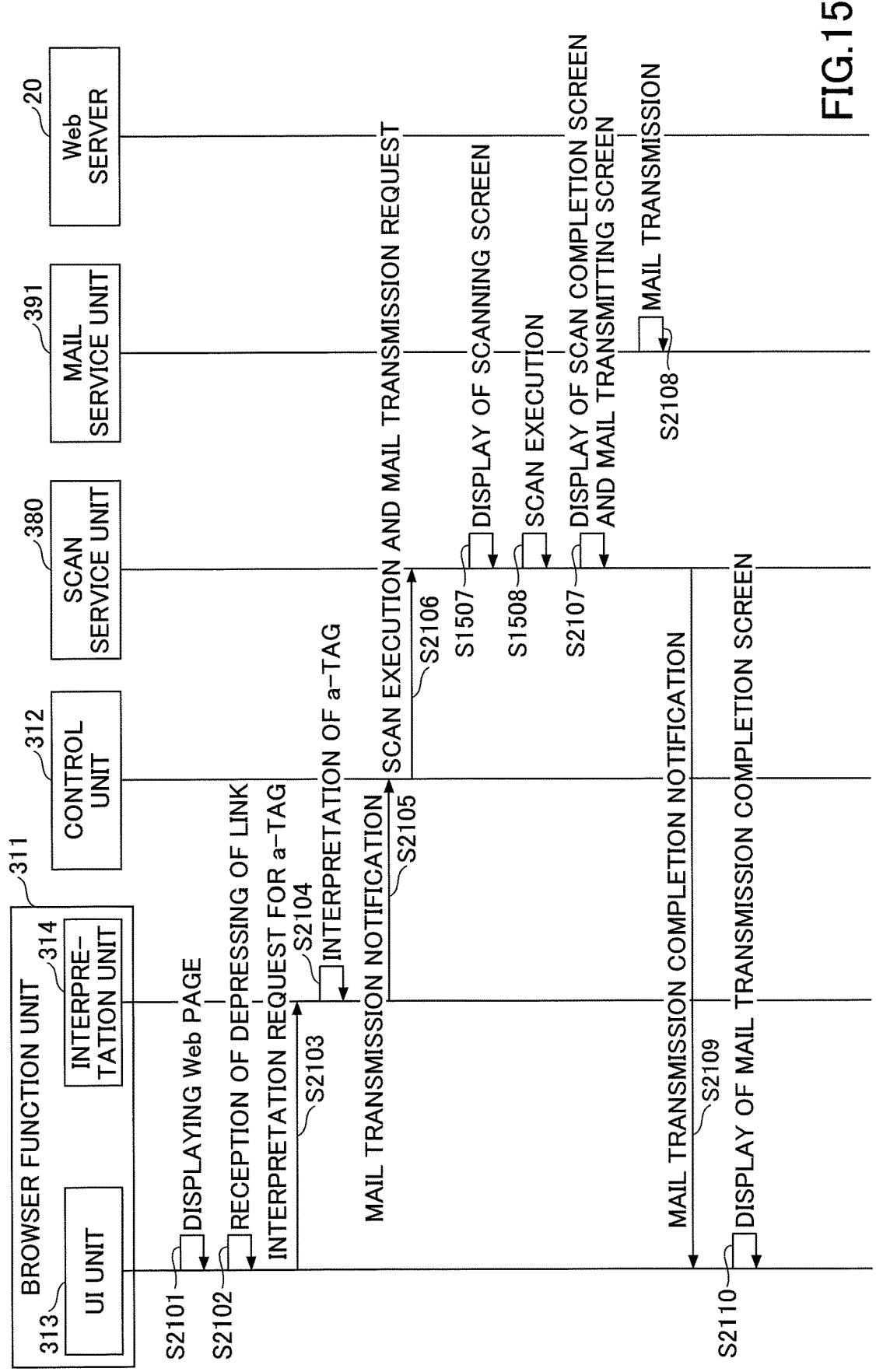
FIG. 15 is a sequence diagram illustrating an example of a scan process according to the embodiment.

Hereinafter, the process of transmitting the image data generated by the scan to the mail server 30 by the Web application using the general purpose HTML using the image processing apparatus 10 will be described with reference to FIG. 15. FIG. 15 is a sequence diagram illustrating an example of a scan and mail transmission process in accordance with this embodiment.

Figure 16:
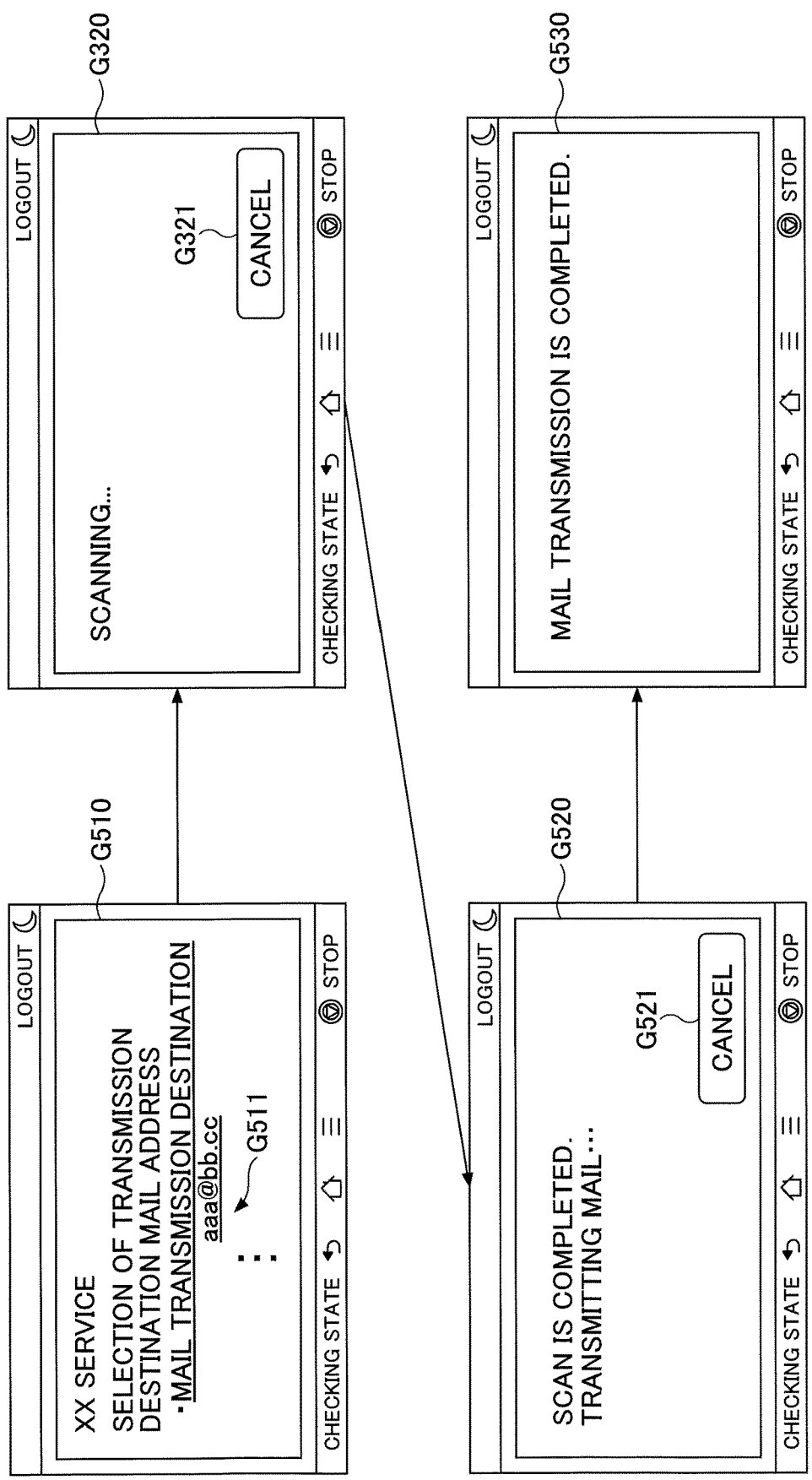
FIG. 16 is a diagram illustrating an example of a screen transition in a scan process.

First, in step S2101, the UI unit 313 of the browser function unit 311 displays the Web page G510 illustrated in FIG. 16. The Web page G510 illustrated in FIG. 16 is displayed when the interpretation unit 314 interprets the contents (HTML, CSS, JavaScript, or the like) acquired from the Web server 20. The contents can be acquired by, for example, entering a URL for displaying Web page G510 or depressing the link to the URL.

A Web page G510 illustrated in FIG. 16 includes a link G511 for transmitting the mail to an e-mail address designated as the link destination. Here, suppose that the user depresses link G511. It is assumed that the scanner of the image processing apparatus 10 sets the document to be scanned.

In step S2102, the UI unit 313 of the browser function unit 311 receives the depression of the link G511 by the user. Here, the link G511 included in the Web page G510 illustrated in FIG. 16 is substantialized by an a-tag having the attribute "href" set as illustrated in FIG. 17, for example. The attribute "href" of the a-tag illustrated in FIG. 17 has an e-mail address designated in the scheme "mail to". In addition, various other attributes may be set to the a-tag.

In step S2103, the UI unit 313 of the browser function unit 311 transmits the interpretation request of the a-tag that substantializes the link G511 depressed by the user to the interpretation unit 314.

In step S2104, the interpretation unit 314 of the browser function unit 311 interprets the a-tag that substantializes the link G511. That is, by interpreting the a-tag, the interpretation unit 314 specifies the scan and mail transmission from the scheme "mail to" designated as the attribute "href" of the a-tag.

Next, in step S2105, the interpretation unit 314 of the browser function unit 311 transmits the mail transmission notification to the control unit 312. The interpretation unit 314 can perform the mail transmission notification by, for example, calling the Web browser 310 of the operation unit 11 or the API of the mail transmission library stored in the application. Alternatively, for example, the interpretation unit 314 may notify the transmitting of mail by calling the mail transmitting program (or the mail transmitting module, etc.) in which the main body 12 is held via the WebAPI. In this case, the e-mail address designated by the attribute "href" is designated as the argument of the API to be called.

In step S2106, when the control unit 312 receives the mail transmission notification, it transmits the scan execution and the mail transmission request to the designated e-mail address to the scan service unit 380. For example, the control unit 312 may call the scan UI application 330 of the scan service unit 380 using intent.

In step S1507, when receiving the scan execution and the mail transmission request from the control unit 312, the scan service unit 380 displays, for example, the scanning screen G320 illustrated in FIG. 16. The scanning screen G320 illustrated in FIG. 16 is displayed by the scan UI application 330. The scanning screen G320 illustrated in FIG. 16 is displayed so that the user can know that the document is being scanned.

Next, in step S1508, the scan service unit 380 performs scanning of a document set in the scanner to generate image data. The scan may be performed by the scan UI application 330 transmitting a scan request to the scan application 360 via the WebAPI 340. With this, the image data are generated from the original manuscript set to the scanner. The image data generated by the scan is stored, for example, in a predefined storage area in the flash memory 114.

If an error occurs during scanning, the scan application 360 transmits a notification to the scan UI application 330 indicating that the error has occurred. When the scan UI application 330 receives a notification indicating that an error has occurred, for example, it displays a screen indicating that an error has occurred.

The scanning screen G320 illustrated in FIG. 16 includes a cancel button G321. When the user depresses the cancel button G321, the scan UI application 330 transmits a scan request to the scan application 360 via the WebAPI 340. This stops scanning of the original manuscript.

Following step S1508, in step S2107, the scan service unit 380 displays the scan completion screen and the screen G520 during mail transmission illustrated in FIG. 16, for example. The scan application 360 of the scan service unit 380 transmits the scan result (for example, information representing the image data generated by the scan or the information representing the storing destination of the image data) to the mail transmission application 390 of the mail service unit 391.

In step S2108, the mail transmission application 390 of the mail service unit 391 transmits the image data generated by the scan to the e-mail address designated as the attribute "href" of the a-tag when the scan result is received. This causes the image data generated by the scan to be transmitted to the designated e-mail address.

The cancel button G521 is included in the screen G520 for completing the scan and transmitting the mail illustrated in FIG. 16. When the cancel button G521 is depressed by the user, the scan UI application 330 transmits a mail transmission stop request to the mail transmission application 390. This stops the mail transmission of the image data.

In step S2109, the scan application 360 transmits the scan result to the mail transmission application 390 and then transmits the mail transmission completion notification to the UI unit 313. After receiving the mail transmission completion notification from the mail transmission application 390, the scan application 360 may transmit the mail transmission completion notification to the UI unit 313 (in this case, the Web application can operate on the premise that the mail transmission is completed).

In step S2110, when receiving the mail transmission completion notification, the UI unit 313 of the browser function unit 311 displays the mail transmission completion screen G530 illustrated in FIG. 16. When the mail transmission completion screen G530 illustrated in FIG. 16 is displayed, the user can know that the mail transmission of the image data generated by scanning and scanning of the document has been completed.

As described above, the image processing apparatus 10 according to this embodiment can, when the link substantialized by the a-tag, which is a general purpose HTML tag, is depressed by the user, read the original manuscript by the scanner, generate image data, and send the generated image data by mail. As described above, in the image processing apparatus 10 according to the embodiment, the scan function is substantialized without using a dedicated HTML tag for implementing the scan function.

Therefore, for example, the developer of the Web application provided by the Web server 20 can develop a Web application that implements the image processing function specific for the image processing apparatus 10 without requiring knowledge of dedicated JavaScript or HTML.

Other Examples of Example 2, Part 1

Figure 18:
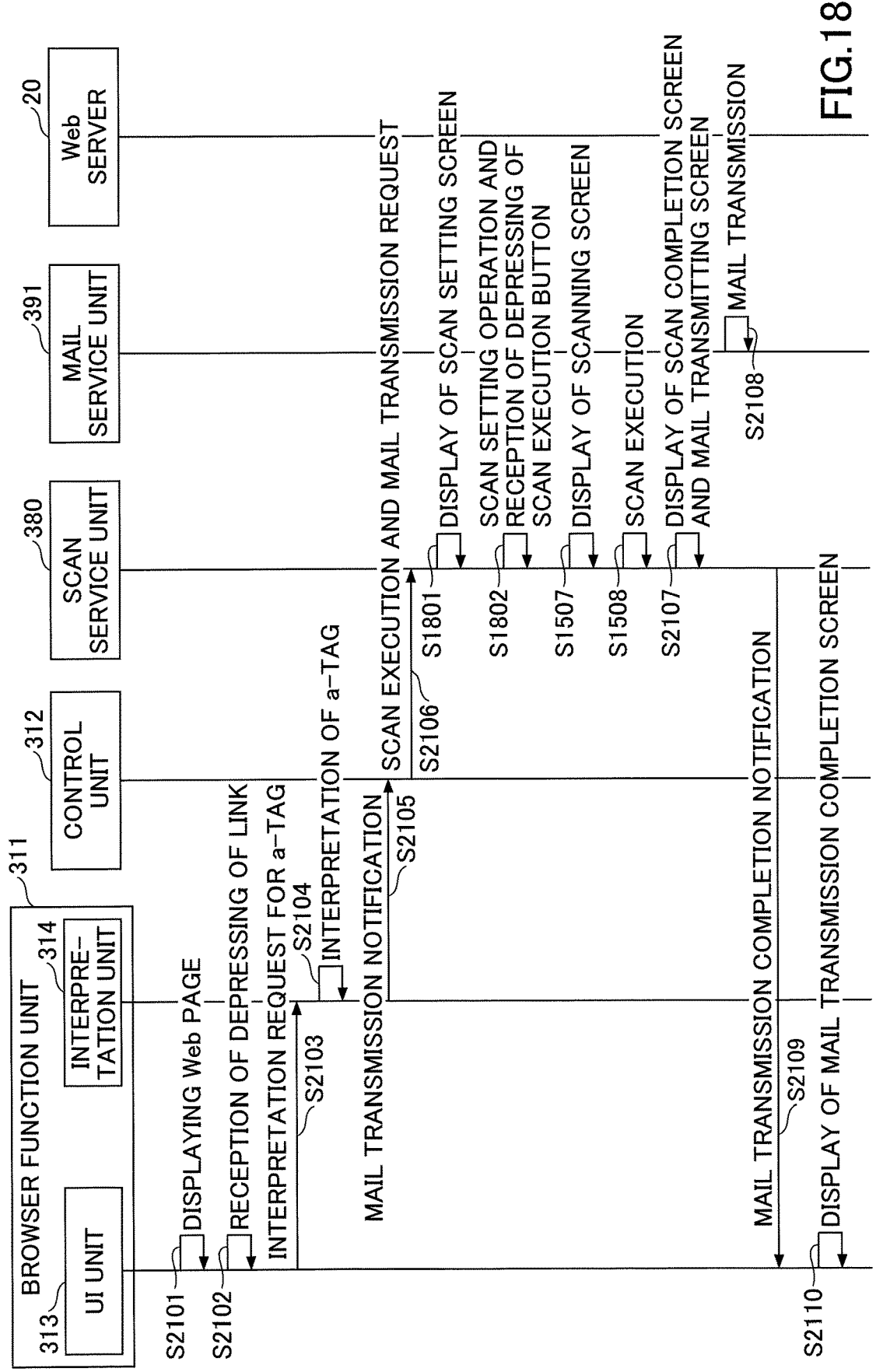
FIG. 18 is a sequence diagram illustrating another example of a scan process according to the embodiment.

Next, another example (Part 1) of the scan process will be described with reference to FIG. 18. FIG. 18 is a sequence diagram illustrating another example (1) of the scan process according to the embodiment. Hereinafter, points that differ from the second embodiment of FIG. 15 will be described.

Figure 19:
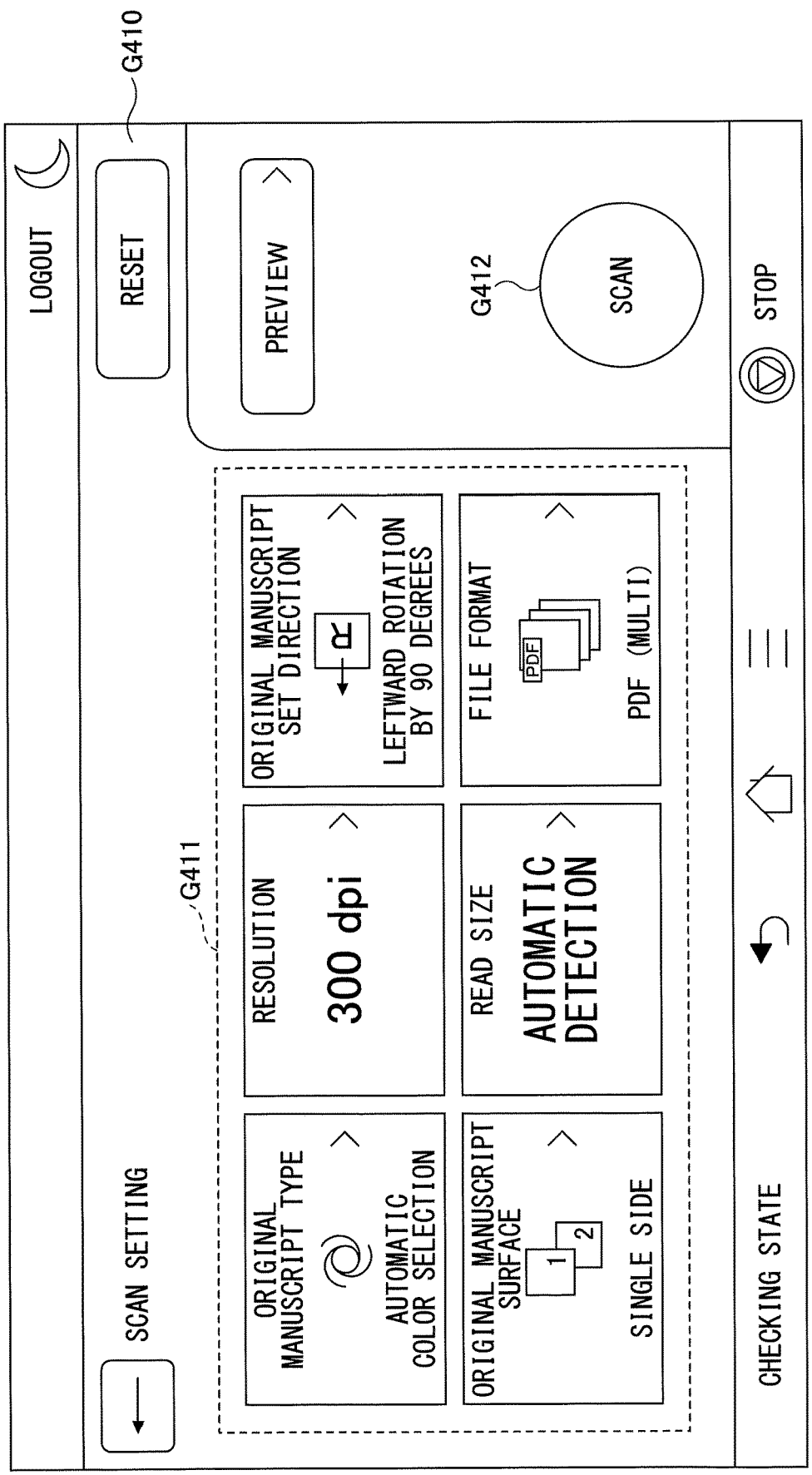
FIG. 19 is a diagram illustrating an example of a scan setting screen.

In step S1801, following step S2106, when the scan service unit 380 receives the scan execution and the mail transmission request from the control unit 312, for example, the scan setting screen G410 illustrated in FIG. 19 is displayed. The scan setting screen G410 illustrated in FIG. 19 is displayed by the scan UI application 330.

The scan setting screen G410 illustrated in FIG. 19 includes a scan setting field G411 and a scan execution button G412. For example, in the scan setting field G411, the user can specify various scan settings such as "original manuscript type", "resolution", "original manuscript set direction", "original manuscript surface", "read size", and "file format". Here, it is assumed that the user performs an operation to specify the scan setting in the scan setting field G411 (scan setting operation) and then depresses the scan execution button G412.

In step S1802, the scan service unit 380 receives the user's scan setting operation and the depressing of the scan execution button G412. The scan setting operation and the clicking of the scan execution button G412 are received by the scan UI application 330. Accordingly, in step S1508, the original manuscript is scanned with the scan setting designated by the user.

Figure 20:
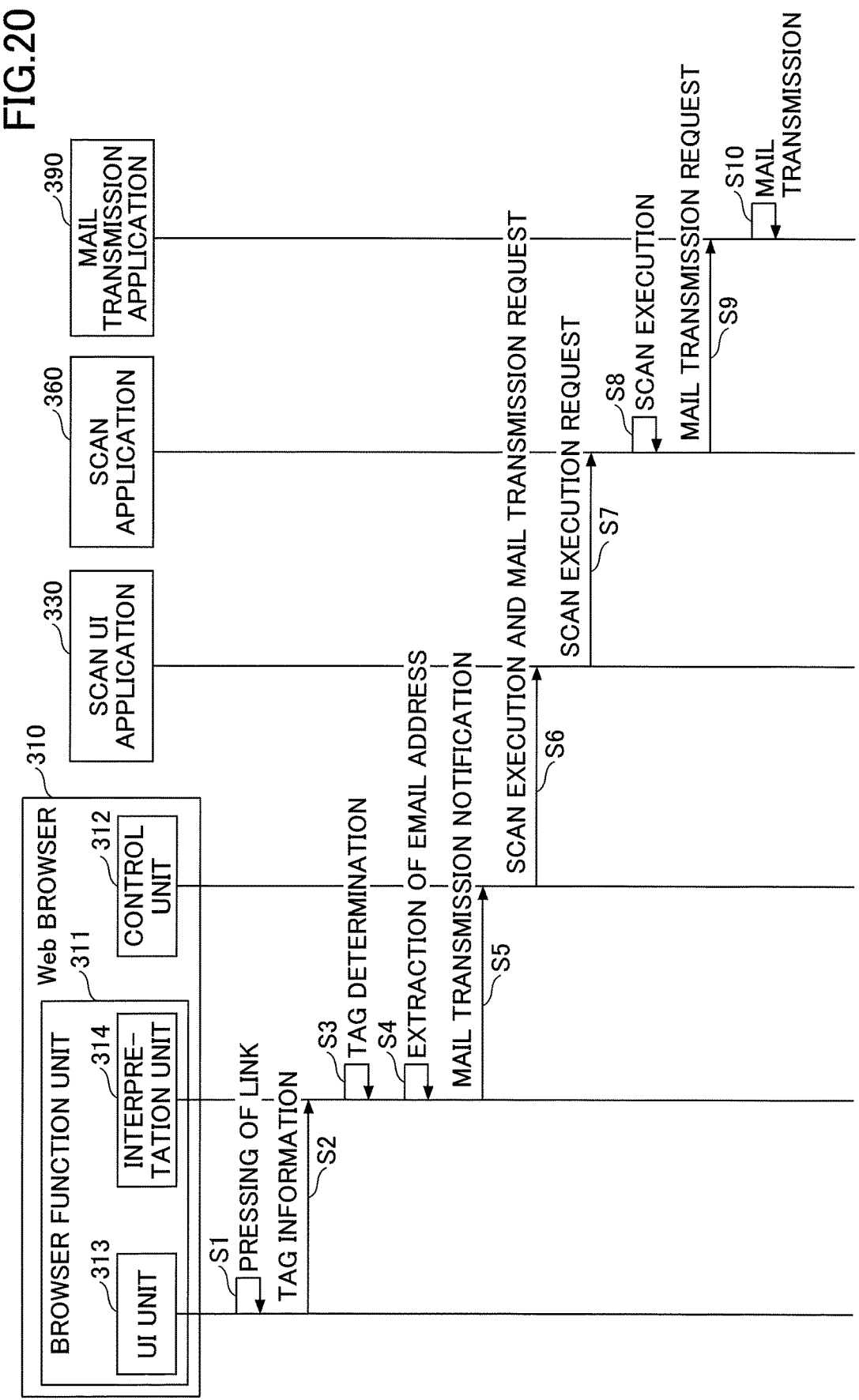
FIG. 20 is a sequence diagram illustrating an example of image processing based on interpretation of the general purpose HTML tag in accordance with the embodiment.

FIG. 20 is a sequence diagram illustrating an example of image processing based on the interpretation of a general purpose HTML tag in accordance with the embodiment.

In step S1, the UI unit 313 receives the depressing of the link on the Web page by the user.

In step S2, the UI unit 313 requests the interpretation unit 314 to interpret the HTML tag corresponding to the link depressed in S1.

In step S3, the interpretation unit 314 interprets the HTML tag requested in S2.

Specifically, the interpretation unit 314 determines whether the attribute "href" of the anchor tag (a-tag) starts at "mail to".

In step S4, when the attribute "href" of the anchor tag (a-tag) starts with "mail to" in S3, the interpretation unit 314 extracts the character string (that is, the e-mail address) after "mail to".

In step S5, the interpretation unit 314 notifies the control unit 312 of the above-described mail transmission notification.

In step S6, the control unit 312 requests the scan UI application 330 to execute the scan and send the mail. At this time, the control unit 312 gives the e-mail address extracted in step S3 as a parameter.

In step S7, the scan UI application 330 requires the scan application 360 to perform the scan. At this time, the control unit 312 gives the e-mail address extracted in step S3 as a parameter.

In step S8, the scan application 360 performs the scan requested in step S7 to generate image data.

In step S9, the scan application 360 requests the mail transmission application 390 to send mail of image data generated by the scan in step S8.

In step S10, the mail transmission application 390 performs the mail transmission requested in S9. That is, the mail transmission application 390 transmits the data of the image generated by the scan in S8 to the e-mail address assigned as a parameter in step S6.

If the attribute "href" of the anchor tag (a-tag) is not started by "mail to" in step S3, the process described in (First Embodiment) can be performed. For example, if the file designated by the attribute "href" of the a-tag is a file that can be displayed by the Web browser 410 (for example, if the extension is html, img, pdf, etc.), the display notification is performed. On the other hand, for example, when the file designated by the attribute "href" of the a-tag is a file that cannot be displayed by the Web browser 410 (for example, when the extension is zip, etc.), the download notification is performed. When the download notification is received, the control unit 312 determines whether the downloaded file is printable. When the downloaded file is printable, the control unit 312 downloads the file and controls the downloaded file for printing. Meanwhile, when the display notification is received, the control unit 312 determines whether the file to be displayed is printable. When the file is printable, the control unit 312 downloads the file and performs a control of printing the downloaded file.

Figure 21:
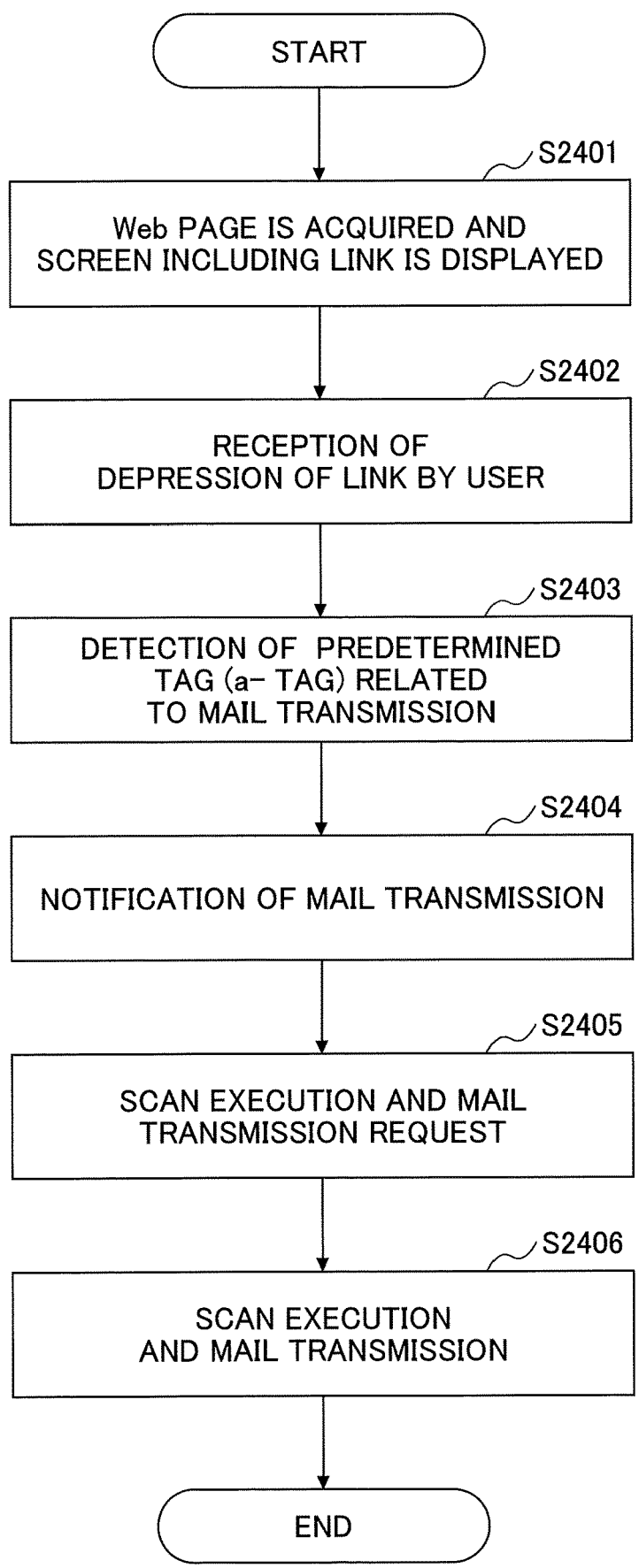
FIG. 21 is a flowchart illustrating an example of an operation of a Web browser during scan and mail transmission process.

Next, an example of an operation of the Web browser 310 at the time of executing the scan and mail transmission process will be described with reference to FIG. 21. FIG. 21 is a flowchart illustrating an example of an operation of the Web browser 310 during the scan and mail transmission process.

First, as described in step S2101 of FIG. 15, the Web browser 310 acquires contents (Web page) from the Web server 20 and displays a screen including a link (step S2401).

Next, the Web browser 310 accepts the depression of the link by the user as described in step S2102 of FIG. 15 (step S2402). In step S2403, when the Web browser 310 accepts the clicking of the link, it detects a predetermined tag (a-tag) related to transmitting mail. In step S2404, when the Web browser 310 detects the a-tag, it performs the mail transmission notification as described in step S2105 of FIG. 15.

Next, the Web browser 310 performs the scan execution and mail transmission request as described in step S2106 of FIG. 15 (step S2405).

Thereafter, as described in FIG. 15, step S1508, the scan application 360 performs a scan to generate image data. As described in step S2108 of FIG. 15, in step S2406, the mail transmission application 390 transmits mail the image data generated by the scan.

<Example of Anchor Tag>

Hereinafter, an example of an anchor tag (a-tag) that can be used in the scan and mail transmission process is provided.

Example 1 <a href="mailto:aaa@bb.cc?subject=test title">mail</a> Example 2 <a href="mailto:aaa@bb.cc?cc=ddd@ee.ff">mail</a> Example 3 <a href="mailto:aaa@bb.cc?bcc=ggg@hh.ii">mail</a> Example 4 <a href="mailto:aaa@bb.cc?body=test body">mail</a>

In one embodiment of the present invention, an anchor tag (a-tag) may be used to set the subject, set the e-mail address of cc (carbon copy) (Example 2), set the e-mail address of bcc (blind carbon copy) (Example 3), and set the main body (Example 4). Examples 1-4 may be used alone or in combination.

<Another Software Configuration>

Figure 22:
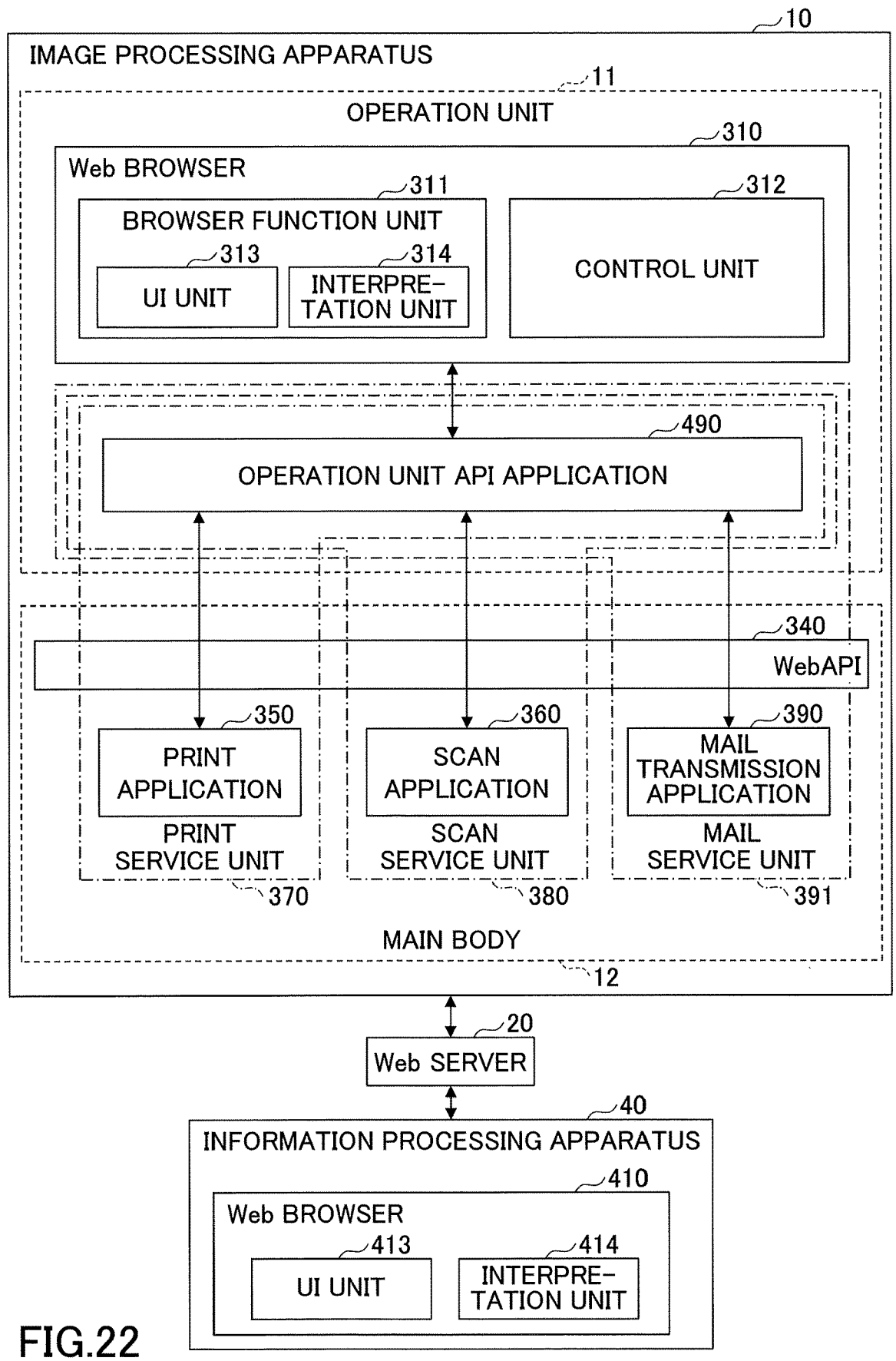
FIG. 22 is a diagram illustrating another example of a software configuration of an image processing system according to the embodiment.

Next, another example of the software configuration of the image processing apparatus 10 and the information processing apparatus 40 included in the image processing system 1 according to the embodiment will be described with reference to FIG. 22. FIG. 22 is a diagram illustrating another example of the software configuration of the image processing system 1 in accordance with the embodiment.

As illustrated in FIG. 22, the operation unit 11 of the image processing apparatus 10 according to the embodiment may include an operation unit API application 490 instead of the print UI application 320, the scan UI application 330, and the mail UI application 392.

The operation unit API application 490 is an application program that provides a UI related to image process such as print and scan. The operation unit API application 490 has the same function as an application that provides a UI related to image process, such as a print UI application 320, a scan UI application 330, and a mail UI application 392.

Accordingly, in the software configuration illustrated in FIG. 22, in the first embodiment and the second embodiment described above, the print UI application 320, the scan UI application 330, and the mail UI application 392 may be read as the operation unit API application 490. By using the operation unit API application 490, the UI for various image processing such as print and scan can be provided in an integrated manner.

The operation unit API application 490 includes an API group for developing applications that provide UIs for image process by a third vendor or the like. A third vendor or the like can easily develop an application that provides a UI related to an image without requiring knowledge of the specifications of the WebAPI 340 by using the API group of the operation unit API application 490. That is, the operation unit API application 490 can be referred to as an application program that provides a third vendor or the like with an API group of which webAPI 340 is wrapped.

In the software configuration illustrated in FIG. 22, the operation unit 11 includes the operation unit API application 490 instead of the print UI application 320, the scan UI application 330, and the mail UI application 392, but is not limited thereto. The operation unit 11 may include the operation unit API application 490 in addition to the print UI application 320, the scan UI application 330, and the mail UI application 392.

One embodiment of the present invention may be used, for example, when receiving a mail inquiry from a customer on a store website or the like. Conventionally, when it is desired to provide handwritten information in an inquiry, it is necessary to electronically attach the handwritten information to the mail by photograph or the like. However, according to this embodiment of the present invention, the handwritten information can be scanned and attached to the mail.

Second Embodiment

Technologies for substantializing various image processing functions such as print and scan by using a Web application running on a Web browser in an image processing apparatus such as a MFP (Multifunction Peripheral) are conventionally known (see, for example, Patent Document 1).

The various image processing functions such as print and scan described above are specific for an image processing apparatus such as the MFP. For the Web application that substantializes the function specific for such image processing apparatus, HTML (HyperText Markup Language) is described using JavaScript ("JavaScript" is a registered trademark), which is dedicated to the image processing apparatus.

On the other hand, a Web application used by the information processing apparatuses such as a smartphone, tablet, and PC (personal computer) is written in the general purpose HTML. In the general purpose HTML, an HTML tag or the like is not provided to substantialize the function specific for such image processing apparatus for printing and scanning as described above.

For this reason, it is difficult to substantialize a function specific for the image processing apparatus, such as printing and scanning, in a Web application using the general purpose HTML.

This embodiment is provided in view of the above-mentioned point, and is intended to substantialize the function specific for the image processing apparatus by using the general purpose HTML.

According to the embodiment of the present invention, the general purpose HTML can be used to substantialize the function specific for the image processing apparatus.

Hereinafter, this embodiment of the present invention will be described with reference to the drawings.

<Example of Entire Structure>

Figure 23:
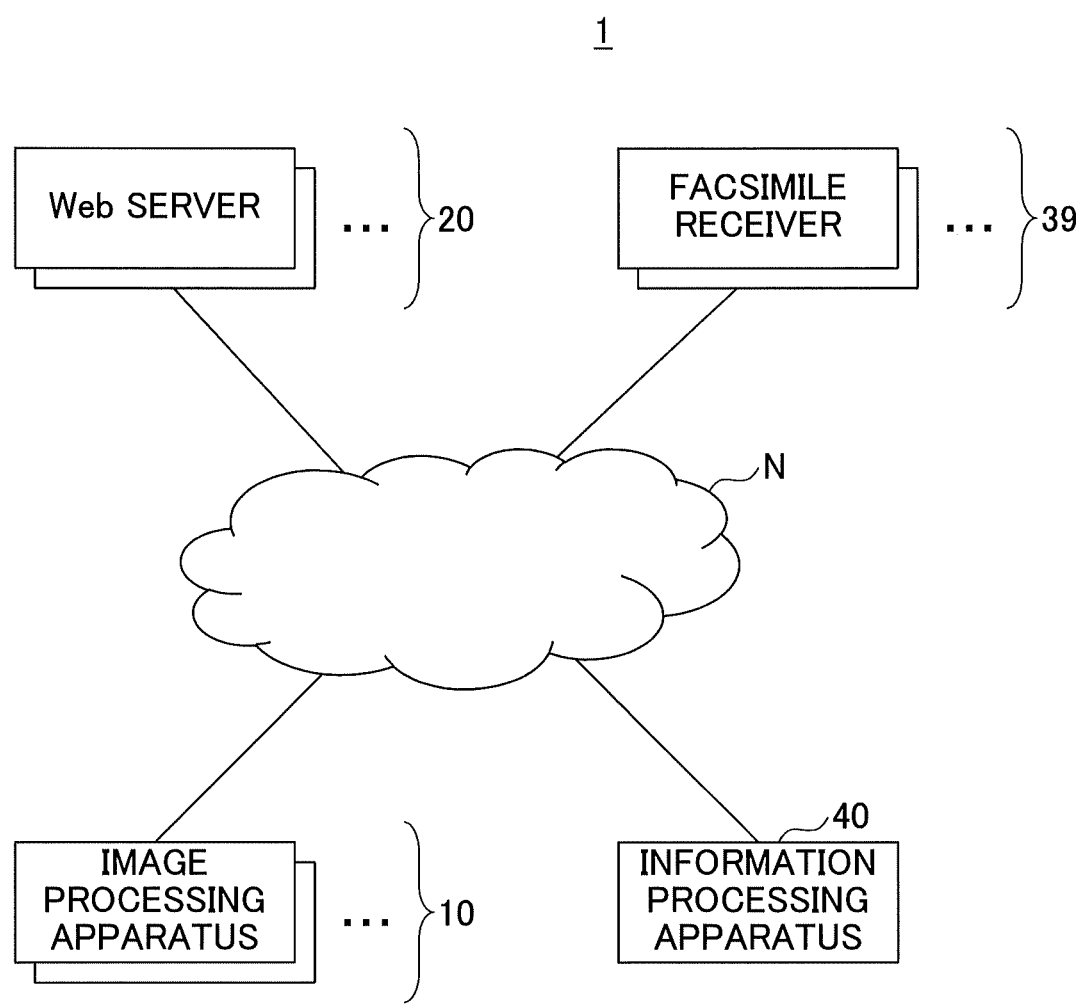
FIG. 23 is a diagram illustrating an example of the entire structure of an image processing system according to the embodiment.

First, the entire structure of the image processing system 1 according to this embodiment will be described with reference to FIG. 23. FIG. 23 is a diagram illustrating an example of the entire structure of the image processing system 1 according to the embodiment.

As illustrated in FIG. 23, the image processing system 1 according to this embodiment includes at least one image processing apparatus 10, at least one Web server 20, at least one facsimile receiver 39, and an information processing apparatus 40. The image processing apparatus 10 and the Web server 20 are communicatively connected via a wide area network N, such as the Internet. The image processing apparatus 10 and the facsimile receiver 39 are communicatively connected via a network N, for example, a telephone line or the Internet.

The image processing apparatus 10 is an electronic apparatus, such as a MFP in which a Web browser is installed. The user of the image processing apparatus 10 may, for example, print the electronic data downloaded from the Web server 20 or fax the image data generated by scanning to the facsimile receiver 39 using the Web application provided by the Web server 20.

Web server 20 is a computer or computer system that provides a Web application using the general purpose HTML via the network N. The general purpose HTML is defined in the World Wide Web Consortium (W3C), such as HTML5 and HTML 5.1. Here, "general purpose" means contents that can be interpreted and processed regardless of the type of device in a general purpose Web browser, unlike contents (extended contents such as extended HTML and extended JavaScript) that can be interpreted and processed only by an apparatus such as image processing apparatus. The general purpose HTML can be used in a personal computer, a portable terminal, a smartphone, etc., and is commonly used in a general Web server and a Web application.

A variety of Web services are substantialized by the Web server 20 providing the Web application. Examples of such Web service include a cloud storage service, a social networking service (SNS), a cloud printing service, a blogging service, a bulletin board service, an online game service, and an online shopping service.

The facsimile receiver 39 is an apparatus (also referred to as a facsimile or a fax) for receiving image data transmitted by the image processing apparatus 10 via the network N such as a telephone line or the Internet. The facsimile receiver 39 is not limited to a fax using a telephone line, but may be an Internet fax using the Internet.

The information processing apparatus 40 is a PC (personal computer) in which a Web browser is mounted, a smartphone, a tablet terminal, or the like.

The structure of the image processing system 1 illustrated in FIG. 23 is an example, and another configuration may be used. For example, the image processing apparatus 10 is not limited to a multifunction peripheral. For example, the image processing apparatus 10 may be a digital camera, a printer, a scanner, a copier, a projector, a facsimile, an electronic meeting terminal, an electronic blackboard, or the like. That is, the image processing apparatus 10 may be an electronic apparatus that performs at least one of an input and an output of data with the Web server 20. For example, the image processing system 1 may not include the information processing apparatus 40.

<Example of Hardware Structure of Image Processing Apparatus 10>

The hardware structure of the image processing apparatus 10 according to the embodiment is the same as that of the first embodiment, and therefore the description thereof will not be repeated.

<Hierarchical Structure of Software Groups of Image Processor 10>

The hierarchical configuration of the software groups included in the operation unit 11 and the main body 12 of the image processing apparatus 10 according to the embodiment is the same as that of the first embodiment, and thus the description thereof will not be repeated.

<Example of Hardware Structure of Information Processing Apparatus 40>

Because the hardware structure of the information processing apparatus 40 according to the embodiment is the same as that of the first embodiment, the description thereof will not be repeated.

<Example of Software Configuration>

Figure 24:
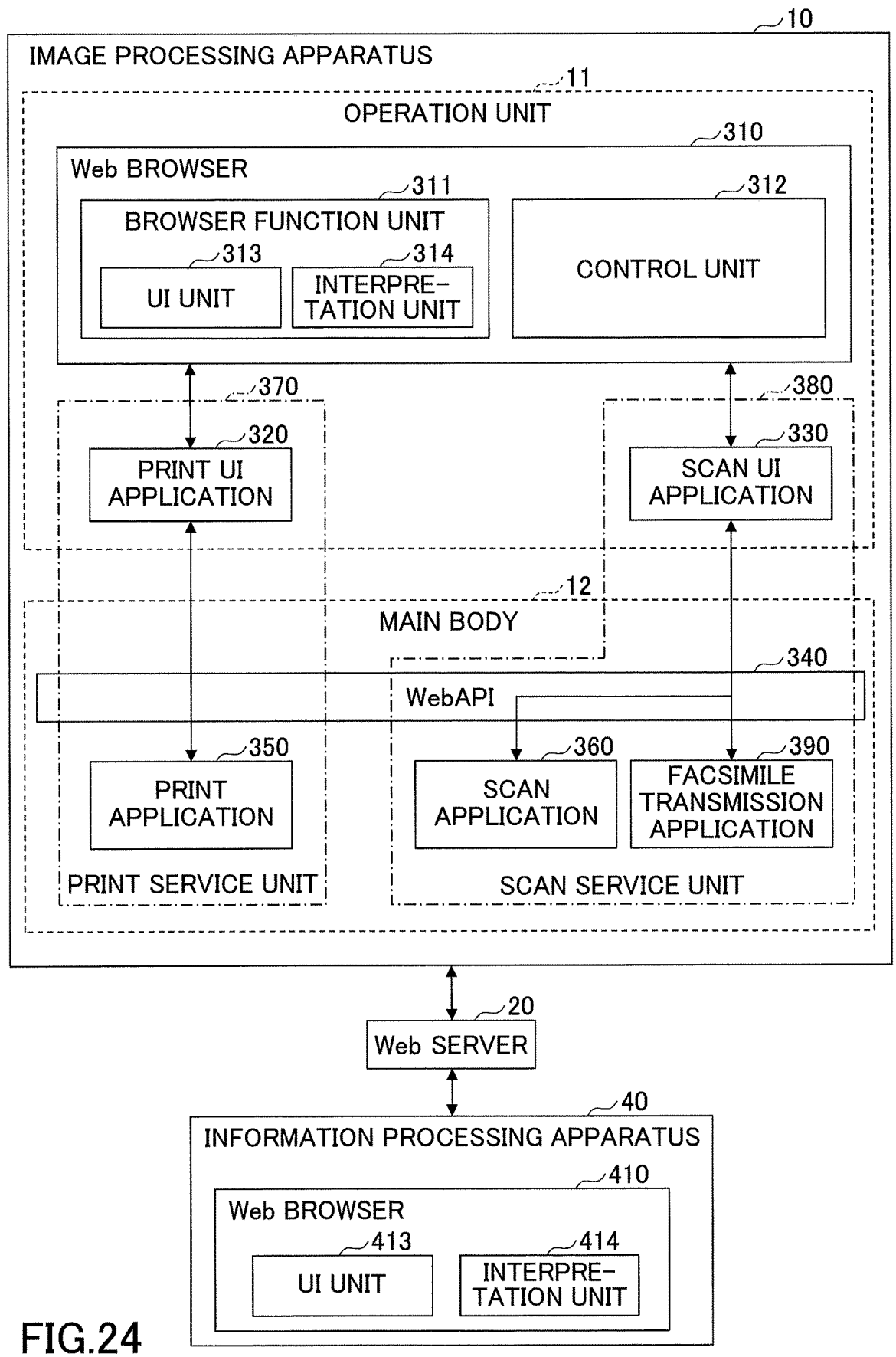
FIG. 24 is a diagram illustrating an example of a software configuration of an image processing system according to the embodiment.

Next, the software configuration of the image processing apparatus 10 and the information processing apparatus 40 included in the image processing system 1 according to the embodiment will be described with reference to FIG. 24. FIG. 24 is a diagram illustrating an example of the software configuration of the image processing system 1 according to the embodiment.

<<Image Processing Apparatus 10>>

As illustrated in FIG. 24, the operation unit 11 of the image processing apparatus 10 according to the embodiment includes a Web browser 310, a print UI application 320, and a scan UI application 330. These Web browsers 310, print UI application 320, and scan UI application 330 are executed by CPU 111.

The main body 12 of the image processing apparatus 10 according to the embodiment includes a WebAPI 340, a print application 350, a scan application 360, and a facsimile transmission application 395. These WebAPI 340, print application 350, scan application 360, and facsimile transmission application 395 are executed by CPU 121.

The Web browser 310 substantializes a Web application by acquiring Web contents (for example, HTML, CSS (Cascading Style Sheets), JavaScript, various electronic files, etc.) from the Web server 20.

For example, the Web browser 310 acquires Web contents from the Web server 20 that provides the SNS and substantializes a Web application for viewing the SNS and sharing files on the SNS. For example, the Web browser 310 acquires Web contents from the Web server 20 which provides the cloud storage service and substantializes a Web application for viewing storage and uploading files to storage.

In general, the Web application is substantialized by operating the contents such as JavaScript obtained from the Web server 20 on the Web browser 310 and performing the processing in cooperation with the Web server 20.

The Web browser 310 includes a browser function 311 and a control unit 312. Hereafter, Web contents are simply referred to as "contents".

The browser function unit 311 interprets and displays the contents. The browser function unit 311 includes a UI unit 313 and an interpretation unit 314. When the link is depressed on the Web page displayed by the UI unit 313, the interpretation unit 314 interprets the HTML tag corresponding to the link and notifies the control unit 312 according to the interpretation result.

The UI unit 313 displays a Web page or the like according to the contents acquired from the Web server 20. The UI unit 313 receives various operations (for example, link depressing) of a user on a Web page. For example, the browser function unit 311 may be implemented using a Web View or the like.

The control unit 312 performs a control of executing the image processing function of the image processing apparatus 10 in response to a notification from the interpretation unit 314 of the browser function unit 311. For example, when the download notification indicating that the contents of the linked destination is downloaded from the Web server 20 is received from the interpretation unit 314, the control unit 312 performs a control of downloading and printing the contents. For example, even when the display notification indicating that the contents of the linked destination is displayed is received from the interpretation unit 314, when the contents are in a predetermined format (for example, JPEG format), the control unit 312 performs a control of downloading and printing the contents.

Because the Web browser 310 includes a browser function unit 311 for implementing the Web application and a control unit 312 for controlling the image processing function of the image processing apparatus 10, the Web browser 310 may be called a so-called hybrid application. The Web browser 310 is implemented in a programming language such as, for example, Java™. That is, the browser application constituting the Web browser 310 comprises a Java application program. The Java application uses the API provided by the operation unit 11 to call the browser function unit 311 (for example, WebView) provided by the operation unit 11, thereby constituting the Web browser 310 including the interpretation unit 314 and the UI unit 313. The underlying Java application program includes the control unit 312, which provides flexibility in operation after Web contents interpretation so that the control unit 312 can request image processing (print, scan, fax transmission) operation as well as general purpose HTML operation (download and upload).

The print UI application 320 is an application program that provides a UI (user interface) for printing. The print UI application 320 displays, for example, a screen indicating that printing is in progress or a screen indicating that printing is completed.

The print UI application 320 requests the print application 350 to execute the print through the WebAPI 340 in response to a request from the control unit 312.

The scan UI application 330 is an application program that provides a UI for the scan. For example, the scan UI application 330 displays a screen indicating that the scan is in progress, a screen indicating that the scan has been completed, a screen indicating that image data generated by the scan is being faxed, a screen indicating that the fax transmission has been completed, or the like.

The scan UI application 330 requests the scan application 360 to execute a scan and fax transmission of image data generated by the scan through the WebAPI 340 in response to a request from the control unit 312.

The WebAPI 340 is an API (Application Programming Interface) for requesting that the print UI application 320 or the scan UI application 330 perform image processing.

The print application 350 controls the image processing engine 125 to perform the print on request from the print UI application 320.

The scan application 360 controls the image processing engine 125 to perform the scan in response to a request from the scan UI application 330. The scan application 360 also requests the facsimile transmission application 395 to fax the image data generated by the scan.

The facsimile transmission application 395 controls the image processing engine 125 to perform facsimile transmission upon request from the scan application 360.

Hereinafter, the print UI application 320, the WebAPI 340, and the print application 350 are referred to as the "print service unit 370". The scan UI application 330, the WebAPI 340, the scan application 360, and the facsimile transmission application 395 are referred to as a "scan service unit 380".

For example, the operation unit 11 may include an application that provides a UI related to a copy, an application that provides a UI related to a fax, an application that provides a UI related to an OCR (Optical Character Recognition), or the like. The main body 12 may include, for example, an application that executes a copy, an application that executes a fax, an application that executes an OCR, or the like. Accordingly, the image processing apparatus 10 may include various image processing service units, for example, a copy service unit, a fax service unit, and an OCR service unit.

Further, in addition to the image processing service unit, the image processing apparatus 10 includes an address book service unit that performs processing related to the address book held by the image processing apparatus 10, an authentication service unit that performs processing related to authentication for a user to use the image processing apparatus 10, and the like.

<<Information Processing Apparatus 40>>

As illustrated in FIG. 24, the information processing apparatus 40 according to the embodiment includes a Web browser 410. The Web browser 410 is executed by CPU 36.

The Web browser 410 includes a UI unit 413 and an interpretation unit 414. The UI unit 413 displays a Web page or the like according to the contents acquired from the Web server 20. The UI unit 413 receives various operations (for example, depressing the link) of the user on the Web page.

When the link is depressed on the Web page displayed by the UI unit 413, the interpretation unit 414 interprets the HTML corresponding to the link and notifies the UI unit 413 according to the interpretation result.

<Comparison of Operations of Image Processing Apparatus 10 and Information Processing Apparatus 40>

The UI unit 413 of the Web browser 410 mounted in the information processing apparatus 40 receives, for example, the link depressing operation when the link depressing operation is performed by a user on the Web page. Next, the interpretation unit 414 interprets the HTML tag (a-tag (anchor tag)) of the link for which the link depressing operation is performed and notifies the UI unit 413 according to the interpretation result (the display notification or the download notification). For example, if the file designated by the attribute "href" of the a-tag is a file that can be displayed by the Web browser 410 (for example, if the extension is html, img, pdf, etc.), the display notification is performed.

On the other hand, for example, when the file designated by the attribute "href" of the a-tag is a file that cannot be displayed by the Web browser 410 (for example, when the extension is zip, etc.), the download notification is performed. However, for example, if the file extension of the file designated by the attribute "href" of the a-tag is the file extension of the file that can be displayed by the Web browser 410 such as pdf, and the attribute "download" is designated, the download notification is performed.

The UI unit 413 of the Web browser 410 displays a file when a display notification is received. On the other hand, the UI unit 413 of the Web browser 410 displays a screen for downloading a file (for example, a screen for a user to select a start or cancel a download) when a download notification is received.

On the other hand, the UI unit 313 of the Web browser 310 mounted in the image processing apparatus 10 receives the link depressing operation when the link depressing operation is performed by a user on the Web page, for example. Next, the interpretation unit 314 interprets the HTML tag (a-tag (anchor tag)) of the link for which the link depressing operation is performed and notifies the control unit 312 according to the interpretation result (display notification or download). Similar to the information processing apparatus 40, for example, when the file designated as the attribute "href" of the a-tag is a file that can be displayed by the Web browser 310 (for example, when the extension is html, img, pdf, or the like), the display notification is performed. On the other hand, for example, when the file designated by the attribute "href" of the a-tag is a file that cannot be displayed by the Web browser 310 (for example, when the extension is zip, etc.), the download notification is performed.

When the download notification is received, the control unit 312 determines whether the downloaded file is printable. When the downloaded file is printable, the control unit 312 downloads the file and controls the downloaded file for printing. Meanwhile, when the display notification is received, the control unit 312 determines whether the file to be displayed is printable. When the file is printable, the control unit 312 downloads the file and performs a control of printing the downloaded file.

As described above, the Web browser 310 mounted to the image processing apparatus 10 performs a control of printing a file to be downloaded or to be interpreted as a display target by the Web browser 410 of the information processing apparatus 40 when the file is printable. Accordingly, the image processing apparatus 10 can download and print contents using a Web application using a general purpose HTML.

The UI unit 413 of the Web browser 410 mounted in the information processing apparatus 40 receives, for example, the link depressing operation when the link depressing operation is performed by the user on the Web page. Next, the interpretation unit 414 interprets the HTML tag (a-tag (anchor tag)) of the link for which the link depressing operation is performed and notifies the UI unit 413 according to the interpretation result (the call transmission notification). This call transmission notification is a notification that causes the telephone number designated in the scheme "tel" in the attribute "href" of the a-tag to be charged.

The UI unit 413 of the Web browser 410 performs a process to electrify the designated telephone number when the telephone call notification is received.

On the other hand, the UI unit 313 of the Web browser 310 mounted in the image processing apparatus 10 receives the link depressing operation when the link depressing operation is performed by a user on the Web page, for example. Next, the interpretation unit 314 interprets the HTML tag (a-tag (anchor tag)) of the link for which the link depressing operation is performed and notifies the control unit 312 according to the result of the interpretation (facsimile transmission notification). This facsimile transmission notification causes image data generated by scanning to be faxed to the telephone number designated by a scheme "tel" in the attribute "href" of the a-tag.

When the facsimile transmission notification is received, the control unit 312 controls the image data generated by the scan and faxes the generated image data to the designated phone number.

As described above, the Web browser 310 mounted in the image processing apparatus 10 faxes image data generated by scanning to a telephone number that is interpreted as a call destination by the Web browser 410 of the information processing apparatus 40. Thus, in the image processing apparatus 10, image data can be generated and faxed by the Web application using the general purpose HTML.

<Details of Processing>

Next, the processing of the image processing system 1 according to the embodiment will be described in detail.

Example 1

As the first embodiment is the same as the first embodiment, the description thereof will not be repeated.

Example 2

Figure 25:
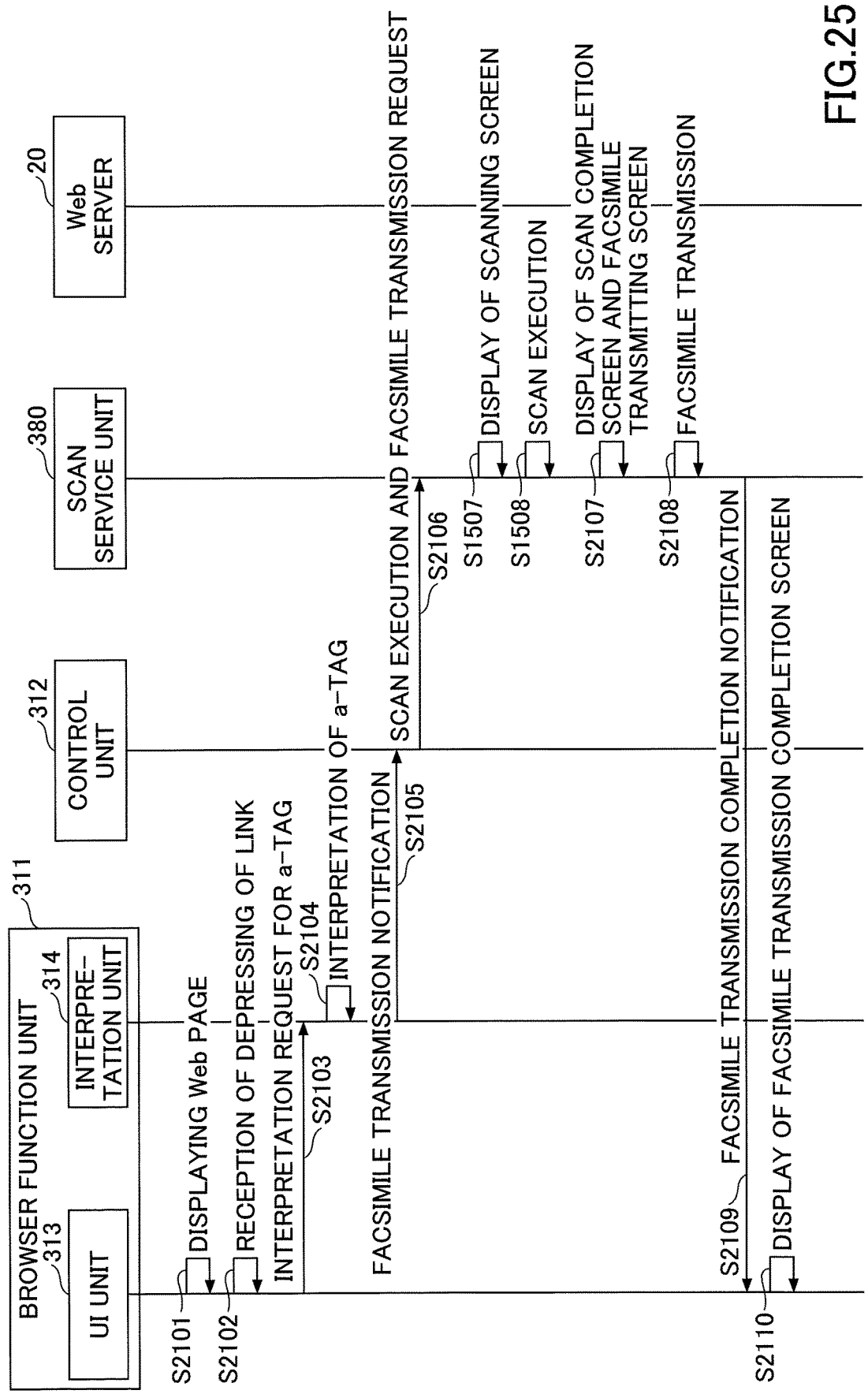
FIG. 25 is a sequence diagram illustrating an example of a scan process according to the embodiment.

Hereinafter, the process of transmitting the image data generated by the scan to the facsimile receiver 39 by the Web application using the general purpose HTML using the image processing apparatus 10 will be described with reference to FIG. 25. FIG. 25 is a sequence diagram illustrating an example of a scan and a facsimile transmission process in accordance with the embodiment.

Figure 26:
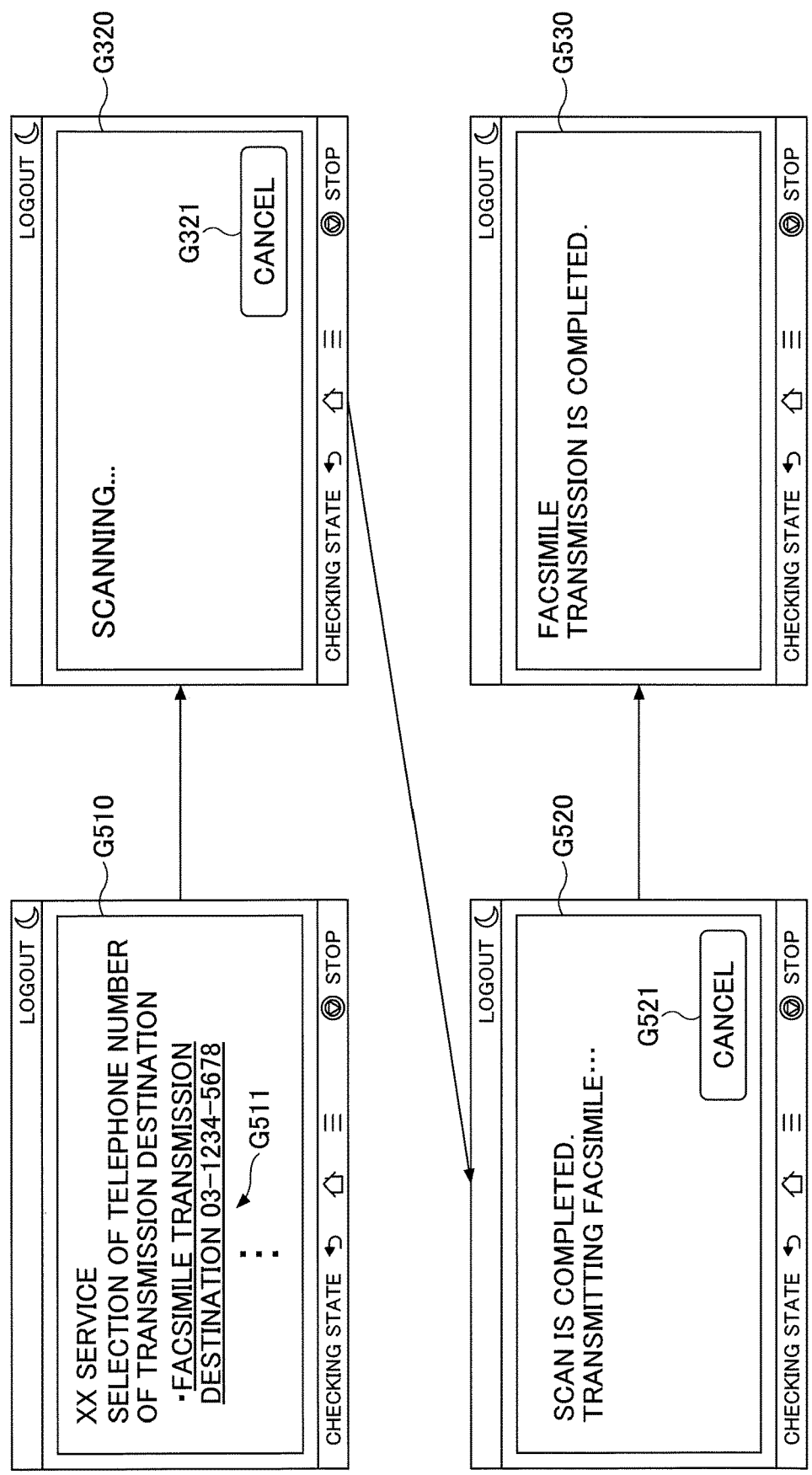
FIG. 26 is a diagram illustrating an example of a screen transition in a scan process.

First, in step S2101, the UI unit 313 of the browser function unit 311 displays, for example, the Web page G510 illustrated in FIG. 26. The Web page G510 illustrated in FIG. 26 is displayed when the interpretation unit 314 interprets the contents (HTML, CSS, JavaScript, or the like) acquired from the Web server 20. The contents can be acquired by, for example, entering a URL for displaying Web page G510 or clicking a link to the URL.

A Web page G510 illustrated in FIG. 26 includes a link G511 for transmitting faxes to a telephone number designated as a link destination. Here, suppose that the user depresses link G511. It is assumed that the scanner of the image processing apparatus 10 sets the document to be scanned.

In step S2102, the UI unit 313 of the browser function unit 311 receives the depression of the link G511 by the user. Here, the link G511 included in the Web page G510 illustrated in FIG. 26 is substantialized by an a-tag having the attribute "href" set as illustrated in FIG. 27. The attribute "href" of the a-tag illustrated in FIG. 27 has a telephone number designated in the scheme "tel". In addition, various other attributes may be set to the a-tag.

In step S2103, the UI unit 313 of the browser function unit 311 transmits the interpretation request of the a-tag that substantializes the link G511 depressed by the user to the interpretation unit 314.

In step S2104, the interpretation unit 314 of the browser function unit 311 interprets the a-tag that substantializes the link G511. That is, by interpreting the a-tag, the interpretation unit 314 specifies a scan and a fax transmission from the scheme "tel" designated as the attribute "href" of the a-tag.

Next, in step S2105, the interpretation unit 314 of the browser function unit 311 transmits the facsimile transmission notification to the control unit 312. The interpretation unit 314 can send a facsimile transmission notification by, for example, calling the Web browser 310 of the operation unit 11 or the API of the facsimile transmission library held inside the application. Alternatively, for example, the interpretation unit 314 may notify the transmission by calling a fax transmission program (or a fax transmission module or the like) in which the main body 12 is retained via the WebAPI. In this case, the phone number designated by the attribute "href" is designated as the argument of the API to be called.

In step S2106, when the control unit 312 receives the facsimile transmission notification, the control unit 312 transmits the scan execution and the fax transmission request to the designated telephone number to the scan service unit 380. For example, the control unit 312 may call the scan UI application 330 of the scan service unit 380 using intent.

In step S1507, the scan service unit 380 displays, for example, the scanning screen G320 illustrated in FIG. 26 upon receiving the scan execution and fax transmission request from the control unit 312. The scanning screen G320 illustrated in FIG. 26 is displayed by the scan UI application 330. The scanning screen G320 illustrated in FIG. 26 is displayed so that the user can know that the document is being scanned.

Next, in step S1508, the scan service unit 380 performs scanning of a document set in the scanner to generate image data. The scan may be performed by the scan UI application 330 transmitting a scan request to the scan application 360 via the WebAPI 340. Therefore, image data is generated from the document set in the scanner. The image data generated by the scan is stored, for example, in a predefined storage area in the flash memory 114.

If an error occurs during scanning, the scan application 360 transmits a notification to the scan UI application 330 indicating that an error has occurred. When the scan UI application 330 receives a notification indicating that the error has occurred, for example, it displays a screen indicating that the error has occurred.

The scanning screen G320 illustrated in FIG. 26 includes a cancel button G321. When the user depresses the cancel button G321, the scan UI application 330 transmits a scan request to the scan application 360 via the WebAPI 340. This stops scanning the original manuscript.

Subsequent to step S1508, in step S2107, the scan service unit 380 displays, for example, the scan completion screen and the screen G520 during facsimile transmission illustrated in FIG. 26. The scan application 360 of the scan service unit 380 transmits the scan result (for example, information representing the image data generated by the scan or the storage destination of the image data) to the facsimile transmission application 395.

When receiving the scan result, the facsimile transmission application 395 faxes the image data generated by the scan to the telephone number designated as the attribute "href" of the a-tag (step S2108). This causes the image data generated by the scan to be faxed to a designated phone number. The facsimile transmission application 395 may use a selected transmission line among a plurality of transmission lines (e.g., telephone lines, the Internet, etc.) for facsimile transmission.

A cancel button G521 is included in the screen G520 that is being scanned and faxed as illustrated in FIG. 26. When the cancel button G521 is depressed by the user, the scan UI application 330 transmits a fax stop request to the facsimile transmission application 395. This stops faxing the image data.

In step S2109, the facsimile transmission application 395 transmits the facsimile transmission completion notification to the UI unit 313 when the facsimile transmission is completed.

In step S2110, the UI unit 313 of the browser function unit 311 displays the facsimile transmission completion screen G530 illustrated in FIG. 26 when the facsimile transmission completion notification is received. The facsimile transmission completion screen G530 illustrated in FIG. 26 is displayed so that the user can know that the fax transmission of image data generated by scanning and scanning of the document has been completed. The image processing apparatus 10 may record the fax transmission history of the image data generated by the scan and print it on a sheet of paper.

As described above, the image processing apparatus 10 according to the embodiment can read an original manuscript by a scanner, generate image data, and fax the generated image data to the user when the link substantialized by the a-tag, which is a general purpose HTML tag, is depressed by the user. As described above, in the image processing apparatus 10 according to the embodiment, the scan function is substantialized without using a dedicated HTML tag for implementing the scan function.

Therefore, for example, the developer of the Web application provided by the Web server 20 can develop a Web application that implements the image processing function specific for the image processing apparatus 10 without requiring knowledge of dedicated JavaScript or HTML.

Figure 28:
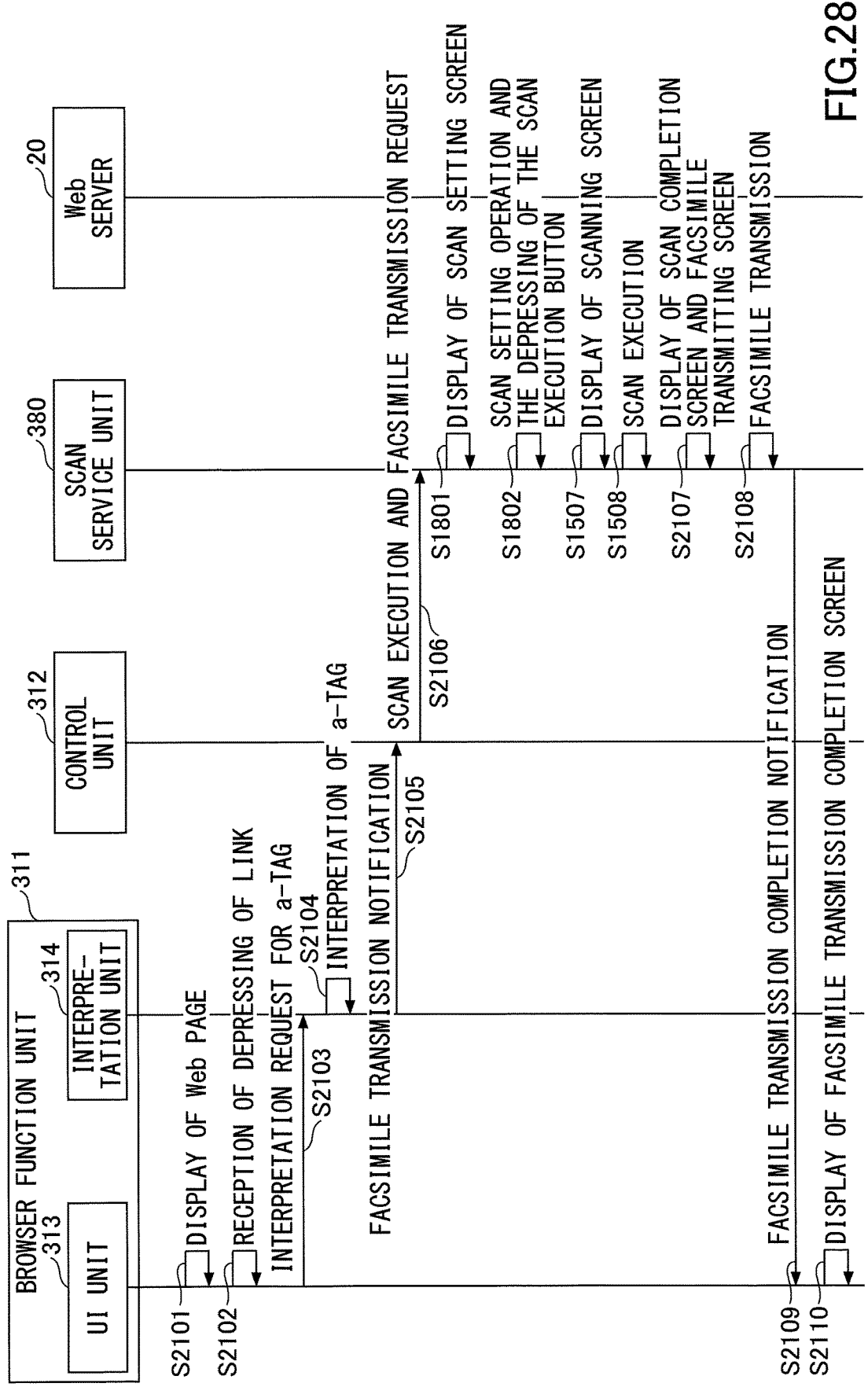
FIG. 28 is a sequence diagram illustrating another example of a scan process according to the embodiment.

(Other Examples of Example 2, Part 1) Next, another example (Part 1) of the scan process will be described with reference to FIG. 28. FIG. 28 is a sequence diagram illustrating another example (1) of the scan process according to the embodiment. Hereinafter, points that differ from the second embodiment of FIG. 25 will be described.

Figure 29:
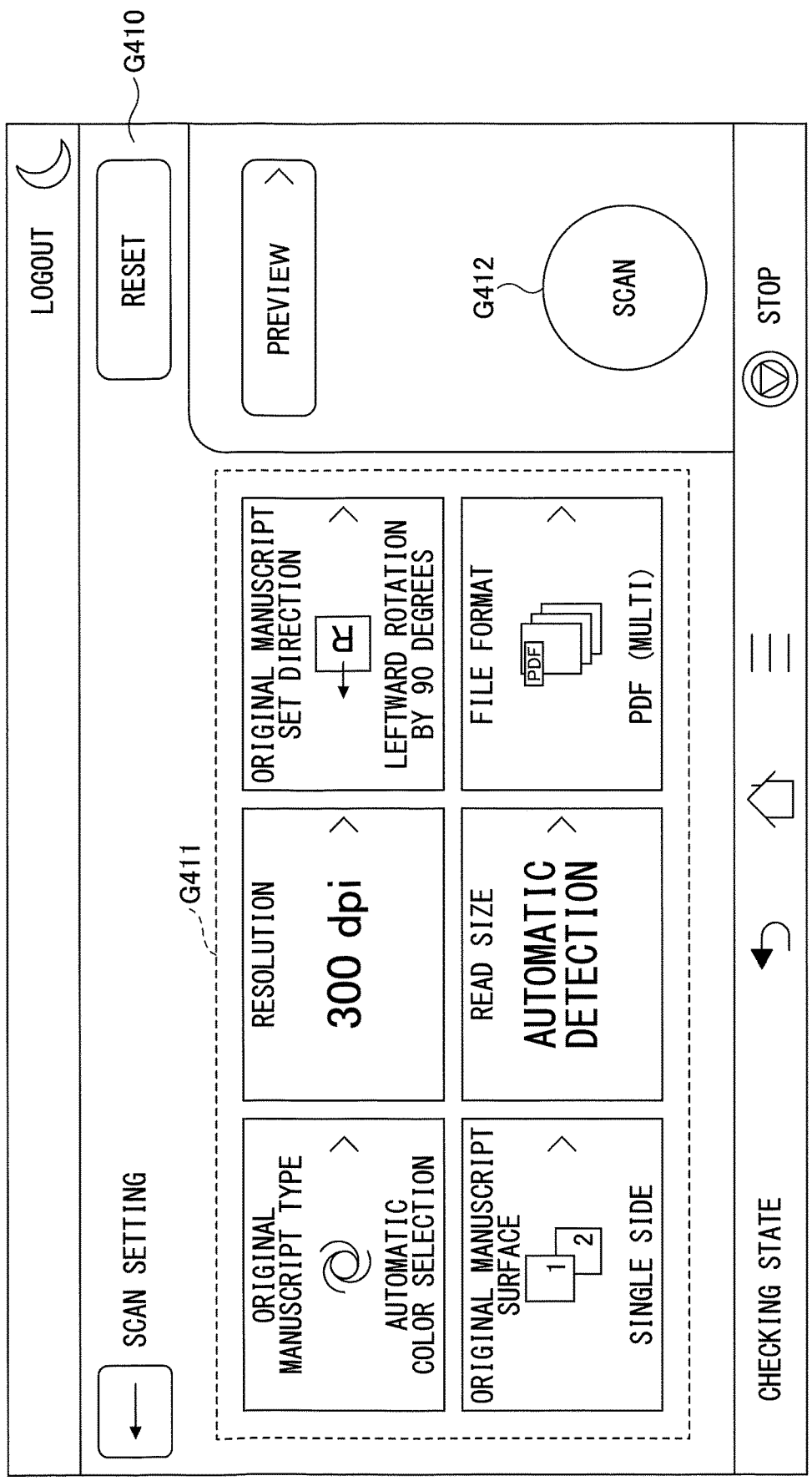
FIG. 29 is a diagram illustrating an example of a scan setting screen.

Following step S2106, when the scan service unit 380 receives the scan execution and fax transmission request from the browser function unit 311, in step S1801, for example, the scan setting screen G410 illustrated in FIG. 29 is displayed. The scan setting screen G410 illustrated in FIG. 29 is displayed by the scan UI application 330.

The scan setting screen G410 illustrated in FIG. 29 includes a scan setting field G411 and a scan execution button G412. For example, in the scan setting field G411, the user can specify various scan settings such as "document type", "resolution", "document set direction", "document surface", "read size", and "file format". Here, it is assumed that the user performs an operation to specify the scan setting in the scan setting field G411 (a scan setting operation) and then depresses the scan execution button G412.

In step S1802, the scan service unit 380 receives the user's scan setting operation and the depressing of the scan execution button G412. The scan setting operation and the depressing of the scan execution button G412 are received by the scan UI application 330. Accordingly, in step S1508, the original manuscript is scanned with the scan setting designated by the user.

Figure 30:
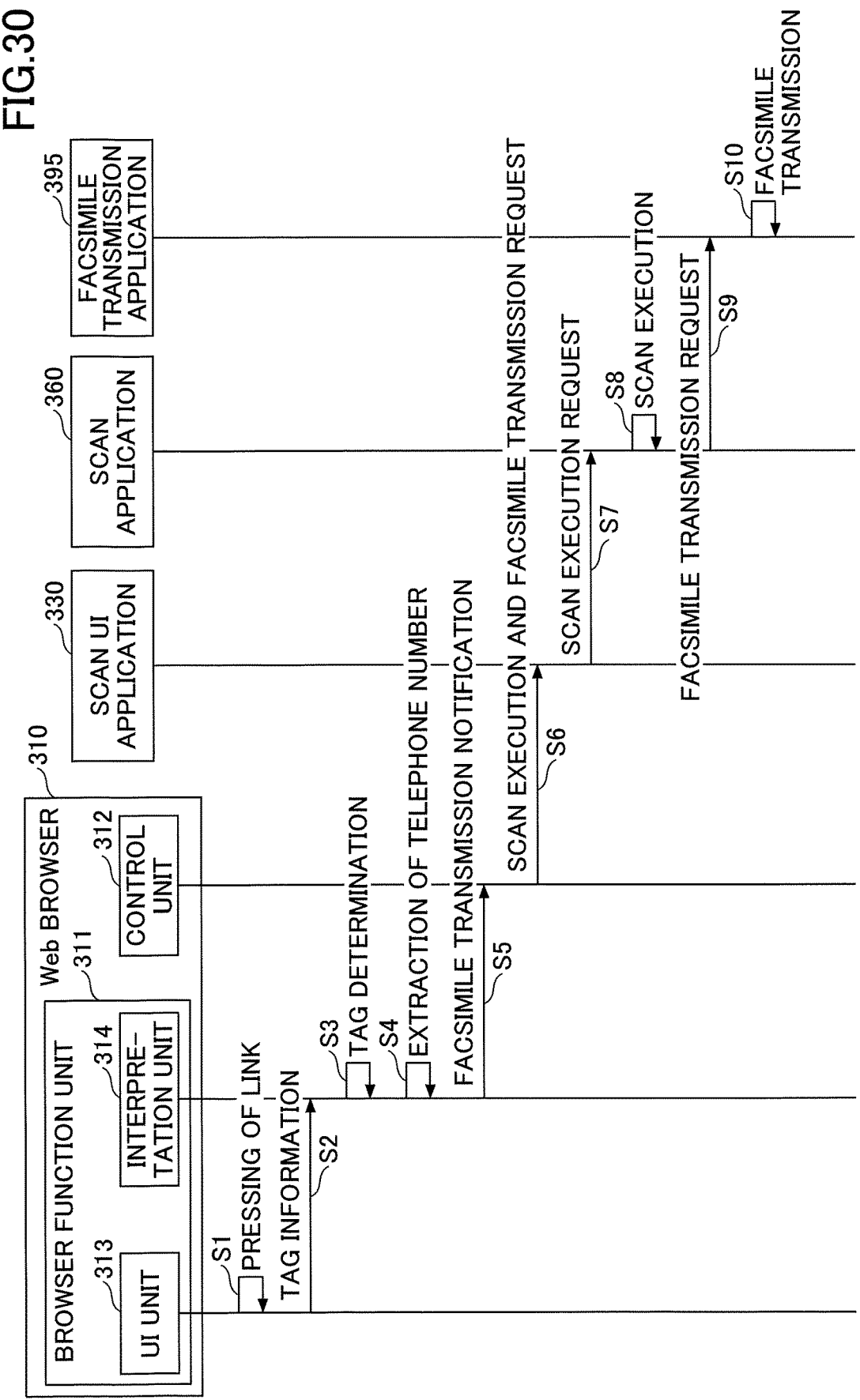
FIG. 30 is a sequence diagram illustrating an example of image processing based on the interpretation of the general purpose HTML tag in accordance with the embodiment.

FIG. 30 is a sequence diagram illustrating an example of image processing based on the interpretation of a general purpose HTML tag in accordance with the embodiment.

In step S1, the UI unit 313 receives the depressing of the link on the Web page by the user.

In step S2, the UI unit 313 requests the interpretation unit 314 to interpret the HTML tag corresponding to the link depressed in S1.

In step S3, the interpretation unit 314 interprets the HTML tag requested in S2. Specifically, the interpretation unit 314 determines whether the attribute "href" of the anchor tag (a-tag) starts at "tel".

In step S4, when the attribute "href" of the anchor tag (a-tag) starts at "tel" in S3, the interpretation unit 314 extracts the character string (that is, the phone number) after "tel".

In step S5, the interpretation unit 314 notifies the control unit 312 of the above-described facsimile transmission notification.

In step S6, the control unit 312 requests the scan UI application 330 to execute the scan and transmit the fax. At this time, the control unit 312 gives a telephone number extracted in S3 as a parameter.

In step S7, the scan UI application 330 requires the scan application 360 to perform the scan. At this time, the control unit 312 gives a telephone number extracted in S3 as a parameter.

In step S8, the scan application 360 performs the scan requested in S7 to generate image data.

In step S9, the scan application 360 requests the facsimile transmission application 395 to fax the image data generated by the scan in S8.

In step S10, the facsimile transmission application 395 performs the facsimile transmission required by S9. That is, the facsimile transmission application 395 faxes the image data generated by the scan in S8 to the telephone number assigned as a parameter in S6.

If the attribute "href" of the anchor tag (a-tag) does not start at "tel" in step S3, the processing described in (Example 1) can be performed. For example, if the file designated by the attribute "href" of the a-tag is a file that can be displayed by the Web browser 410 (for example, if the extension is html, img, pdf, etc.), the display notification is performed. On the other hand, for example, when the file designated by the attribute "href" of the a-tag is a file that cannot be displayed by the Web browser 410 (for example, when the extension is zip, etc.), the download notification is performed. When the download notification is received, the control unit 312 determines whether the downloaded file is printable. When the downloaded file is printable, the control unit 312 downloads the file and controls the downloaded file for printing. Meanwhile, when the display notification is received, the control unit 312 determines whether the file to be displayed is printable. When the file is printable, the control unit 312 downloads the file and performs a control of printing the downloaded file.

Figure 31:
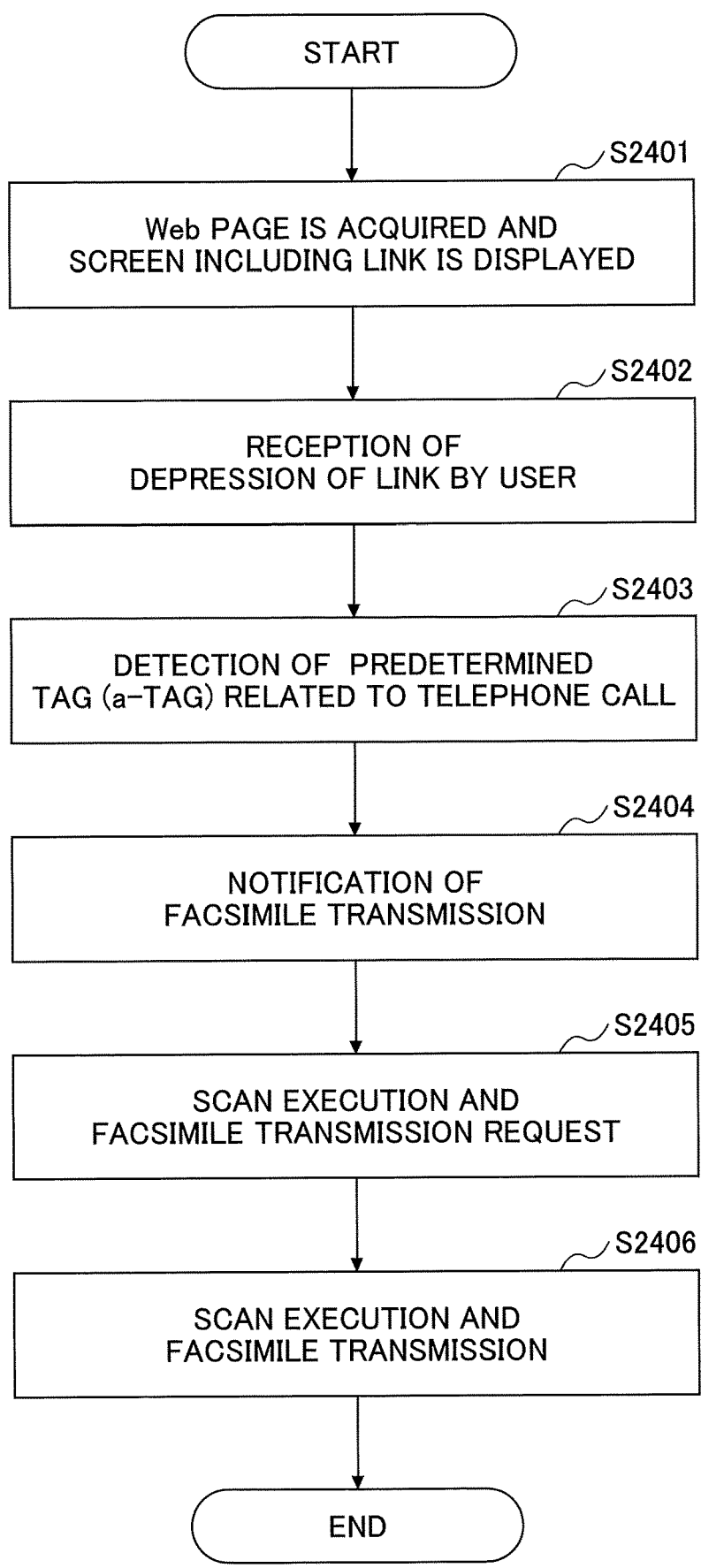
FIG. 31 is a flowchart illustrating an example of an operation of a Web browser during a scan and facsimile transmission process.

Next, an example of an operation of the Web browser 310 at the time of executing the scan and facsimile transmission processing will be described with reference to FIG. 31. FIG. 31 is a flowchart illustrating an example of an operation of the Web browser 310 during the scan and facsimile transmission process.

First, as described in step S2101 of FIG. 25, the Web browser 310 acquires contents (Web page) from the Web server 20 and displays a screen including a link (step S2401).

Next, the Web browser 310 accepts the depressing of the link by the user as described in step S2102 of FIG. 25 (step S2402). The Web browser 310 detects a predetermined tag (a-tag) related to a telephone call when the link is depressed (step S2403). In step S2404, the Web browser 310 performs a facsimile transmission notification as described in step S2105 of FIG. 25 when the a-tag is detected.

Next, the Web browser 310 performs the scan execution and fax transmission request as described in step S2106 of FIG. 25 (step S2405).

Thereafter, as described in step S1508 of FIG. 25, the scan application 360 performs a scan to generate image data. As described in step S2108 of FIG. 25, the facsimile transmission application 395 faxes the image data generated by the scan (step S2406).

<Another Example of Software Configuration>

Figure 32:
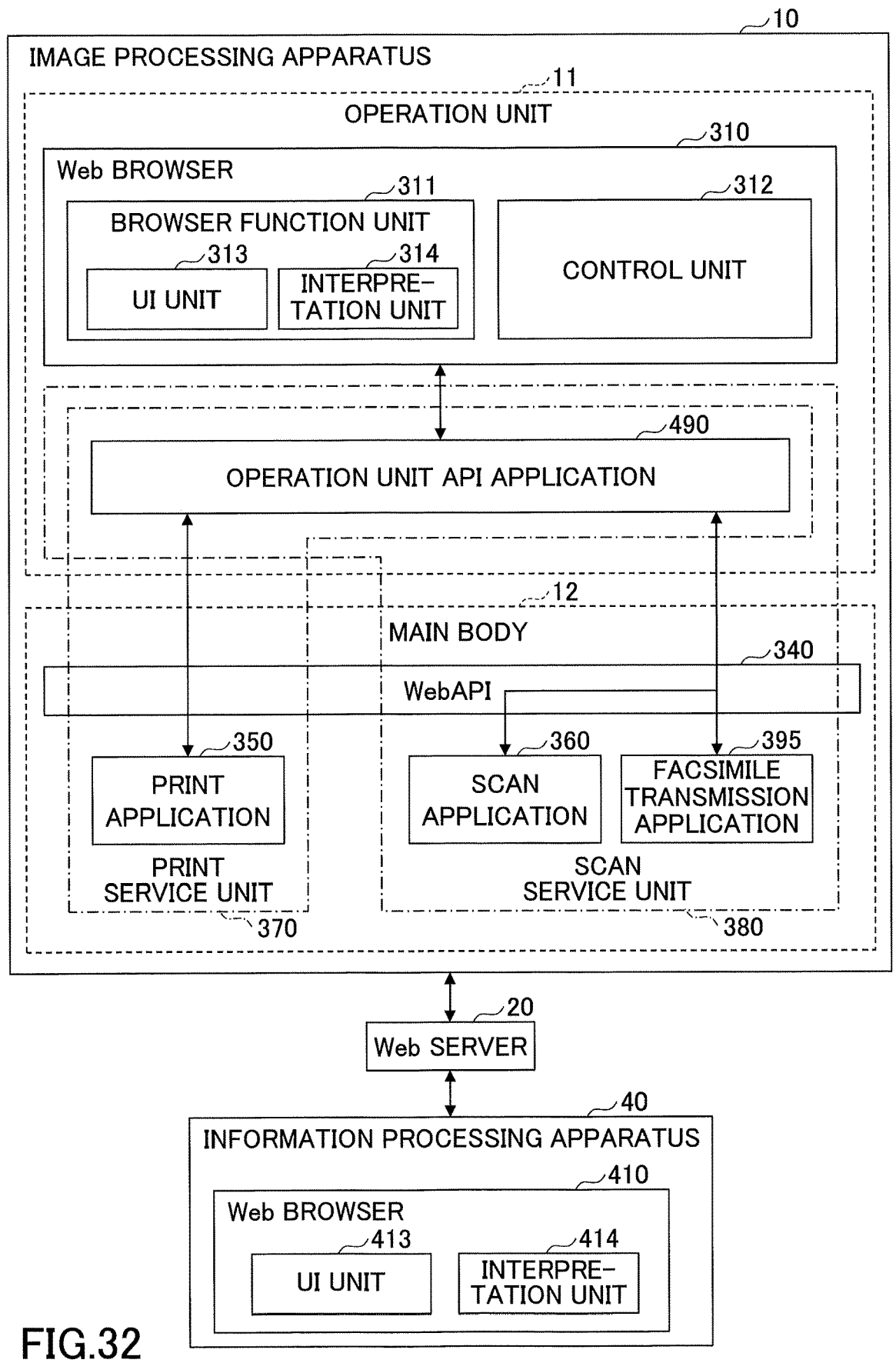
FIG. 32 is a diagram illustrating another example of a software configuration of an image processing system according to the embodiment.

Next, another example of the software configuration of the image processing apparatus 10 and the information processing apparatus 40 included in the image processing system 1 according to the embodiment will be described with reference to FIG. 32. FIG. 32 is a diagram illustrating another example of the software configuration of the image processing system 1 in accordance with this embodiment.

As illustrated in FIG. 32, the operation unit 11 of the image processing apparatus 10 according to the embodiment may include an operation unit API application 490 instead of the print UI application 320 and the scan UI application 330.

The operation unit API application 490 is an application program that provides a UI related to image processing such as printing and scanning. The operation unit API application 490 has the same function as an application that provides an image processing UI, such as a print UI application 320 or a scan UI application 330.

Accordingly, in the software configuration illustrated in FIG. 32, in the first embodiment and the second embodiment described above, the print UI application 320 and the scan UI application 330 may be read as the operation unit API application 490. By using the operation unit API application 490, the UI for various image processing such as print and scan can be provided in an integrated manner.

The operation unit API application 490 includes an API group for developing applications that provide UIs for image processing by a third vendor or the like. A third vendor or the like can easily develop an application that provides a UI related to an image without requiring knowledge of the specifications of the WebAPI 340 by using the API group of the operation unit API application 490. That is, the operation unit API application 490 can be referred to as an application program that provides a third vendor or the like with an API group of which webAPI 340 is wrapped.

In the software configuration illustrated in FIG. 32, the operation unit 11 includes the operation unit API application 490 instead of the print UI application 320 and the scan UI application 330, but is not limited thereto. The operation unit 11 may include an operation unit API application 490 in addition to the print UI application 320 and the scan UI application 330.

One embodiment of the present invention is available, for example, in the following scenes. The Web application, such as the shop site, can be easily scanned and faxed from the operation unit 11 of the image processing apparatus 10 to the fax number that is described when the operation unit 11 of the image processing apparatus 10, such as the MFP, is opened by the Web browser 310. It also makes it easier to fax quotes to the fax numbers posted on the client's Web page. Therefore, even when a Web page created without being aware of job execution in the image processing apparatus 10, such as MFP, is displayed in the Web browser 310 of the operation unit 11 of the image processing apparatus 10, the user can easily instruct the execution of the job. Further, the developer of the Web page may cooperate with the image processing apparatus 10 and the Web page (Web application) without creating a dedicated Web page for having the image processing apparatus 10 such as the MFP execute the job.

Third Embodiment

In recent years, in an image forming apparatus such as MFP (Multifunction Peripheral), a Web browser has been installed on an operation panel and a technology for displaying contents received from a Web server is known. Here, the MFP is a multifunctional machine that has at least two functions: a copy function, a printer function, a scanner function, and a fax function.

As an MFP in which a Web browser is installed in the operation panel, there is disclosed a technology in which various image forming functions such as print and scan are substantialized using a Web application running on the Web browser.

However, in order to substantialize various image forming functions such as print and scan using a Web application running on a Web browser, it is necessary to describe HTML (HyperText Markup Language) using JavaScript ("JavaScript" is a registered trademark), which is specific for the image forming function. In this case, the scan and printing UI (User Interface) will start up individually if the Web application invokes the scan and print functions without describing the image forming function specific for HTML described above. Accordingly, there has been a problem in which scan and print settings must be made in individual UIs and scan and print operations cannot be performed continuously.

An object of the present invention is to provide an image forming apparatus, an image processing system, an image processing method, and a program that can perform a scan operation and a print operation in a series of operations only once for setting a job.

According to the present invention, the scan operation and the print operation can be performed in a series of operations with only one setting of the job.

Hereinafter, embodiments of an image forming apparatus, an image processing system, an image processing method, and a program according to the present invention will be described in detail with reference to the figures. Also, the invention is not limited by the following embodiments, and the components in the following embodiments include those readily apparent to those skilled in the art, substantially identical, and so-called equivalents. In addition, various omissions, substitutions, modifications and combinations of the components can be made without departing from the spirit of the following embodiments.
(Structure of Image Processing System)

Figure 33:
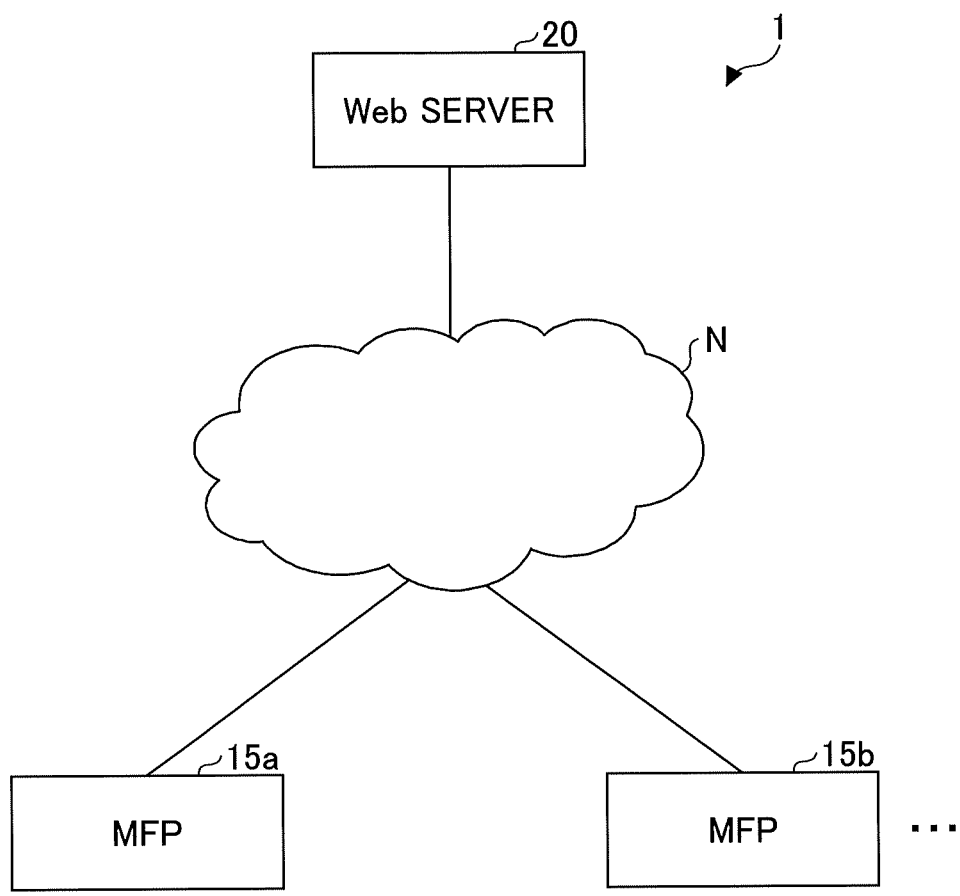
FIG. 33 is a diagram illustrating an example of the configuration of an image processing system according to the embodiment.

FIG. 33 is a diagram illustrating an example of the structure of an image processing system according to an embodiment. Referring to FIG. 33, the configuration of the image processing system 1 according to the embodiment will be described.

As illustrated in FIG. 33, the image processing system 1 according to the embodiment includes at least one MFPs (MFP 15a, 15b, . . . ) and a Web server 20 (an example of the first server and the second server). Incidentally, in FIG. 33, although MFP 15a, 15b, . . . are illustrated if any communication terminal is illustrated or collectively referred to as "MFP 15". Further, the MFP 15 and the Web server 20 can communicate with each other via a wide area network N, such as the Internet. The network N may include a wired network as well as a wireless network.

The MFP 15 is an image forming apparatus in which a Web browser is installed. The user of the MFP 15 may utilize a Web application provided by the Web server 20 to upload, for example, image data generated by scanning to the Web server 20 and print image data downloaded from the Web server 20.

The Web server 20 is an information processing apparatus or an information processing system that provides a Web application using the general purpose HTML to the MFP 15 through the network N. Here, the general purpose HTML is HTML5 or HTML5.1, etc., as designated in W3C (World Wide Web Consortium). The general purpose HTML means that, unlike the contents defined to be interpretable only by an apparatus such as an image forming apparatus (extended contents such as extended HTML and extended JavaScript ("JavaScript" is a registered trademark)), the general purpose Web browser is interpretable contents regardless of the type of apparatus.

A variety of Web services are substantialized by the Web server 20 providing the Web application. Examples of such Web service include a cloud storage service, a social networking service (SNS), a cloud printing service, a blogging service, a bulletin board service, an online game service, and an online shopping service.

The structure of the image processing system 1 illustrated in FIG. 33 is an example and may be another configuration. For example, the image processing system 1 may include an image processing apparatus other than the MFP 15. The Web server 20 provides a Web application to the MFP 15 and has a function to perform image processing on an image read by the scanner transmitted from the MFP 15 as described below. However, the image processing may be performed by a server (an example of a second server) different from the Web server 20 (a first server).
(MFP Hardware Structure)

Figure 34:
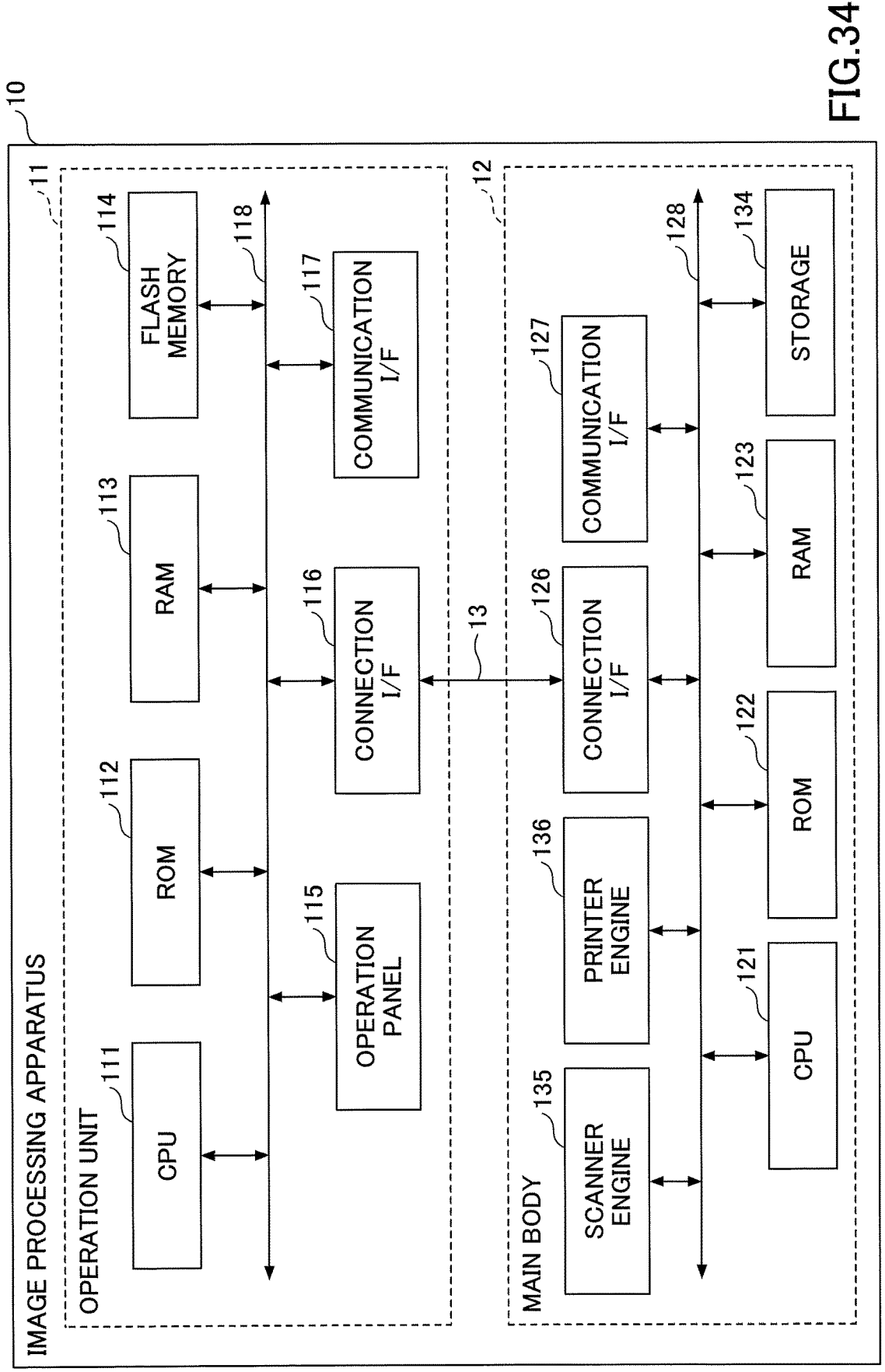
FIG. 34 illustrates an example of a hardware structure of an MFP according to the embodiment.

FIG. 34 is a diagram illustrating an example of a hardware structure of the MFP according to this embodiment. Referring to FIG. 34, the hardware structure of the MFP 15 according to the embodiment will be described.

As illustrated in FIG. 34, the MFP 15 includes an operation unit 11 for receiving operation by a user and a main body 12 for implementing various image forming functions such as a scanner function and a printer function. Here, the concept of accepting the operation of the user includes receiving information (including a signal representing the coordinate value of the screen) input in accordance with the operation of the user.

The operation unit 11 and the main body 12 are connected to each other communicatively through a dedicated communication line 13. The communication line 13 may be, for example, of the USB (Universal Serial Bus) standard, but is not limited thereto, and may be of any standard, whether wired or wireless. The main body 12 performs an operation according to the operation received by the operation unit 11.

The main body 12 can also communicate with an external apparatus and perform an operation according to an instruction received from the external apparatus.

<Hardware Configuration of Control Unit>

As illustrated in FIG. 34, the operation unit 11 includes a CPU (Central Processing Unit) 111, a ROM (Read Only Memory) 112, a RAM (Random Access Memory) 113, a flash memory 114, an operation panel 115, a connection I/F 116, a communication I/F 117, and a bus 118.

The CPU 111 is an arithmetic device that comprehensively controls the operation of the operation unit 11. The CPU 111 executes a program stored in the ROM 112 or the flash memory 114 as the work area (work area) of the RAM 113 and controls the operation of the entire operation unit 11. For example, the CPU 111 substantializes various functions such as displaying information (image) according to the input received from the user on the operation panel 115.

The ROM 112 is, for example, a non-volatile memory that stores BIOS (Basic Input/Output System) executed at the startup of the operation unit 111 and various settings. RAM 113 is a volatile memory used as a work area or the like of CPU 111. The flash memory 114 is a non-volatile storage device for storing, for example, an OS (operating system), an application program, and various data.

The operation panel 115 is a device having an input function and a display function that receives various inputs according to a user's operation and displays various information (for example, information according to a received operation, information indicating the operation status of the MFP 15, and setting information, etc.). For example, the operation panel 115 is configured by an LCD (Liquid Crystal Display) having a touch panel function. The operation panel 115 is not limited to a liquid crystal display device. For example, the operation panel 115 may be configured as an organic EL (Electro-Luminescence) display device having a touch panel function. The operation panel 115 may also include an operation unit, such as a hardware key, or a display unit, such as a lamp, in addition to or in place of a touch panel function.

The connection I/F 116 is an interface for communicating with the main body 12 through the communication line 13.

The communication I/F 117 is a network interface that connects the operation unit 11 to the network N and communicates with an external apparatus connected to the network N. For example, the communication I/F (interface) 117 is an interface compatible with Ethernet ("Ethernet" is a registered trademark) and capable of communication conforming to TCP (Transmission Control Protocol)/IP (Internet Protocol), etc.

The bus 118 is a transmission line that connects the above-described components to each other and transmits an address signal, a data signal, various control signals, and the like.

The hardware structure of the operation unit 11 illustrated in FIG. 34 is an example, and may include a component other than the components illustrated in FIG. 34.

<Hardware Structure>

As illustrated in FIG. 34, the main body 12 includes a CPU 121, a ROM 122, a RAM 123, a storage 134, a scanner engine 135, a printer engine 136, a connection I/F 126, a communication I/F 127, and a bus 129.

The CPU 121 is an arithmetic device that comprehensively controls the operation of the main body 12. The CPU 121 controls the operation of the entire main body 12 by executing a program in which the RAM 123 is stored in the ROM 122 or the storage 134 as a work area (a working area). For example, the CPU 121 implements various functions such as a copy function, a scanner function, a fax function, and a printer function.

The ROM 122 is, for example, a non-volatile memory that stores the BIOS executed at the startup of the main body 12 and various settings. The RAM 123 is a volatile memory used as a work area of CPU 121 or the like. The storage 134 is a non-volatile storage device that stores, for example, OS, application programs, and various data. The storage 134 may comprise, for example, an HDD (hard disk drive) or an SSD (solid state drive) or the like.

The scanner engine 135 is a hardware that performs general purpose information processing and a process other than the communications for substantializing the scanner function of scanning document as an image among the image forming function. The printer engine 136 is a hardware that performs general purpose information processing and non-communication processing for substantializing the printer function that performs printing on a printing medium such as a paper among the image forming functions.

The connection I/F 126 is an interface for communicating with the operation unit 11 through the communication line 13.

The communication I/F 127 is a network interface for connecting the main body 12 to the network N and communicating with an external apparatus connected to the network N. For example, the communication I/F (interface) 128 is an interface compatible with Ethernet and capable of communication conforming to TCP/IP.

The bus 129 is a transmission line that connects the above-described components to each other and transmits an address signal, a data signal, various control signals, and the like.

The hardware structure of the main body 12 illustrated in FIG. 34 is an example, and may include a component other than the components illustrated in FIG. 34.

For example, there may be a specific option such as a finisher for sorting printed media or an ADF (Auto Document Feeder) for automatically feeding an original manuscript.

(Web Server Hardware Structure)

Figure 35:
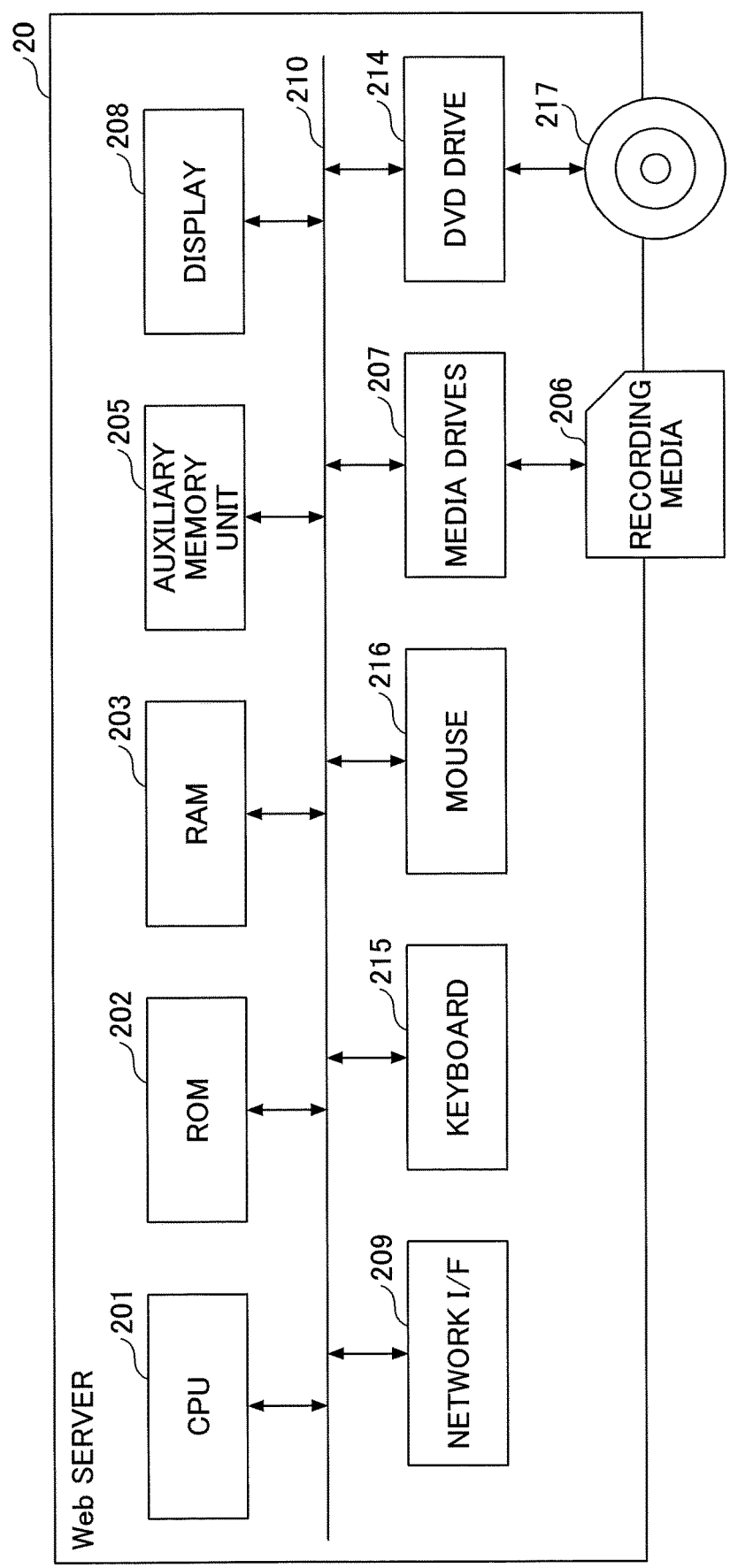
FIG. 35 is a diagram illustrating an example of a hardware structure of a Web server according to the embodiment.

FIG. 35 is a diagram illustrating an example of a hardware structure of the Web server according to the embodiment. Referring to FIG. 35, the hardware structure of the Web server 20 according to this embodiment will be described.

As illustrated in FIG. 35, the Web server 20 includes a CPU 201, a ROM 202, a RAM 203, an auxiliary memory device 205, a media drive 207, a display 208, a network I/F 209, a keyboard 215, a mouse 216, and a DVD (Digital Versatile Disc) drive 214.

The CPU 201 is an arithmetic device that controls the operation of the entire Web server 20. The ROM 202 is a non-volatile storage device that stores a program for the Web server 20. The RAM 203 is a volatile storage device used as a work area of the CPU 201.

The auxiliary memory device 205 is a storage device such as an HDD or an SSD that stores images or the like read out by the MFP 15 by the scan function. The media drive 207 is a device that controls the reading and writing of data to the recording medium 206, such as a flash memory, according to the control of the CPU 201.

Display 208 is a display device configured with liquid crystal or organic EL for displaying various information such as a cursor, a menu, a window, a text or an image.

The network I/F 209 is an interface for communicating data with an external apparatus such as the MFP 15 using the network N. The network I/F 209 is, for example, a network interface card (NIC) compatible with Ethernet and capable of communication compliant with TCP/IP.

The keyboard 215 is an input device that selects characters, numbers, various indicia, moves the cursor, and the like. The mouse 216 is an input device for selecting and executing various instructions, selecting a processing target, moving the cursor, and the like.

The DVD drive 214 is an apparatus for controlling the reading and writing of data to a DVD 213, such as a DVD-ROM or a DVD-R (Digital Versatile Disk Recordable) as an example of a removable storage medium.

The CPU 201, the ROM 202, the RAM 203, the auxiliary memory device 205, the media drive 207, the display 208, the network I/F 209, the keyboard 215, the mouse 216, and the DVD drive 214 are communicatively connected to each other by bus lines 210 such as address bus and data bus.

The hardware structure of the Web server 20 illustrated in FIG. 35 is one example, and it is not necessary to include all of the components illustrated in FIG. 35, or it may include other components.

(MFP Software Hierarchy)

Figure 36:
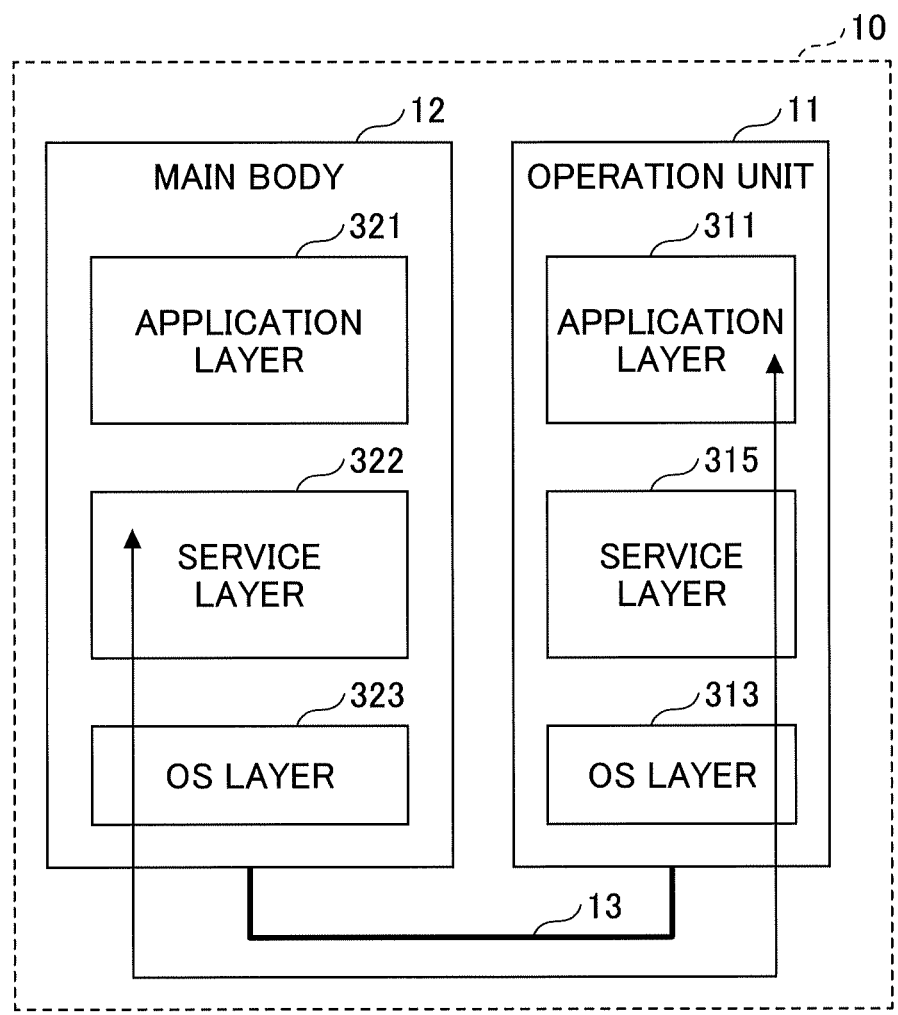
FIG. 36 illustrates an example of a hierarchical configuration of MFP software according to an embodiment.

FIG. 36 is a diagram illustrating an example of a hierarchical configuration of software of an MFP according to an embodiment. Referring to FIG. 36, a hierarchical configuration of the software of the MFP 15 according to the embodiment will be described.

As illustrated in FIG. 36, the main body 12 of the MFP 15 includes an application layer 321, a service layer 322, and an OS layer 323.

The actual application layer 321, service layer 322, and OS layer 323 are various software stored in ROM 122, storage 134, and the like. The CPU 121 executes these software (programs) to provide various functions of the main body 12.

The application layer 321 is application software for operating hardware resources to provide predetermined functions (hereinafter, simply referred to as an "application"). Examples of the application include a copy application for providing a copy function, a scanner application for providing a scanner function, a facsimile application for providing a facsimile function, and a printer application for providing a printer function.

The service layer 322 is software that interfaces between the application layer 321 and the OS layer 323 and provides the application of the application layer 321 with an interface for utilizing the hardware resources provided by the main body 12. Specifically, the service layer 322 receives the operation request for the hardware resources and provides a function to arbitrate the operation request. Operational requirements received by the service layer 322 include requirements such as scanner reading and plotter printing. The interface function by the service layer 322 is provided not only to the application layer 321 of the main body 12 but also to the application layer 316 of the operation unit 11. That is, the application layer 316 of the operation unit 11 can also implement functions utilizing hardware resources (for example, the scanner engine 135, the printer engine 136, or the like) of the main body 12 through the interface function of the service layer 322 of the main body 12.

The OS layer 323 is the basic software (operating system) for providing basic functions for controlling the hardware provided by the main body 12. The service layer 322 converts hardware resource usage requests from various applications into commands that can be interpreted by the OS layer 323 and passes them to the OS layer 323. When the command is executed by the OS layer 323, the hardware resource performs an operation in accordance with the request of the application.

As illustrated in FIG. 36, the operation unit 11 of the MFP 15 includes an application layer 316, a service layer 315, and an OS layer 318. The application layer 316, the service layer 315, and the OS layer 318, which are included in the operation unit 11, are the same as in the main body 12 in terms of the hierarchical configuration. However, the functions provided by the applications of the application layer 316 and the types of operation requests that the service layer 317 can receive are different from those of the main body 12.

The application of the application layer 316 may be software for operating the hardware resources provided by the operation unit 11 to provide predetermined functions, but primarily provides the functions of the UI for operating and displaying the functions provided by the main body 12.

In the embodiment, the software of the OS layer 323 on the main body 12 side and the software of the OS layer 318 on the operation unit 11 side are different from each other in order to maintain the functional independence. That is, the main body 12 and the operation unit 11 operate independently of each other by separate operating systems. For example, Linux (registered trademark) may be used as the software of the OS layer 323 on the main body 12 side, and Android (registered trademark) may be used as the software of the OS layer 318 on the operation unit 11 side.

As described above, in the MFP 15 of this embodiment, because the main body 12 and the operation unit 11 operate in a separate operating system, communication between the main body 12 and the operation unit 11 is not performed as communication between processes within a common device, but as communication between different devices. This corresponds to an operation in which information (contents of operation instructions from the user) received by the operation unit 11 is transmitted to the main body 12 (command communication) and an operation in which the main body 12 transmits information to the operation unit 11. Here, the function of the main body 12 can be used by the operation unit 11 to perform command communication to the main body 12. Further, the information transmitted from the main body 12 to the operation unit 11 includes, for example, the state of performing the operation in the main body 12 and the contents set on the main body 12 side.

(Functional Block Configuration of Image Processing System)

Figure 37:
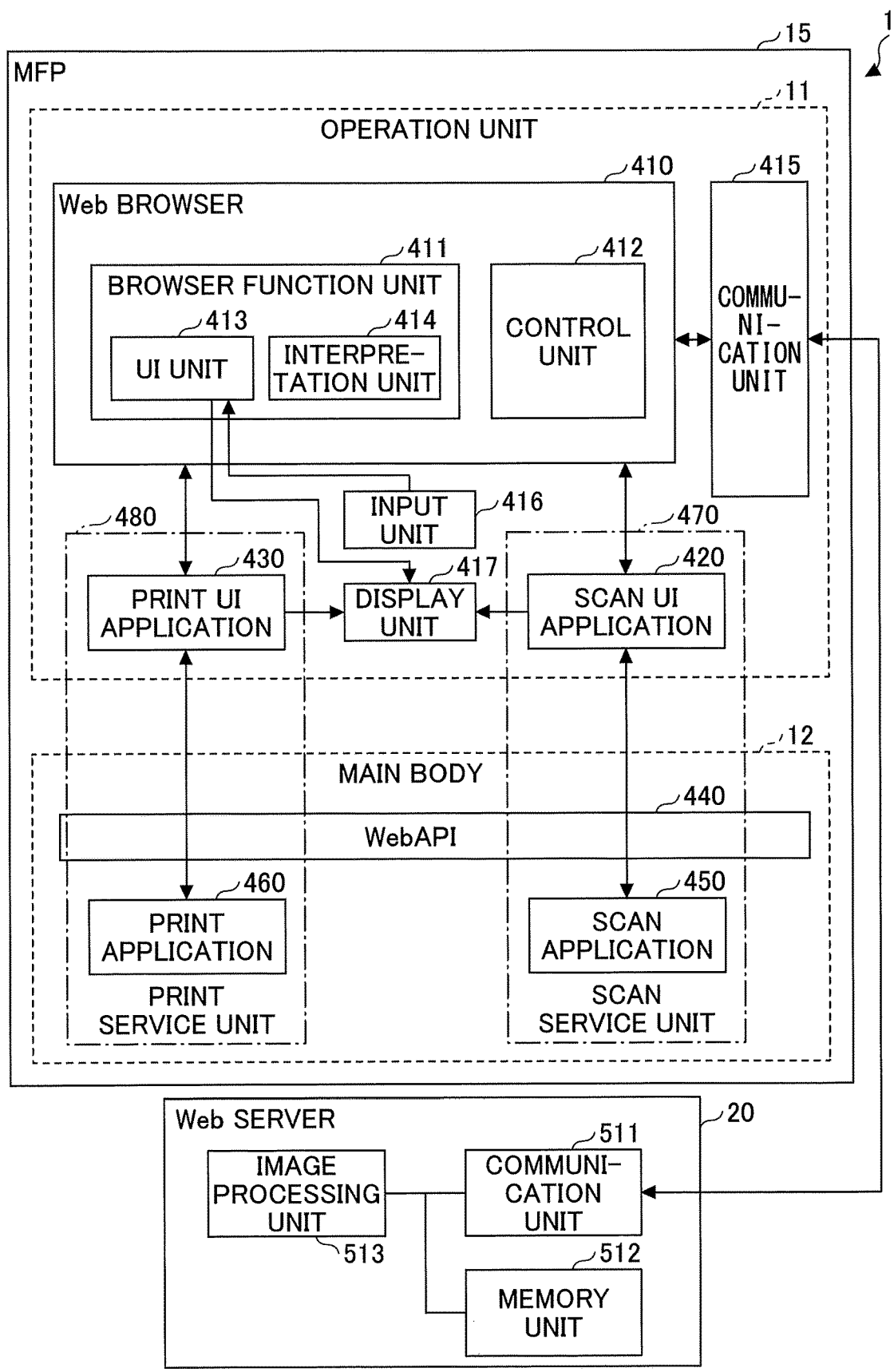
FIG. 37 is a diagram illustrating an example of a configuration of a functional block of an image processing system according to the embodiment.

FIG. 37 is a diagram illustrating an example of a configuration of a functional block of an image processing system according to an embodiment. Referring to FIG. 37, the configuration of the functional block of the image processing system 1 according to the embodiment will be described.

<Function Block Configuration of MFP>

As illustrated in FIG. 37, the operation unit 11 of the MFP 15 according to the embodiment includes a Web browser 410, a communication unit 415, an input portion 416, a display unit 417, a scan UI application 420, and a print UI application 430. Among these, the Web browser 410, the scan UI application 420, and the print UI application 430 are executed by the CPU 111.

The main body 12 of the MFP 15 according to the embodiment includes a WebAPI (Application Program Interface) 440, a scan application 450, and a print application 460. WebAPI 440, scan application 450, and print application 460 are executed by CPU 121.

The Web browser 410 implements the Web application functions by acquiring Web contents (for example, HTML, CSS (Cascading Style Sheets), JavaScript, various electronic files, and the like) from the Web server 20.

For example, the Web browser 410 acquires Web contents from the Web server 20 that provides the SNS and substantializes the function of the Web application that performs viewing of the SNS and file sharing on the SNS. For example, the Web browser 410 implements a Web application function for viewing storage or uploading files to storage by acquiring Web contents from the Web server 20 that provides cloud storage services.

In general, the Web application is substantialized by operating the contents obtained from the Web server 20, such as JavaScript, on the Web browser 410 and performing the processing in cooperation with the Web server 20.

Web browser 410 includes a browser function unit 411 and a control 412. Hereafter, Web contents may simply be referred to as "content".

The browser function unit 411 interprets and displays contents and the like. The browser function unit 411 includes a UI unit 413 (a display control unit) and an interpretation unit 414.

The UI unit 413 displays a Web page or the like according to the contents acquired from the Web server 20, that is, a Web page provided by the Web application on the display unit 417. The UI unit 413 receives various operations (for example, depress a link) on the Web page by the user's operation input to the input unit 416.

The interpretation unit 414 interprets the HTML tag included in the Web page and notifies the control unit 412 according to the interpretation result.

The control unit 412 performs a control of executing the image forming function of the MFP 15 in response to a notification from the interpretation unit 414 of the browser function unit 411. For example, when the control unit 412 receives the file selection notification indicating that a file is selected from the interpretation unit 414, the control unit 412 performs a control of scanning the document set in the MFP 15 and uploading the read image to the Web server 20. For example, when the control unit 412 receives the display notification indicating that the contents of the linked destination is displayed from the interpretation unit 414 and when the contents are in a predetermined format (for example, PDF (Portable Document Format)), the control unit 412 performs a control of downloading and printing the contents.

Because the Web browser 410 includes a browser function unit 411 that implements a Web application function and a control unit 412 that controls an image forming function of the MFP 15, the Web browser 410 may be referred to as a so-called hybrid application. Web browser 410 is implemented in a programming language such as, for example, Java ("Java" is a registered trademark). That is, the browser application constituting the Web browser 410 comprises a Java application program. The Java application uses the API provided by the operation unit 11 to call the browser function unit 411 provided by the operation unit 11 to form a Web browser 410 including the interpretation unit 414 and the UI unit 413. The underlying Java application program includes a control unit 412 which provides flexibility in the operation of the Web contents after the tag is interpreted so that image forming (scan and print) operations as well as the general purpose HTML operations (download and upload) can be requested.

The communication unit 415 performs data communication with the Web server 20 through the network N according to the control of the Web browser 410. The communication unit 415 is substantialized by the communication I/F 117 illustrated in FIG. 34.

The input unit 416 receives operation input from a user. The input unit 416 is implemented by the input function of the operation panel 115 illustrated in FIG. 34.

The display unit 417 displays various kinds of information in accordance with instructions of the UI unit 413, the scan UI application 420, and the print UI application 430. The display unit 417 is substantialized by the display function of the operation panel 115 illustrated in FIG. 34.

The scan UI application 420 is an application program that provides a UI for the scan. The scan UI application 420 causes the display unit 417 to display, for example, a screen indicating that the scan is in progress and a screen indicating that the scan has been completed.

The scan UI application 420 requests the scan application 450 to execute the scan through the WebAPI 440 in response to a request from the control unit 412.

The print UI application 430 is an application program that provides a UI for printing. The print UI application 430 displays, for example, a screen indicating that printing is in progress and a screen indicating that printing has been completed on the display unit 417.

The print UI application 430 requests the print application 460 to execute the print through the WebAPI 440 in response to a request from the control unit 412.

The WebAPI 440 is an API for requesting the scan UI application 420 and the print UI application 430 to perform image formation.

The scan application 450 controls the scanner engine 135 to execute the scan in response to a request from the scan UI application 420.

The print application 460 controls and performs printing of printer engine 136 upon a request from print UI application 430.

Hereinafter, the scan UI application 420, the WebAPI 440, and the scan application 450 are referred to as the "scan service unit 470" (the first image forming unit). Further, the print UI application 430, the webAPI 440, and the print application 460 are represented as a "print service unit 480" (the second image forming unit).

The operation unit 11 may include, for example, an application that provides a UI for copying, an application that provides a UI for faxing, or an application that provides a UI for OCR (Optical Character Recognition). The main body 12 may also include, for example, applications for copy, fax, or OCR implementation. Accordingly, the MFP 15 may include various image forming (image processing) service units, for example, the copy service unit, the fax service unit, the OCR service unit, and the like.

In addition to the image forming (image processing) service unit, the MFP 15 includes, for example, an address book service unit that executes processing related to the address book held by the MFP 15 and an authentication service unit that executes processing related to authentication for a user to use the MFP 15.

<Web Server Function Block Configuration>

As illustrated in FIG. 37, the Web server 20 according to this embodiment includes a communication unit 511, a memory unit 512, and an image processing unit 513.

The communication unit 511 communicates data with the MFP 15 through the network N according to a control of the image processing unit 513. The communication unit 511 is substantialized by the network I/F 209 illustrated in FIG. 35.

The memory unit 512 stores images and the like uploaded from the MFP 15. The memory unit 512 is implemented by the RAM 203 or the auxiliary memory device 205 illustrated in FIG. 35.

The image processing unit 513 is a function unit that performs image processing such as inserting an advertisement or adding a watermark, such as a logo mark, to an image uploaded from the MFP 15. For example, the image processing unit 513 may insert an advertisement between each image so that the advertisement is printed on the back surface when the advertisement is subsequently printed by the MFP 15. The image processing unit 513 is substantialized by executing a program by the CPU 201 illustrated in FIG. 35.

<Comparison of Operations of MFP and General Purpose Information Processing Apparatus>

For example, a PC (Personal Computer) is assumed as a general purpose information processing apparatus. Hereinafter, a general purpose information processing apparatus, is simply referred to as an "information processing apparatus".

When a file selection operation is performed by a user on a Web page, for example, the Web browser installed in the information processing apparatus interprets the HTML tag (input tag) of the button where the operation was performed and provides a notification (file selection notification) according to the interpretation result. The Web browser, for example, uploads the selected file to the designated server.

On the other hand, the UI unit 413 of the Web browser 410 installed in the MFP 15 accepts the operation when, for example, a file selection operation is performed by a user on the Web page. Next, the interpretation unit 414 interprets the HTML tag (input tag) of the button in which the operation is performed and notifies the control unit 412 of the interpretation result (file selection notification).

When the file selection notification is received from the interpretation unit 414, the control unit 412 scans the document set in the MFP 15 and uploads the read image to the Web server 20.

As described above, the Web browser 410 mounted in the MFP 15 performs a control of generating a file to be selected by the Web browser of the information processing apparatus as a read image by scanning and uploads the generated file. Accordingly, in the MFP 15, the Web application using a general purpose HTML can create and upload the contents by adding an image forming function, without using a dedicated HTML tag for implementing the image forming function, but only providing a setting parameter according to a certain rule.

The Web browser installed in the information processing apparatus interprets the HTML tag (the a-tag (anchor tag)) of the link for which the link-depressing operation is performed, for example, when the link-depressing operation is performed by the user on the Web page, and performs a notification (a display notification or download notification) according to the interpretation result.

For example, if the file designated by the attribute "href" of the a-tag is a file that can be displayed in the Web browser (for example, if the extension is "html", "img", or "pdf", etc.), the display is a display notification. On the other hand, for example, when the file designated by the attribute "href" of the a-tag is a file that cannot be displayed in the Web browser (for example, when the extension is "zip"), a download notification is issued. However, for example, if the file extension of the file designated by the attribute "href" of the a-tag is an extension of a file that can be displayed by a Web browser such as "pdf", and the attribute "download" is designated, the download notification is returned.

The Web browser then displays a file when it receives a display notification. On the other hand, when a download notification is received, the Web browser displays a screen for downloading a file (e.g., a screen for the user to select whether to start or cancel the download).

Meanwhile, when the interpretation unit 414 of the Web browser 410 installed in the MFP 15 interprets the HTML tag (a-tag (anchor tag)) corresponding to the case in which the link depressing operation is performed, the interpretation unit 414 notifies the control unit 412 of the interpretation result (display notification or download notification). Similar to the MFP 15, for example, if the file designated as the attribute "href" of the a-tag is a file that can be displayed in the Web browser 410 (for example, if the extension is "html", "img", or "pdf"), then the display notification is issued. On the other hand, for example, when the file designated by the attribute "href" of the a-tag is a file that cannot be displayed by the Web browser 410 (for example, when the extension is "zip" or the like), the download notification is issued.

When the download notification is received, the control unit 412 determines whether the downloaded file is printable. When the downloaded file is printable, the control unit 412 downloads the file and controls the downloaded file for printing. On the other hand, when the display notification is received, the control unit 412 determines whether the file to be displayed is printable. When the file is printable, the control unit 412 downloads the file and controls the downloaded file for printing.

As described above, the Web browser 410 mounted in the MFP 15 performs a control of printing a file to be downloaded or interpreted as a display target in the Web browser of the information processing apparatus when the file can be printed. Accordingly, in the MFP 15, in the Web application using the general purpose HTML, the contents can be downloaded and printed by adding an image forming function, without using a dedicated HTML tag for implementing the image forming function, but only by providing a setting parameter according to a certain rule.

(Scanning and Print Processing of Image Processing System)

Figure 38:
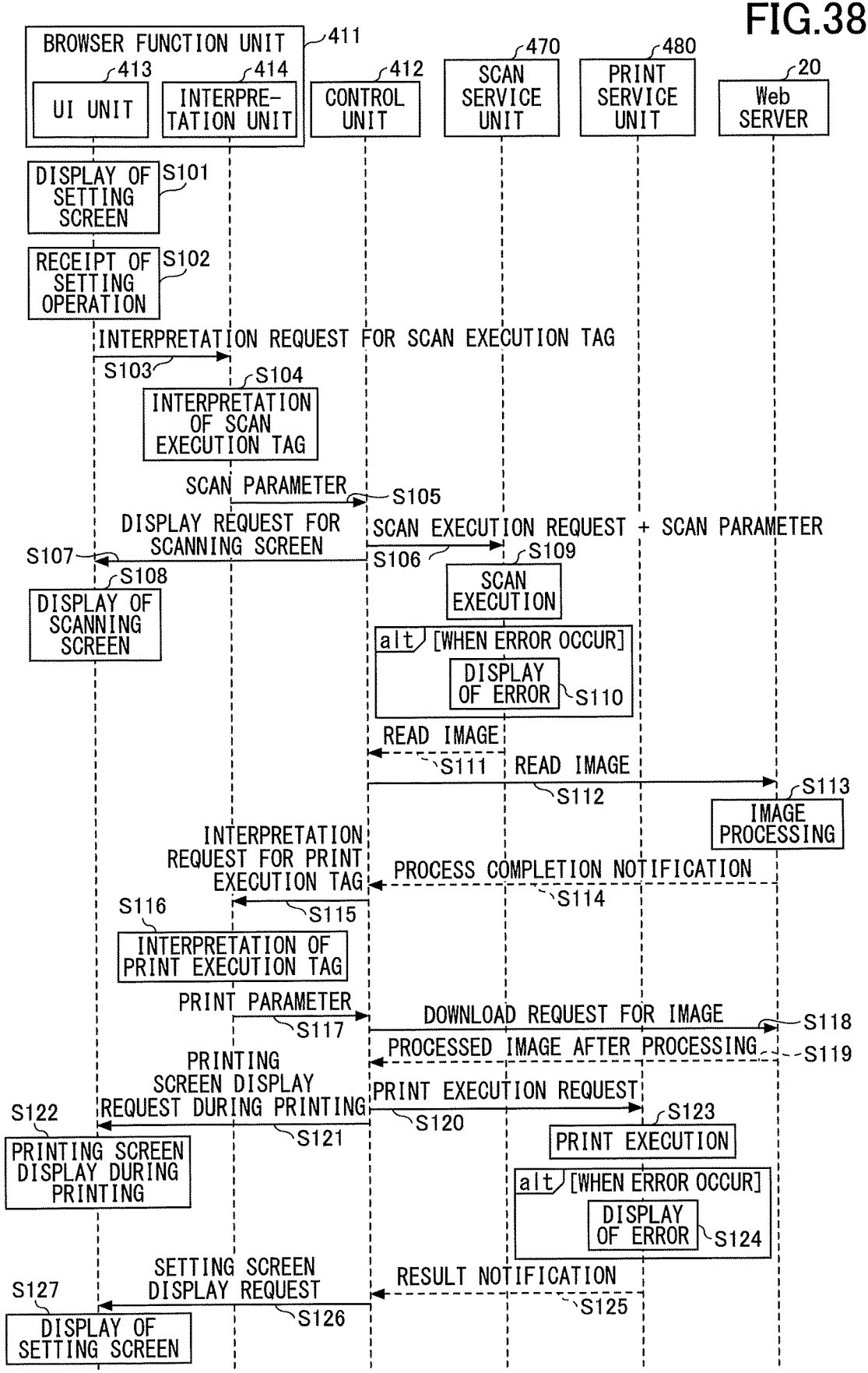
FIG. 38 is a sequence diagram illustrating an example of a scanning and print process of an image processing system according to an embodiment.
Figure 39:
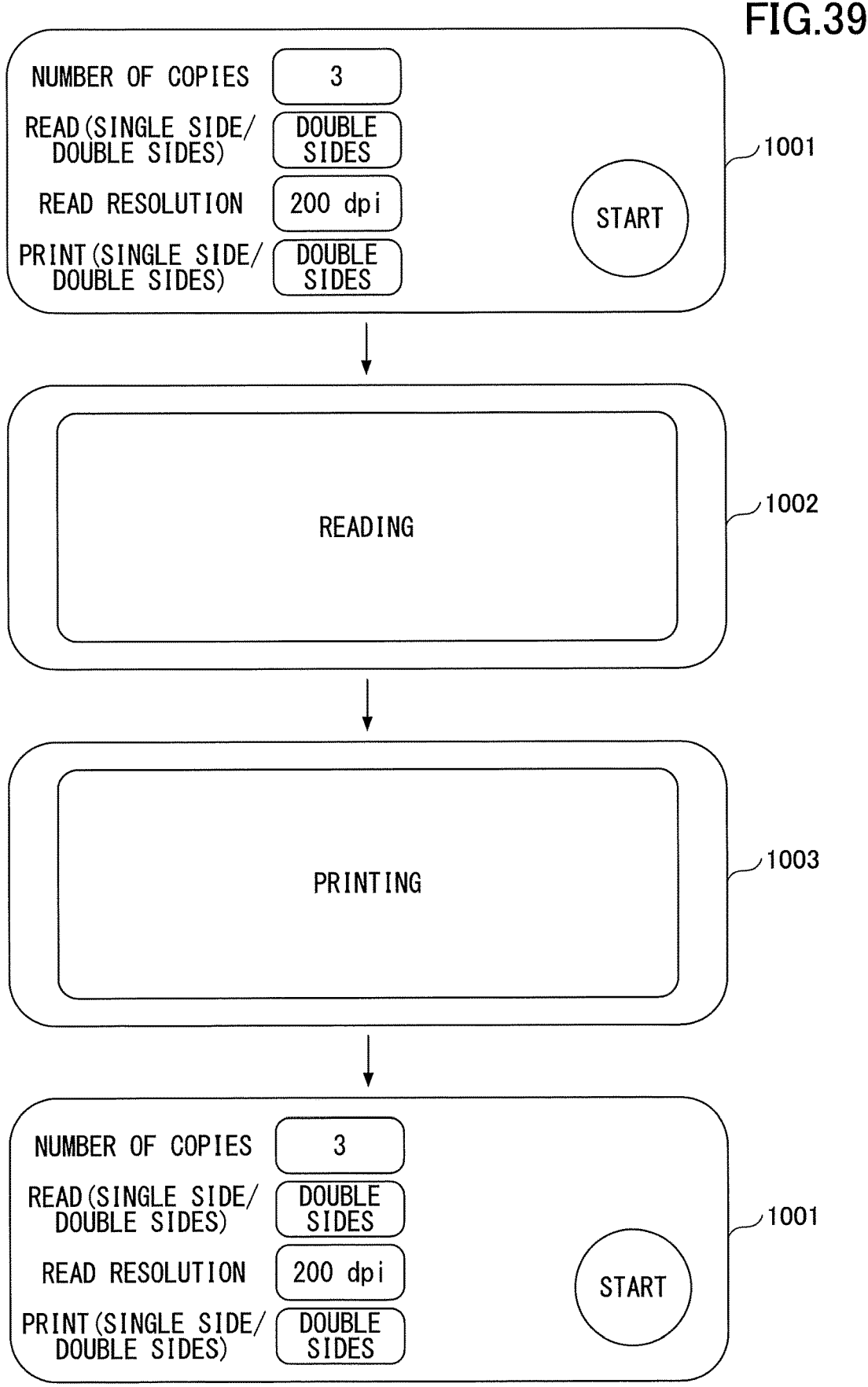
FIG. 39 is a diagram illustrating an example of a screen transition in a scan/print process.

FIG. 38 is a sequence diagram illustrating an example of a scanning and print process of the image processing system according to this embodiment. FIG. 39 is a diagram illustrating an example of a screen transition in a scanning and print process. FIG. 40 is a diagram illustrating an example of a scan execution tag. FIG. 41 is a diagram illustrating an example of a printing execution tag. Referring to FIGS. 38 to 41, a scan-print process of the image processing system 1 according to the embodiment will be described. In addition, the MFP 15 assumes that a document that is subject to the scan and print processes is set in advance.

<Step S101>

First, the UI unit 413 of the browser function unit 411 displays the setting screen 1001 provided by the Web application illustrated in FIG. 39 on the display unit 417. The setting screen 1001 illustrated in FIG. 39 is displayed when the interpretation unit 414 interprets the contents (HTML, CSS, JavaScript, or the like) acquired from the Web server 20. The interpretation unit 414 acquires the contents through the communication unit 415 by, for example, inputting a URL (Uniform Resource Locator) for displaying the setting screen 1001 or clicking a link to the URL.

<Step S102>

The setting screen 1001 illustrated in FIG. 39 includes an input portion of the number of copies (the number of copies), the scanner reading surface, the reading resolution, and an input unit for setting the printing surface. In the setting screen 1001, the user inputs these settings from the input unit 416, touches the start button, and transmits the information to the UI unit 413.

<Step S103>

For example, as illustrated in FIG. 40, the start button of the setting screen 1001 is substantialized by an input tag having an attribute "type" and an attribute "job". In addition, various other attributes may be set in the input tag. The UI unit 413 of the browser function unit 411 transmits an interpretation request of the input tag (a scan execution tag) for substantializing the start button depressed by the user to the interpretation unit 414.

<Steps S104 and S105>

The interpretation unit 414 of the browser function unit 411 interprets the input tag (a scan execution tag) (an example of first tag) in accordance with the interpreting request received from the UI unit 413. That is, the interpretation unit 414 interprets the input tag to indicate that a file is selected, and acquires the read surface of the scanner designated by the attribute "Job" of the input tag and the read resolution as the scan parameter (a first parameter). In the input tag illustrated in FIG. 40, the default setting is a scanner reading surface of double sides and a resolution of 200 [dpi]. When the read surface of the scanner and the read resolution are set to a value different from the default value by the user in the setting screen 1001, the interpretation unit 414 interprets the attribute "Job" of the input tag as the set value and acquires the value as the scan parameter. The interpretation unit 414 transmits the fi-selection notification indicating that the file is selected as the result of the tag interpretation and the acquired scan parameter to the control unit 412.

<Step S106>

When the control unit 412 receives the fi select notification and the scan parameter from the interpretation unit 414, the control unit 412 transmits the scan execution request together with the scan parameter to the scan service unit 470.

<Steps S107 and S108>

The control unit 412 transmits the screen display request during scanning to the UI unit 413 of the browser function unit 411 to notify the user that the image is being scanned. When the UI unit 413 receives a screen display request during scanning, the UI unit 413 displays the scanning screen 1002 during scanning illustrated in FIG. 40 on the display unit 417. This allows the user to recognize that one of the scan and print processes being performed is the scan process stage.

The scanning screen 1002 may be displayed by a function of the Web application or may be displayed by a function of the scan UI application 420.

<Step S109>

Upon receiving the scan execution request and a scan parameter from the control unit 412, the scan service unit 470 causes the scanner engine 135 illustrated in FIG. 34 to scan the set original manuscript.

Scans may be performed by the scan UI application 420 transmitting the scan request to the scan application 450 via the WebAPI 440. As a result, image data (read image) is generated from the set original manuscript. The read image generated by the scanning is stored, for example, in a predefined storage area in the flash memory 114 illustrated in FIG. 34.

The scanning screen 1002 illustrated in FIG. 39 may include a cancel button. In this case, when the user depresses the cancel button, the scan UI application 420 transmits a scan stop request to the scan application 450 via the WebAPI 440. Therefore, the scan process of the original manuscript is discontinued.

<Step S110>

If an error such as an error in the operation of the scanner engine 135 occurs during the scan process by the scan service unit 470, for example, the scan application 450 interrupts the scan process and transmits an error notification to the scan UI application 420. When receiving the error notification, the scan UI application 420 causes the display unit 417 to indicate that an error has occurred during the scan process.

<Step S111>

The scan application 450 of the scan service unit 470 transmits the scanned read image to the scan UI application 420 upon completion of the scan process. The scan UI application 420 transmits the received read image (the first image) to the control unit 412.

<Step S112>

Upon receipt of the read image, the control unit 412 uploads the read image to the Web server 20 via the communication unit 415.

The control unit 412 may transmit a display request of the screen being uploaded to the UI unit 413 of the browser function unit 411 during the upload of the read image. In this case, when the UI unit 413 receives the display request of the screen being uploaded, the UI unit 413 displays the screen being uploaded on the display unit 417. This allows the user to recognize that, among the scan and print processes being performed, the scanned read image is in the stage of being uploaded to the Web server 20.

<Step S113>

When the image processing unit 513 of the Web server 20 receives the read image from the MFP 15 through the communication unit 511, the image processing unit 513 performs predetermined image processing for the read image. For example, the image processing unit 513 performs image processing such as inserting an advertisement or adding a watermark, such as a logo mark, to the read image.

<Step S114>

When the image processing ends for the read image, the image processing unit 513 transmits the process completion notification indicating that the image processing ends to the MFP 15 through the communication unit 511.

<Step S115>

When the process completion notification is received through the communication unit 415, the control unit 412 subsequently transmits the interpretation request of the print execution tag to the interpretation unit 414 of the browser function unit 411.

<Steps S116 and S117>

When the interpretation unit 414 of the browser function unit 411 receives the interpreting request for the print execution tag, for example, the interpretation unit 414 interprets an a-tag (an example of a second tag) as a print execution tag having the attribute "href" illustrated in FIG. 41 set thereto. In addition, various other attributes may be set to the a-tag. As illustrated in FIG. 41, the "a" tag (an anchor tag) is designated as the storage destination URL of the PDF file of the read image as the attribute "href" by the relative path, and the number of prints (the number of copies) and the printing surface are designated. For example, the storage destination URL of the PDF file of the read image is included in the process completion notification in step S114, and the URL may be interpreted by the interpretation unit 414 in the manner that the attribute "href" of the a-tag (the anchor tag) is set. That is, the interpretation unit 414 interprets the a-tag (anchor tag) to indicate the link to the contents stored in the Web server 20, acquires the number of prints (the number of copies) designated by the attribute "href" of the a-tag and the print surface as the print parameter (the second parameter), and acquires the URL to which the file of the read image is stored. In the a-tag (anchor tag) illustrated in FIG. 41, as the default setting, the number of prints (the number of copies) is designated as both sides and the printing surface is designated as both sides.

In step S102, when the number of prints (the number of copies) and the print surface are set to a value different from the default value by the user in the setting screen 1001, the interpretation unit 414 interprets the attribute "href" of the a-tag (anchor tag) as the set value and acquires the value as the print parameter. The interpretation unit 414 transmits the acquired print parameter and the URL to which the file of the read image is stored to the control unit 412.

<Steps S118 and S119>

The control unit 412 transmits the download request of the contents (the read image) at the link destination (URL) designated by the attribute "href" of the a-tag to the Web server 20 through the communication unit 415. Therefore, the contents (the read image) are downloaded from the Web server 20 to the control unit 412. However, because the read image is processed in step S113, the read image after the image processing is hereinafter referred to as the "post-processing image". The control unit 412 stores the processed image after processing (the second image) downloaded from the Web server 20 in a predetermined storage area in the flash memory 114, for example.

The control unit 412 may transmit the display request of the screen being downloaded to the UI unit 413 of the browser function unit 411 during the download of the processed image after processing. In this case, when the UI unit 413 receives the request for displaying the screen being downloaded, the UI unit 413 displays the screen being downloaded on the display unit 417. Thus, the user can recognize that, among the scan and print processes being performed, the image after the processing is being downloaded from the Web server 20.

<Step S120>

When the download of the processed image after processing from the Web server 20 is completed, the control unit 412 subsequently transmits the print execution request to the print service unit 480 together with the processed image and the print parameters.

<Step S121 and S122>

The control unit 412 transmits a screen display request during printing to the UI unit 413 of the browser function unit 411 in order to notify the user that printing is being performed. The UI unit 413 displays the printing screen 1003 illustrated in FIG. 39 on the display unit 417 when the printing screen display request is received. This allows the user to recognize that the stage is the print process from among the performing scan and print processes.

The display of the printing screen 1003 may be substantialized by a function of the Web application or may be substantialized by a function of the print UI application 430.

<Step S123>

Upon receiving the print execution request, the processed image after processing, and the print parameter from the control unit 412, the processed image is caused to be printed by the printer engine 136 illustrated in FIG. 34. The printing can be executed by the print UI application 430 transmitting a print request to the print application 460 via the WebAPI 440. This causes the processed image downloaded from the Web server 20 to be printed.

The printing screen 1003 illustrated in FIG. 39 may include a cancel button. In this case, when the user depresses the cancel button, the print UI application 430 transmits a print stop request to the print application 460 via the WebAPI 440. Therefore, the print process of the processed image after processing is stopped.

<Step S124>

If an error such as abnormality in the operation of the printer engine 136 occurs during the print process by the print service unit 480, the print application 460 interrupts the print process and transmits an error notification to the print UI application 430. Upon receipt of the error notification, the print UI application 430 causes the display unit 417 to indicate that the error has occurred during the print process.

<Step S125>

When the print application 460 of the print service unit 480 completes the print process, the print application 460 transmits a notification (a completion notification) of the result of the print process to the control unit 412.

<Steps S126 and S127>

The control unit 412 transmits a setting screen display request to the UI unit 413 of the browser function unit 411 in order to notify the user that the print process has been completed. When receiving the setting screen display request, the UI unit 413 displays a setting screen 1001 illustrated in FIG. 39 on the display unit 417. As described above, the original setting screen 1001 is displayed so that the user can recognize that the scan/print process has been completed. In addition, the setting screen 1001 may not be displayed again, but a predetermined completion screen may be displayed.

As described above, in the MFP 15 according to this embodiment, the setting of the scan operation and the print operation job can be performed only once in the setting screen 1001 illustrated in FIG. 39, for example, and the print operation can be performed in a series of operations based on the scan operation of the document and the image obtained in the scan operation. That is, the setting screen for each process of the scan operation and the print operation starts, and the user does not need to set for each process, thereby improving the convenience.

In the MFP 15 according to the embodiment, when the input tag, which is the general purpose HTML tag, is interpreted, the original manuscript can be read by the scanner, a read image can be generated, and the document can be uploaded to the Web server 20. Accordingly, the scan function is substantialized by simply providing a setting parameter in accordance with a certain rule without using a dedicated HTML tag or the like to implement the scan function. In addition, when the a-tag, which is a general purpose HTML tag, is interpreted, the linked contents (post-processing image) can be downloaded and printed. Accordingly, the print function is substantialized by only providing a setting parameter according to a certain rule without using a dedicated HTML tag or the like to substantialize the print function. That is, a developer or the like of the Web application provided by the Web server 20 can develop the Web application utilizing the image forming function specific for the MFP 15 without requiring knowledge such as dedicated JavaScript and HTML.

Further, in the image processing system 1 according to this embodiment, for the read image that is read by the scan process, the predetermined image processing is performed by the Web server 20, and the image after the image processing can be printed out. That is, because a predetermined image processing can be incorporated into a series of scan and print operations, the image forming function with added value can be performed instead of merely copying the original manuscript. Similarly to the above described embodiment, the invention can be substantiated without using a dedicated HTML tag or the like to cause such image processing to be performed.

Modified Example 1

Hereinafter, with reference to FIGS. 42 and 43, the image processing system according to the modified example 1 of the embodiment will be described with focus on points that differ from the image processing system 1 of this embodiment. This modified example 1 describes an operation of storing an image log of an image uploaded to a Web server. The hardware structure and the configuration of the function block of the MFP 15 and the hardware structure of the Web server according to the present modification are the same as the respective configurations described in the above described embodiment.

<Configuration of Function Block of Image Processing System>

Figure 42:
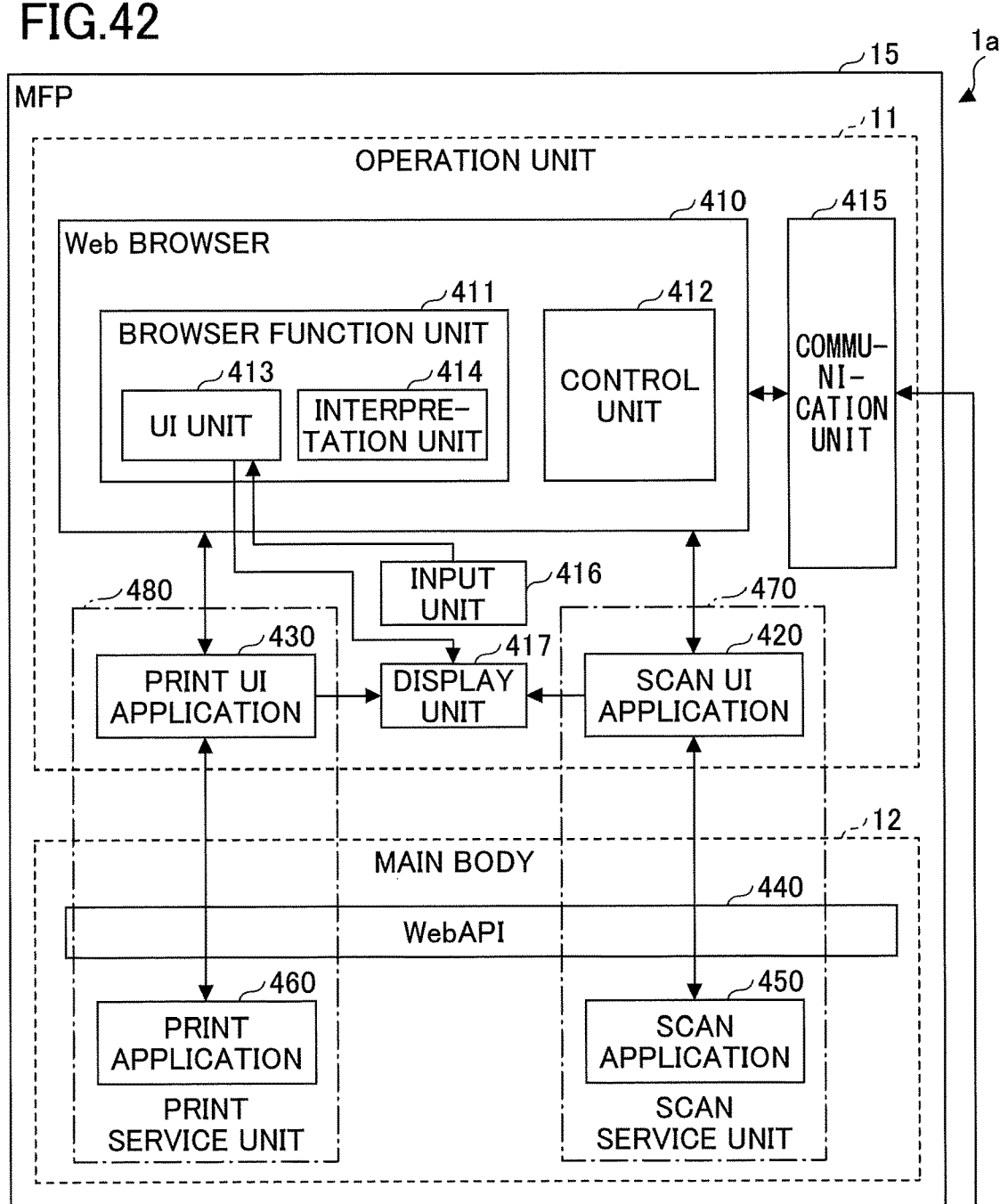
FIG. 42 is a diagram illustrating an example of a configuration of a functional block of an image processing system according to modified example 1 of the embodiment.

FIG. 42 is a diagram illustrating an example of the structure of the functional block of the image processing system according to the modified example 1 of this embodiment. Referring to FIG. 42, the structure of the functional block of the image processing system 1a according to the present modification will be described. As illustrated in FIG. 42, the configuration of the function block of the MFP 15 is the same as that illustrated in FIG. 37.

As illustrated in FIG. 42, the Web server 20a of the image processing system 1a according to the present modified example includes a communication unit 511, a memory unit 512, an image processing unit 513, and an image administration unit 514. The operations of the communication unit 511, the memory unit 512, and the image processing unit 513 are as described above in FIG. 37.

The image administration unit 514 is a function unit that stores an image uploaded from the MFP 15 as an image log to the memory unit 512. The image administration unit 514 may store an image (a post-processing image) in the memory unit 512 that is processed by the image processing unit 513 as an image log. The image administration unit 514 is substantialized by executing a program by the CPU 201 illustrated in FIG. 35.

<Scan/Print Image Processing System>

Figure 43:
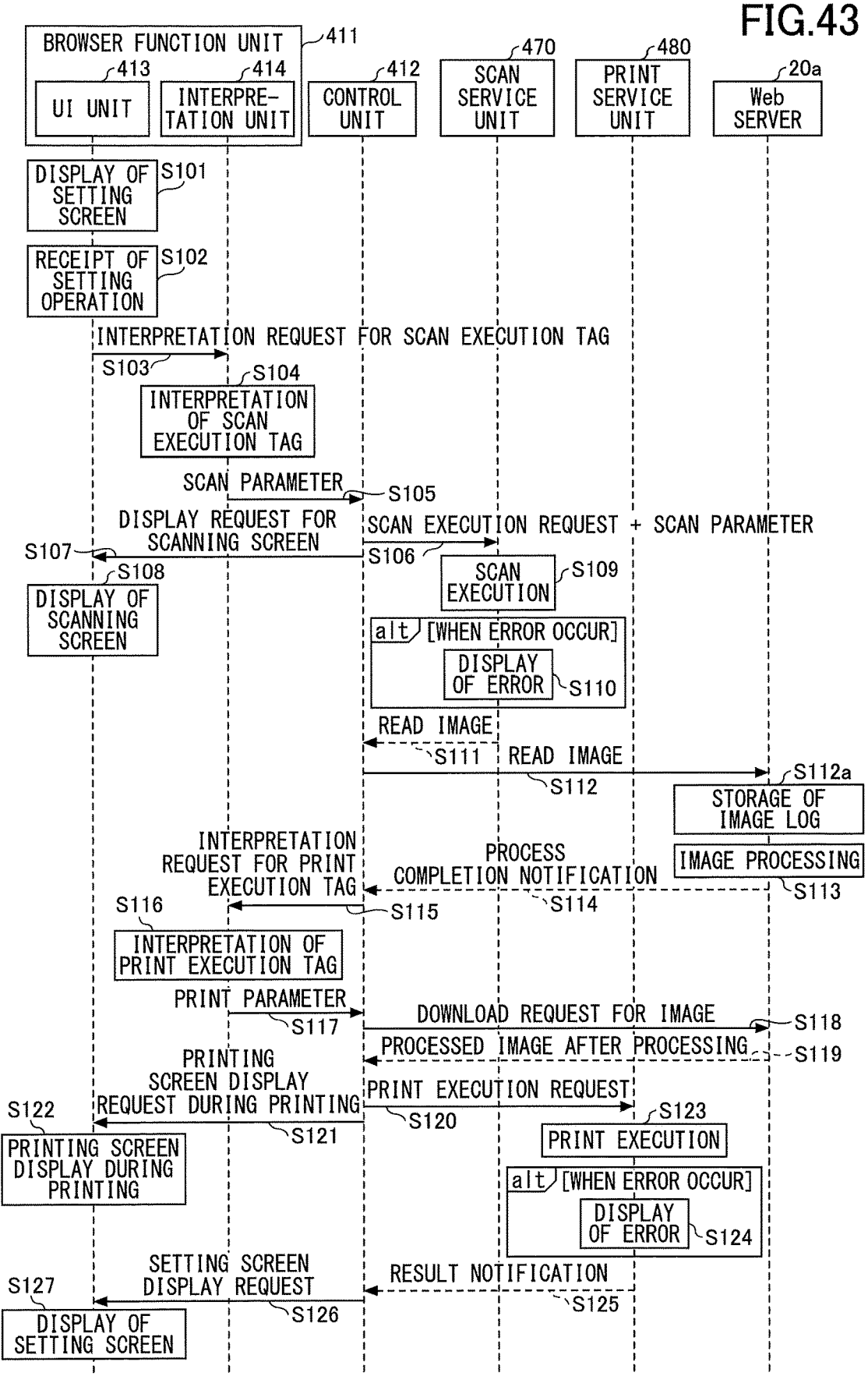
FIG. 43 is a diagram illustrating an example of scanning and print processing of an image processing system according to a modified example 1 of the embodiment.

FIG. 43 is a diagram illustrating an example of scan and print processing of an image processing system according to a modified example 1 of this embodiment. Referring to FIG. 43, the scan and print process of the image processing system 1a according to the present modification will be described.

<Steps S101-S112>

The processes of steps S101 to S112 in FIG. 43 are similar to the processes of steps S101 to S112 in FIG. 38, respectively.

<Step S112a>

When the read image is received from the MFP 15 through the communication unit 511, the image administration unit 514 of the Web server 20a stores the read image as an image log in the memory unit 512.

<Steps S113-S127>>

The processes of steps S113 to S127 in FIG. 43 are the same as the processes of steps S113 to S127 in FIG. 38, respectively.

As described above, the image log can be stored on the Web server 20a side in a series of the scan operation, the image processing, and the print operation. Therefore, it is possible to collectively manage what kind of image is handled, and thus it is possible to enhance the security against information leakage. As described above, the processed image after processing may be stored as an image log. In this case, the image that is actually printed and output to the print medium can be stored as an image log.

Modified Example 2

Hereinafter, with reference to FIG. 44, the image processing system according to the second modification of the embodiment will be described focusing on points that differ from the image processing system 1 according to this embodiment. The hardware structure of the MFP 15 and the hardware structure and the function block of the Web server according to the present modification are the same as the respective configurations described in the above-described embodiments.

Figure 44:
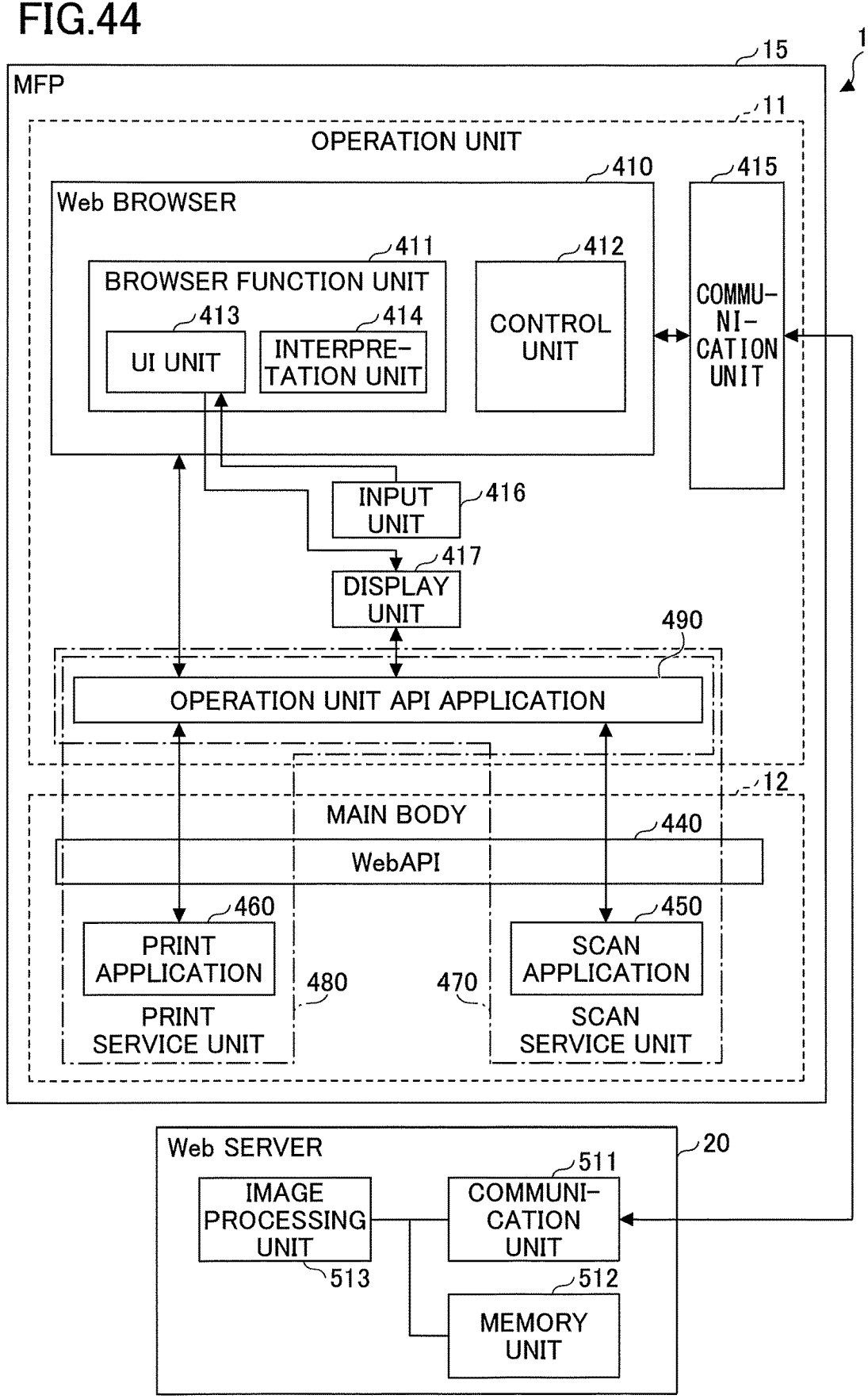
FIG. 44 is a diagram illustrating an example of a configuration of a functional block of an image processing system according to modified example 2 of the embodiment.

FIG. 44 is a diagram illustrating an example of a configuration of a functional block of an image processing system according to a second modification of the embodiment.

As illustrated in FIG. 44, the operation unit 11 of the MFP 15 according to the present modification may have an operation unit API application 490 instead of the scan UI application 420 and the print UI application 430.

The operation unit API application 490 is an application program that provides an UI related to an image forming function such as printing and scanning. The operation unit API application 490 has the same function as an application that provides a UI related to an image forming function such as a scan UI application 420 and a print UI application 430.

Accordingly, in the configuration illustrated in FIG. 44, in the above-described embodiment and variation 1, the scan UI application 420 and the print UI application 430 may be read as the operation unit API application 490. By using the operation unit API application 490, the UI related to various image forming functions such as print and scan can be provided in an integrated manner.

The operation unit API application 490 includes an API group for developing an application that provides an image forming UI by a third vendor. The third vendor or the like can easily develop an application that provides a UI related to image formation without requiring knowledge of the specifications of the WebAPI 440 by using the API group of the operation unit API application 490. That is, the operation unit API application 490 can be referred to as an application program that provides a third vendor or the like with an API group of which WebAPI 440 is wrapped.

In the configuration illustrated in FIG. 44, the operation unit 11 includes the operation unit API application 490 instead of the scan UI application 420 and the print UI application 430. However, the configuration is not limited thereto. That is, the operation unit 11 may include the operation unit API application 490 in addition to the scan UI application 420 and the print UI application 430.

In the above described embodiments and modified examples, the operation unit 11 and the main body 12 operate independently of each other in a separate operating system, but are not limited thereto. For example, the operation unit 11 and the main body 12 may operate in the same operating system.

Further, in the above described embodiments and modified examples, when at least one of the functional portions of the MFP 15 and the Web server 20(20a) is implemented by executing a program, the program is provided in advance in the ROM. The program executed by the MFP 15 and the Web server 20(20a) according to the above-described embodiments and modifications may be configured to be provided by recording on a computer-readable recording medium such as a CD-ROM (Compact Disc Read Only Memory), a flexible disk (FD), a CD-R (Compact Disk-Recordable), or a DVD in an installable or executable format. The program executed by the MFP 15 and the Web server 20(20a) according to the above described embodiments and modified examples may be stored in a computer connected to a network such as the Internet and downloaded through the network. The program executed by the MFP 15 and the Web server 20(20a) according to the above described embodiments and modified examples may be provided or distributed via a network such as the Internet. The program executed by the MFP 15 and the Web server 20 according to the above described embodiments and modified examples has a module configuration that includes at least one of the above described functional units. In the actual hardware, the CPU reads out the program from the above described storage device and executes the program so that the above described functional portions are loaded onto the main storage device and generated.

The MFP 15 according to the above described embodiments and modified examples is not limited to the image forming apparatus provided with a communication function. That is, instead of MFP 15, for example, output devices such as a PJ (Projector), IWB (Interactive White Board), output device such as digital signage, HUD (Head Up Display) device, industrial machinery, manufacturing device, imaging device, sound collector, medical device, network appliance, notebook PC, mobile phone, smartphone, tablet terminal, game machine, PDA (Personal Digital Assistant), digital camera, wearable PC, desktop PC, and the like.

The functions of the above described embodiments and modified examples can also be implemented by at least one processing circuitry. Here, "processing circuitry" includes a processor programmed to perform each function by software, such as a processor implemented by an electronic circuitry, ASIC (Application Specific Integrated Circuit) designed to perform each function as described above, DSP (Digital Signal Processor), Field Programmable Gate Array (FPGA), or conventional circuit module.

The browser application may be mounted to an information processing terminal, such as a user's PC terminal, portable terminal, or smartphone, as an operation unit for operating an MFP or the like. A server device may also provide a cloud or Web service by one device for each function or by a server system using multiple server devices.

According to the embodiment of the present invention, general purpose HTML is used to substantialize the functions specific for the image processing apparatus.

The present invention is not limited to the above embodiments, and various modifications and variations are possible without departing from the scope of the claims.

EXPLANATION OF SYMBOLS 1, 1a Image processing system
10 Image processing apparatus
1001 Setting screen
1002 Scanning screen
1003 Printing screen
11 Operation unit
111 CPU
112 ROM
113 RAM
114 Flash memory
115 Operation panel
116 Connection I/F
117 Communication I/F
118 Bus
12 Main body
121 CPU
122 ROM
123 RAM
126 Connection I/F
127 Communication I/F
129 Bus
13 communication line
134 Storage
135 Scanner engine
136 Printer engine
15, 15a, 15b MFP
20 and 20a Web server
201 CPU
202 ROM
203 RAM
205 Auxiliary store
206 Recordable media
207 Media drive
208 Display
209 Network I/F
210 Bus line
211 Application layer
212 Service layer
213 OS layer
214 DVD drive
215 Keyboard
216 Mouse
217 DVD
30 Mail server
310 web browser
311 Browser function unit
312 Controller
313 UI unit
314 Interpretation unit
316 App layer
317 Service layer
318 Operating system layer
320 Print UI application
321 App layer
322 Service layer
323 OS layer
330 Scan UI application
340 WebAPI
350 Print application
360 Scan application
370 Print service unit
380 Scan service unit
39 Fax receiver
390 Mail transmission application
391 Mail service unit
392 Mail UI application
395 Fax application
40 Information processing apparatus
410 Web browser
411 Browser function
412 Controller
413 UI unit
414 Interpretation unit
415 Communication unit
416 Input unit
417 Display unit
420 Scan UI application 430 Print UI application
440 WebAPI
450 Scan application
460 Print application
470 Scan service unit
480 Print service unit
490 Operation unit API application
511 Communication unit
512 Storage unit
513 Image processor
514 Image administration unit
N Network

What is claimed is:

1. An image processing apparatus comprising:
a display;
a processor; and
a memory storing a web browser, execution of the web browser causing the processor to:
interpret contents acquired from a webserver coupled to the image processing apparatus via a network,
display on the display a screen based on the interpreted contents, and
executes the image processing in response to an input by a user on the displayed screen, wherein, if an HTML tag of the contents contains a predetermined tag,
the processor transmits image data generated by reading an original manuscript to a transmission destination indicated by the predetermined tag.

2. The image processing apparatus according to claim 1, wherein, if the HTML tag of the contents indicates the contents are to be transmitted to an e-mail address, the web browser further causes the processor to:
transmit the image data generated by reading the original manuscript as an e-mail to the generated image data to the e-mail address indicated by the predetermined tag of the generated image data.

3. The image processing apparatus according to claim 2, wherein
the web application is a plurality of different web applications
the web server is a plurality of web servers,
the web browser further causes the processor to cooperate with the plurality of web servers to implement the plurality of different web applications, respectively,
the processor
sends an execution request to the web server for executing a predetermined process, and
sends an execution request for the image processing based on the HTML tag that implements a display component in accordance with a depressing operation by a user on the display component in the screen of the web application, and
in a case where the HTML tag indicates a link to an electronic file stored in the web server, the processor downloads the electronic file stored in the web server, and prints the downloaded electronic file.

4. The image processing apparatus according to claim 3, wherein the web browser further causes the processor to execute one of the following, in response to information indicating a file format of the electronic file included in the HTML tag instructing a device to download the electronic file:
downloading the electronic file and printing the downloaded electronic file;
downloading the electronic file and displaying the downloaded electronic file on the display; and
downloading the electronic file, displaying the downloaded electronic file on the display, and printing the downloaded electronic file.

5. The image processing apparatus according to claim 3, wherein, in a case where the HTML tag indicates a link to the electronic file stored in the web server, and a MIME format of the electronic file indicated by the link is a predetermined type, the web browser further causes the processor to:
download the electronic file from the webserver, and
print the downloaded electronic file.

6. The image processing apparatus according to claim 3, wherein, in a case where the HTML tag of an electronic file, selected from among electronic files stored in the image processing apparatus, indicates that the selected electronic file is to be transmitted to the web server, the web browser further causes the processor to:
execute a scanning process to read the original manuscript and generate the electronic file,
upload the generated electronic file to the webserver in response to information indicating the selecting of the electronic file of the HTML tag that instructs an apparatus to upload the electronic file.

7. The image processing apparatus according to claim 2, wherein the web browser further causes the processor to:
execute the scan request and the upload request in response to information indicating a start-up of a camera contained in the HTML tag instructing an apparatus to upload the electronic file.

8. The image processing apparatus according to claim 2, wherein
the web browser is implemented by a Java application program, and
a browser function provided in an operation unit of the image processing apparatus implements the interpretation of the contents acquired from the webserver and the display of the screen based on the interpreted contents, and
the Java application program calls the browser function via an API provided by the operation unit.

9. The image processing apparatus according to claim 2, wherein the image processing apparatus further comprises:
an operation unit that is separate from a main body of the image processing apparatus, the operation unit storing
a first program that provides an interface to a user,
a second program that controls the execution of the image processing, and
a WebAPI for requesting the second program to execute the image processing,
the first program provides a group of WebAPIs formed by wrapping the WebAPI,
the operation unit and the main body each have a different OS, and
the web browser and the first program operate on the OS installed in the operation unit.

10. The image processing apparatus according to claim 2, wherein the transmitted e-mail is created based on the contents designated by the HTML tag.

11. The image processing apparatus according to claim 1, wherein if the HTML tag of the contents indicates a call to a phone number, the processor transmits the image data generated by reading the original manuscript via facsimile to the indicated phone number as the image processing.

12. The image processing apparatus according to claim 11, wherein the web browser causes the processor to cooperate with each of a plurality of webservers to implement a plurality of different web applications, and the processor executes a predetermined process to the web server, and executes the image processing based on the HTML tag that implements the display component in conformity with an operation by a user of depressing the display component in a screen of the web application.

13. The image processing apparatus according to claim 11, wherein the image processing further includes printing a history of the facsimile transmission.

14. The image processing apparatus according to claim 11, wherein a transmission line for the facsimile transmission is selected from among a plurality of transmission lines.

15. An image processing apparatus comprising:

a processor; and a memory storing a web browser, execution of the web browser causing the processor to:

interpret a first tag indicating a file selection acquired from a first server, the first server being a web server, and performing a scan operation for an manuscript and uploading a first image generated by the scan operation to a second server, wherein the web browser causes the processor to interpret a second tag indicating a link to information stored at the second server after uploading the first image, and the web browser causes the processor to download the second image, based on the first image, in response to a download request from the second server and perform a print operation of the second image in a case where the processor interprets the second tag as indicating a link to the information stored in the second server.

16. The image processing apparatus according to claim 15, the image processing unit further comprises:

a display, wherein the web browser further causes the processor to display a setting screen for setting a parameter related to operations of the scan operation and the print operation on the display based on the file selection acquired from the first server, a first parameter related to the scan operation set in the setting screen is acquired when the processor interprets the first tag, and a second parameter related to the scan operation set in the setting screen is acquired when the processor interprets the second tag, and the processor performs the scan operation based on the acquired first parameter, and causes the performs the print operation based on the acquired second parameter.

17. The image processing apparatus according to claim 15, wherein the second server generates the second image by performing predetermined image processing on the uploaded first image, the web browser further causes the processor to download the second image in response to a download request from the second server, and the second server stores one of the uploaded first image or the second image that is acquired by providing the predetermined image processing to the first image as an image log.

18. The image processing apparatus according to claim 16, wherein the web browser causes the processor to:

interpret the first tag in accordance with an operation on a display component substantialized by the first tag on a screen displayed on the display, display an issue that the scan operation for the original manuscript is in progress when the scan operation is being performed, and display another issue that the print operation of the second image is in progress when the print operation of the second image is being performed.

19. An image processing method performed by an image forming apparatus that includes a processor and a memory storing a web browser, the image forming apparatus performing predetermined image processing, and execution of the web browser causing the processor of the image form apparatus to perform the image processing method comprising:

interpreting contents acquired from a web server connected to the image processing apparatus via a network;

displaying a screen based on the interpreted contents; and executing the image processing in accordance with a user input on the displayed screen, and transmitting image data generated by reading an original manuscript to a transmission destination indicated by a predetermined tag in a case where an HTML tag of the acquired contents includes the predetermined tag.

* * * * *